United States Patent
Van Esbroeck et al.

(10) Patent No.: US 8,047,902 B2
(45) Date of Patent: Nov. 1, 2011

(54) DEVICE FOR MASSAGING PRODUCTS

(75) Inventors: Maurice Eduardus Theodorus Van Esbroeck, Bemmel (NL); Petrus Christianus Marius Janssen, Wilbertoord (NL); Adrianus Josephes Van Den Nieuwelaar, Gemert (NL); Andries Johan Martijin Kuijpers, Westerbeek (NL)

(73) Assignee: Stork PMT B.V. (NL)

( * ) Notice: Subject to any disclaimer, the term of this patent is extended or adjusted under 35 U.S.C. 154(b) by 0 days.

(21) Appl. No.: 11/931,271

(22) Filed: Oct. 31, 2007

(65) Prior Publication Data

US 2008/0051020 A1 Feb. 28, 2008

Related U.S. Application Data

(63) Continuation of application No. 11/833,126, filed on Aug. 2, 2007, now abandoned, which is a continuation of application No. 10/756,916, filed on Jan. 13, 2004, now abandoned, which is a continuation of application No. PCT/NL02/00473, filed on Jul. 15, 2002.

(30) Foreign Application Priority Data

Jul. 13, 2001 (NL) .................................. 1018541

(51) Int. Cl.
*A22C 9/00* (2006.01)
(52) U.S. Cl. ..................................... 452/141
(58) Field of Classification Search .................. 452/141; 99/472, 487, 517, 535
See application file for complete search history.

(56) References Cited

U.S. PATENT DOCUMENTS

| | | | |
|---|---|---|---|
| 4,012,808 A | 3/1977 | Strong | |
| 4,214,518 A | 7/1980 | Petsche | |
| 4,418,445 A | 12/1983 | Meyn et al. | |
| 4,446,779 A | 5/1984 | Hubbard et al. | |
| 4,517,888 A | 5/1985 | Gould | |
| 4,675,946 A * | 6/1987 | Bunge et al. | 452/19 |
| 4,791,705 A | 12/1988 | Corominas | |
| 4,836,099 A | 6/1989 | Thirode | |
| 5,067,927 A | 11/1991 | Hazenbroek et al. | |
| 5,203,736 A | 4/1993 | Schulte et al. | |
| 5,261,854 A * | 11/1993 | Eiriksson | 452/19 |
| 5,284,085 A | 2/1994 | Palm | |
| 5,307,737 A | 5/1994 | Higashimoto | |

(Continued)

FOREIGN PATENT DOCUMENTS

DE 39 13 190 A1 11/1989

(Continued)

OTHER PUBLICATIONS

Patent Cooperation Treat (PCT) Report Concerning Novelty Search of International Type issued in priority Application No. 1018541 and its English translation.

(Continued)

*Primary Examiner* — David Parsley
(74) *Attorney, Agent, or Firm* — Kilpatrick Townsend & Stockton LLP

(57) ABSTRACT

A device for treating products, in particular massaging meat products, comprises at least one treatment section with a space for receiving the products. The space comprises a treatment device for treating the products. A discharge device is provided for discharging the products from the space of the treatment section. The discharge device can be brought into an active and an inactive operating state with the aid of an actuating device.

35 Claims, 39 Drawing Sheets

U.S. PATENT DOCUMENTS

| | | | |
|---|---|---|---|
| 5,429,041 A | | 7/1995 | Zittel |
| 5,492,499 A | * | 2/1996 | Van Haren et al. ............ 452/141 |
| 5,569,067 A | | 10/1996 | Meyn |
| 5,632,195 A | | 5/1997 | Zittel |
| 5,673,863 A | | 10/1997 | Pallmann |
| 5,775,986 A | | 7/1998 | Law et al. |
| 5,816,904 A | | 10/1998 | Tieleman et al. |
| 5,947,015 A | * | 9/1999 | Laurbak ........................... 99/535 |
| 5,972,398 A | | 10/1999 | Ludwig et al. |
| 6,007,418 A | * | 12/1999 | Suhner ........................... 452/141 |
| 6,105,490 A | | 8/2000 | Horn et al. |
| 6,662,712 B2 | * | 12/2003 | Ludwig ........................... 99/535 |
| 6,817,284 B2 | | 11/2004 | Zittel |
| 2004/0144263 A1 | | 7/2004 | van Esbroeck et al. |
| 2008/0017050 A1 | | 1/2008 | Van Esbroeck |

FOREIGN PATENT DOCUMENTS

| | | |
|---|---|---|
| DE | 93 14 582 | 3/1994 |
| DE | 196 14 368 A1 | 10/1996 |
| DE | 198 16 264 A1 | 9/1999 |
| EP | 0 448 149 A1 | 9/1991 |
| EP | 0 475 867 A1 | 3/1992 |
| EP | 0575025 | 12/1993 |
| EP | 0 584 853 A1 | 3/1994 |
| EP | 0584853 | 3/1994 |
| GB | 2 217 586 A | 11/1989 |
| JP | 36-20594 | 8/1961 |
| JP | 54-41376 | 4/1979 |
| JP | 55-46585 | 3/1980 |
| JP | 57-5190 | 1/1982 |
| JP | 61-40738 | 1/1986 |
| JP | 63074598 | 4/1988 |
| JP | 3-172138 | 7/1991 |
| JP | 6086734 | 3/1994 |
| JP | 6165657 | 6/1994 |
| JP | 10296104 | 11/1998 |
| JP | 2000-35 | 3/2000 |
| NL | 9201490 | 8/1992 |
| WO | WO 03/005829 A1 | 1/2003 |

OTHER PUBLICATIONS

Office Action in related U.S. Appl. No. 10/756,916 dated Jun. 16, 2004.
Amendment and Response in related U.S. Appl. No. 10/756,916 dated Oct. 19, 2004.
Office Action in related U.S. Appl. No. 10/756,916 dated Dec. 17, 2004.
Amendment and Response in related U.S. Appl. No. 10/756,916 dated May 16, 2005.
Advisory Action in related U.S. Appl. No. 10/756,916 dated May 24, 2005.
Office Action in related U.S. Appl. No. 10/756,916 dated Aug. 16, 2005.
Amendment and Response in related U.S. Appl. No. 10/756,916 dated Dec. 13, 2005.
Office Action in related U.S. Appl. No. 10/756,916 dated Feb. 10, 2006.
Amendment and Response in related U.S. Appl. No. 10/756,916 dated Jun. 8, 2006.
Office Action in related U.S. Appl. No. 10/756,916 dated Aug. 2, 2006.
Amendment and Response in related U.S. Appl. No. 10/756,916 dated Jan. 2, 2007.
Office Action in related U.S. Appl. No. 10/756,916 dated Mar. 5, 2007.
Office Action in related U.S. Appl. No. 11/833,126 dated Feb. 24, 2010.
Response dated Jun. 24, 2010 in U.S. Appl. No. 11/833,126.
Interview Summary dated Jun. 29, 2010 in U.S. Appl. No. 11/833,126.
Office Action dated Sep. 1, 2010 in U.S. Appl. No. 11/833,126.

* cited by examiner

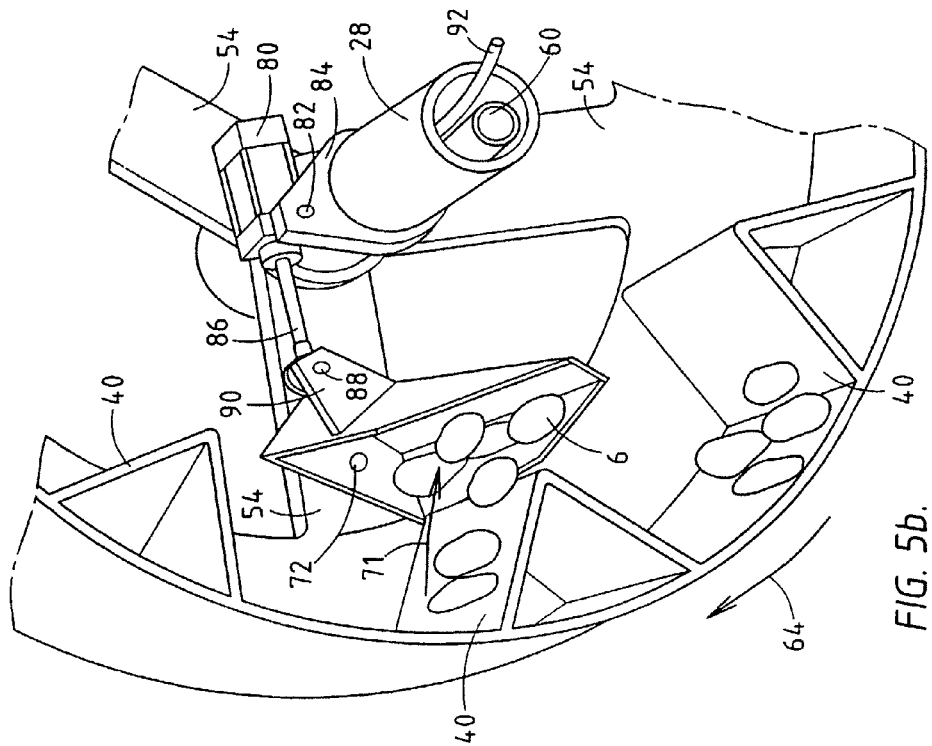
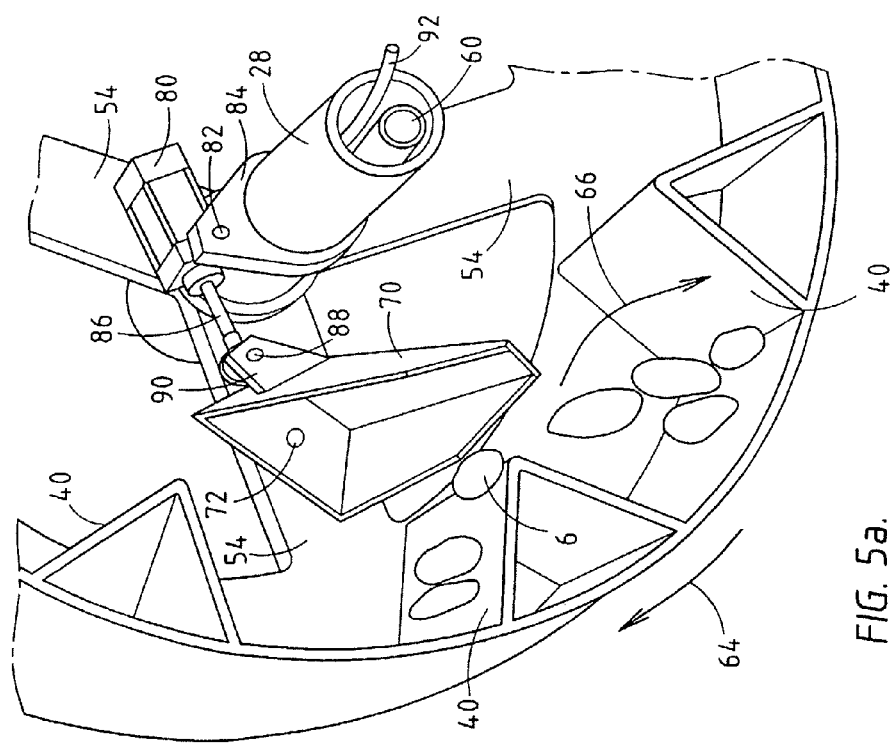

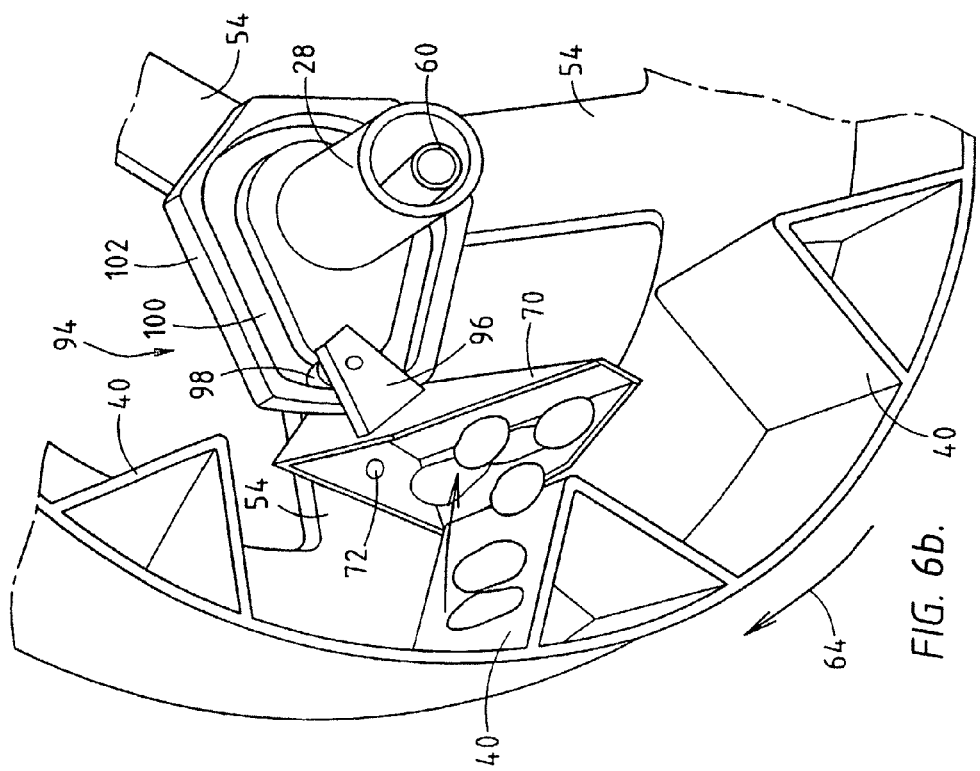
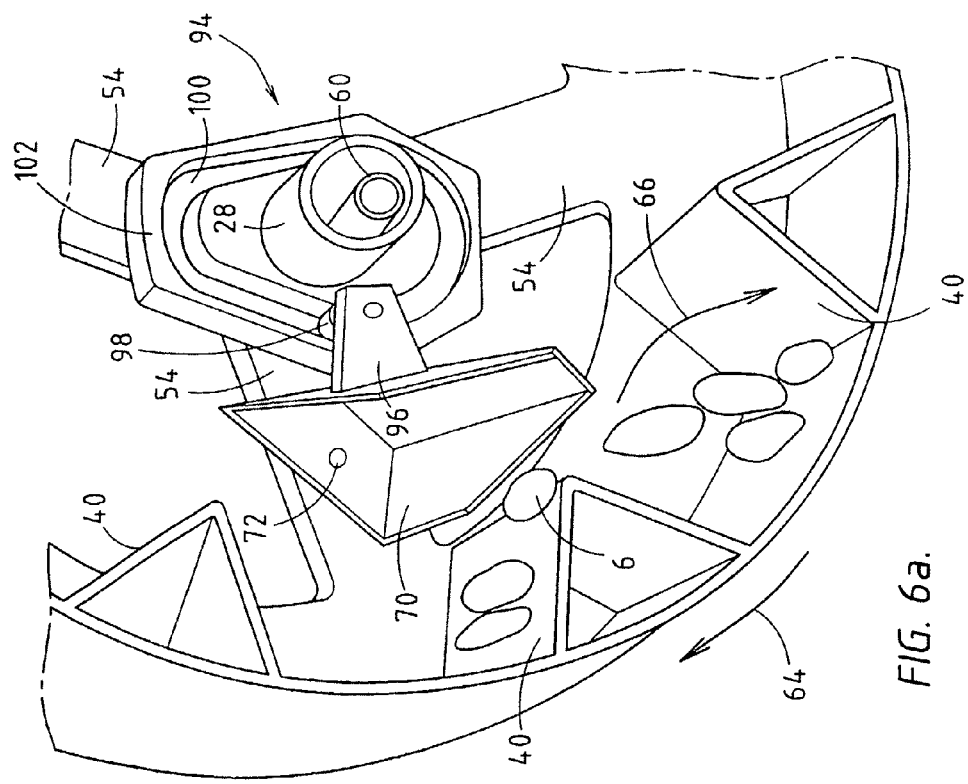

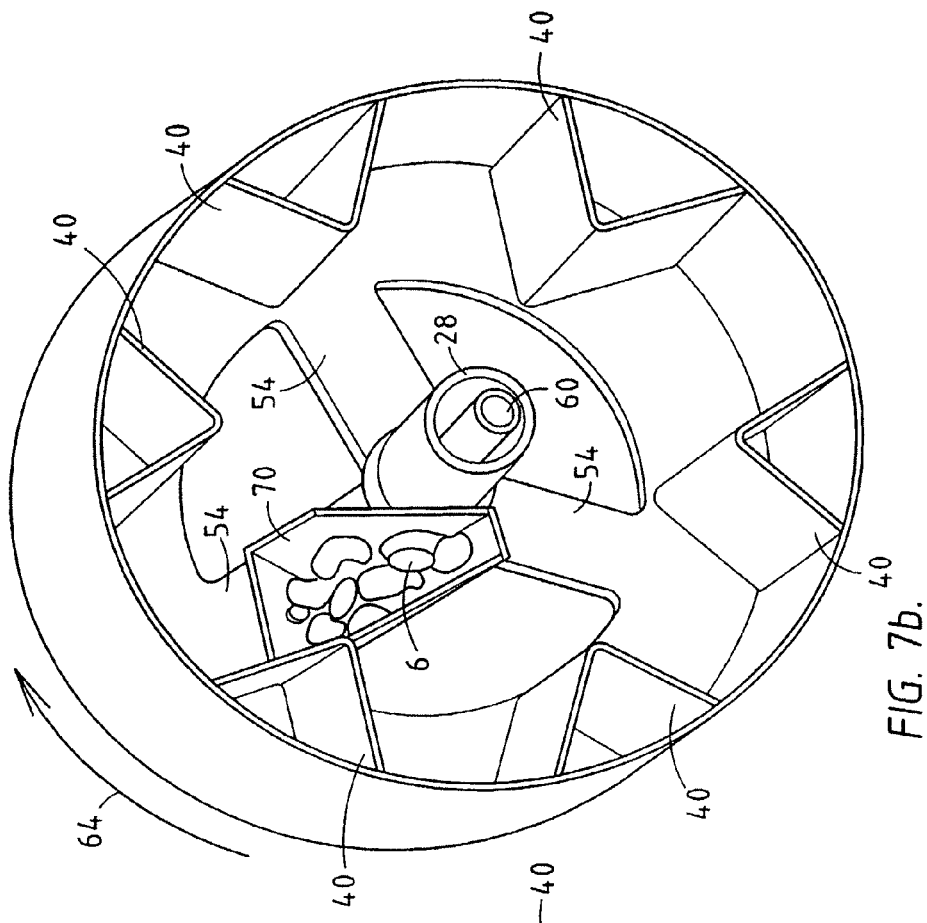
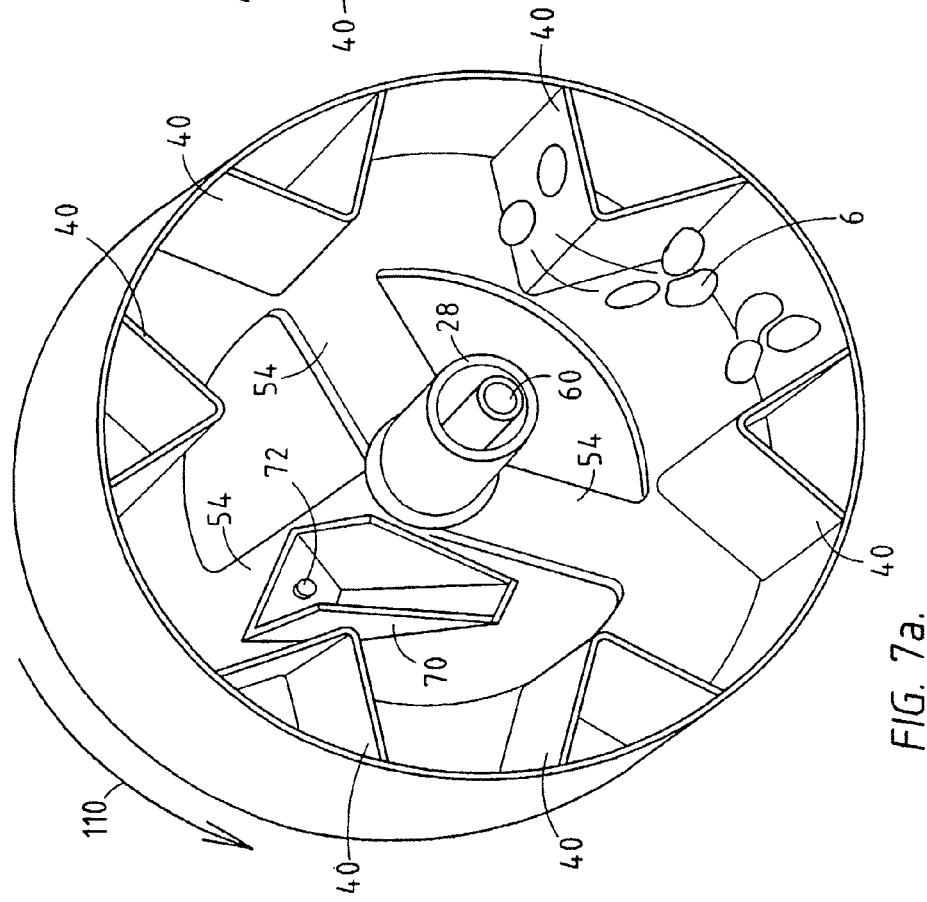

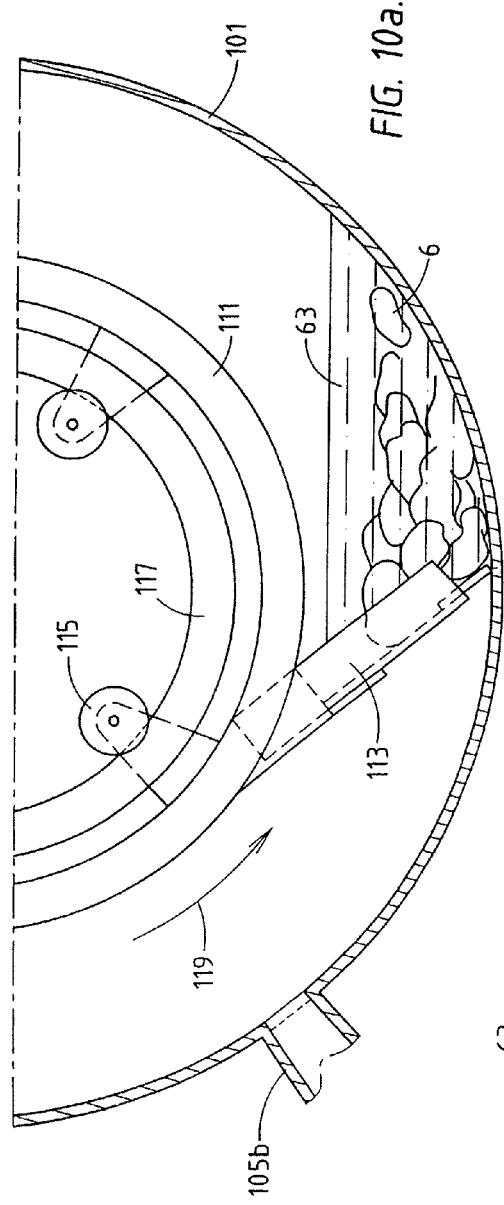
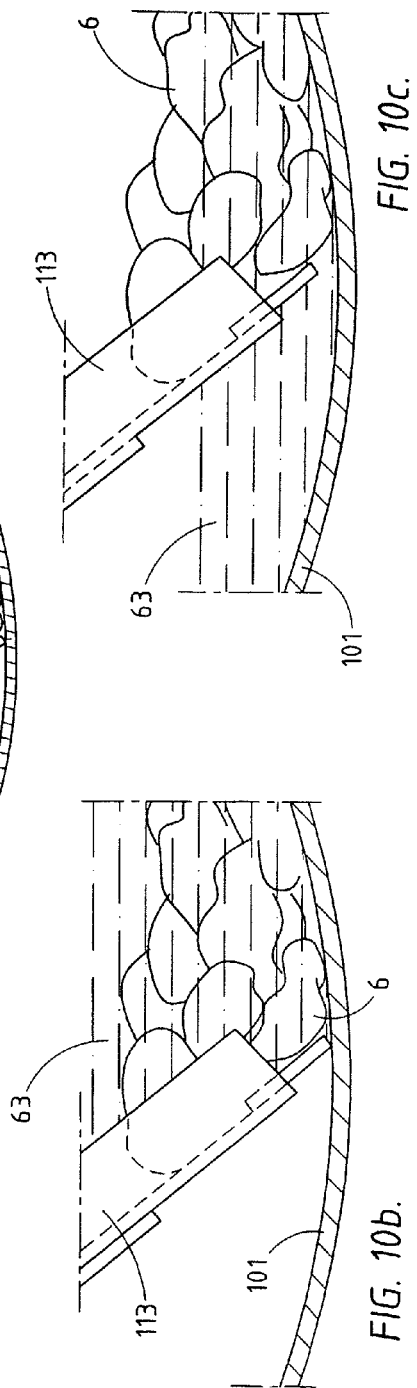
FIG. 10a.
FIG. 10b.
FIG. 10c.

DEVICE FOR MASSAGING PRODUCTS

CROSS-REFERENCE TO RELATED APPLICATIONS

This application is a continuation of U.S. patent application Ser. No. 11/833,126 filed on Aug. 2, 2007 now abandoned, which application is a continuation of U.S. patent application Ser. No. 10/756,916 filed on Jan. 13, 2004, now abandoned, which is a continuation of International Application No. PCT/NL02/00473 filed on Jul. 15, 2002, which claims priority to The Netherlands Patent Application No. 1,018,541 filed on Jul. 13, 2001, all of which are incorporated herein by reference.

FIELD OF THE INVENTION

This invention relates to a device for treating products, in particular massaging meat products, comprising: at least one treatment section having a space for accommodating the products, which space comprises treatment means for treating the products; and discharge means for discharging the products from the treatment section. In this context, the term "massaging" is understood as meaning: subjecting products to mechanical influences and/or applying or introducing additives to or into products subjected to mechanical influences.

DISCUSSION OF THE PRIOR ART

A device of this type is known, for example, from German Patent Application No. 19,614,368. This device comprises a rotatable, essentially cylindrical drum with carrier profiles and arms having scoop-shaped ends. A curved discharge gutter is fixedly attached to the drum and always active during operation of the device.

Another known device is disclosed in The Netherlands Patent Application No. 9,201,490. This device comprises a substantially cylindrical or conical drum, the longitudinal axis of which is positioned horizontally or at an angle to the horizontal. In its interior, the drum has a massaging surface with a star-shaped cross section. Furthermore, guide means, comprising a helical plate element which is mounted around an axis of rotation and the outer edge of which is complementary to the massaging surface, are arranged in the drum, substantially inside the massaging surface.

When the device is being used, at least the massaging surface and the guide means are rotated about the longitudinal axis of the drum, which may but does not necessarily also rotate, and meat products which are to be massaged are successively fed to the drum at a feed end thereof. In the drum, the meat products slide over the tops of the star-shaped massaging surface and over one another, so that the structure of the meat products is changed and, for example, proteins are released from the meat. In addition, a massaging substance which is already present or has been added to the drum, such as a gas, liquid or a granular or pulverulent solid, or any desired mixture of two or more of these components, can be successfully distributed to and/or taken up by each meat product as a result of the massaging. The guide means guide the meat products from the feed end of the drum to an opposite discharge end, where the treated meat products leave the drum. The result is a continuously operating device.

A drawback of the device according to The Netherlands Patent Application No. 9,201,490 is that it lacks flexibility. The residence time of the products in the device is substantially fixed for a fixed rotational speed of the massaging surface and the guide means, and consequently different devices are required for products which require different residence times. This is because changing the rotational speed in order to change the residence time generally does not result in the desired product properties, since this also causes the mechanical loads on the products as they pass through the device to change. Therefore, the capacity is linked to the intensity of the treatment. Consequently, a long residence time will require a long drum, while a short residence time leads to a drum of limited length.

Another drawback of the known device is that only one type of massaging treatment, i.e. a defined mechanical load on the products which are to be massaged at a defined temperature, with a defined massaging substance and a defined residence time is possible in this device, so that in the case of products which have to be subjected to different massaging treatments, it is necessary for a plurality of devices to be positioned in succession.

A further drawback is that the massaging substance does not remain at a defined portion of supplied products, but rather comes into contact with all products which are moving past, with the result that there is a risk of cross-contamination.

Another disadvantage is that in particular small products can easily be damaged as a result of a part thereof passing into the gap between the helical plate element and the massaging surface.

Yet another drawback of the known device is that it is difficult to maintain and clean, since the possibilities of access to all parts of the interior of the drum are limited. When the helical plate element is removed from the drum for maintenance or cleaning, a working space is needed which is at least twice as large as the drum.

A further drawback is that the design of the known device requires a large amount of material in relation to the throughput which is achieved.

SUMMARY OF THE INVENTION

It is an object of the invention to provide a device, more particularly a massaging device, in which products can be treated in a flexible manner without the design of the device having to be changed. A further object of the invention is to prevent or at least reduce the risk of cross-contamination. Yet another object of the invention is to prevent damage to in particular small products in the treatment device. Another object of the invention is to significantly improve the possibilities for maintenance and cleaning of the treatment device.

To achieve one or more of these objects, the device according to the invention comprises discharge means which can be moved into an active and an inactive operating state. This measure makes it possible to adjust the residence time of the products in a treatment section as desired by moving the products into the treatment section when the discharge means are in an inactive operating state and moving the discharge means into an active operating state at the end of the desired residence time. This creates considerable flexibility with regard to use of the device for a wide range of products and applications. A modular structure becomes possible, since the dimensions of the drum do not determine for example the residence time any more, contrary to the prior art.

If a product is to undergo a plurality of different treatments, it is possible for various treatment sections to be arranged in succession, the discharge means in each case discharging the products to a subsequent treatment section. The products can undergo just a mechanical treatment per treatment section, and in addition a selected massaging substance may be supplied in an appropriate quantity. Obviously, it is also possible to carry out substantially the same type of treatment in different treatment sections, in which case the total treatment time of a product is the sum of the treatment times in the respective treatment sections. In this way, the capacity of the device can be varied.

To prevent massaging substance from leaking or splashing or escaping in some other way from a treatment section, it is possible to provide auxiliary means which, for example, seal the treatment section, limit the agitation of a liquid or granular or pulverulent substance located therein, guide or distribute products, or the like.

In a preferred embodiment, the discharge means can be moved between an active and an inactive position with the aid of an actuating device. For optimum flexible operation, it is preferable for each treatment section to be provided with its own actuating device. However, for simple operation it is also possible to opt for the use of an actuating device which is common to a plurality of treatment sections.

In a simple, inexpensive and reliable preferred embodiment, the actuating device comprises a rod which can be actuated from outside the device or a cam track mechanism. In another preferred embodiment, which is easy to control and reset, the actuating device comprises a piston-cylinder unit which makes it easy to achieve individual actuation for each treatment section.

The actuating device is preferably designed to generate a control signal, for example, a release signal which indicates that the treatment section has been emptied and is ready to receive products, after the discharge means of the treatment section have been moved into the active position. A feature of this type allows the treatment device to interact with a portioning device which is positioned upstream of it and does not feed a portion of products to the (first) treatment section until after the treatment section has emitted the required release signal. If the device comprises at least two treatment sections which the products are to pass through in succession, the actuating device is preferably designed to move the discharge means of the second treatment section into an active position in order for the second treatment section to be emptied before moving the discharge means of the first treatment section into the active position thereof. This prevents the products from the first treatment section from coming into contact with the products from the second treatment section, and consequently the treatments in the treatment sections do not interfere with one another. However, when the discharge means are adapted to discharge the products situated in the second treatment section separated from the products entering the second treatment section, then the actuating device of the massaging device preferably is designed to bring the discharge means of the first and the second treatment section into an active position for emptying the first and the second treatment section.

In a further advantageous embodiment, the treatment means comprise at least one massaging element, the discharge means interacting with the at least one massaging element in order to reach the active and the inactive position.

In a preferred embodiment of the device according to the invention, the treatment means are designed to be set in motion with the aid of a drive. For each treatment section, for the corresponding treatment means it is possible to provide an associated, separate drive, but it is also possible to provide a drive which drives the treatment means of a plurality of treatment sections simultaneously. In particular, the drive is such that the movement of the various treatment means of the different treatment sections can be set differently if desired, resulting in a very flexible massaging device.

The treatment means of the at least one treatment section of the device according to the invention are preferably designed to be rotated. The device according to the invention advantageously comprises at least two treatment sections, the different treatment means of the different treatment sections having a common bearing. For enabling the products an easy access to the treatment means, the bearing comprises a ring, a plurality of wheels coupled to the treatment means being movable along the circumference of the ring. The ring forms an effective access opening. The various treatment means of the various treatment sections can in particular be mounted on the same shaft, so that the device can easily be adapted for different use by adding or removing treatment sections to or from the bearing or shaft.

This also simplifies maintenance, assembly/dismantling and cleaning of the device. For a simple structure, the rotation of the treatment means preferably takes place relative to an essentially horizontally axis of rotation.

The treatment means preferably comprise at least one surface which is oriented at an angle to the direction of movement thereof. More particularly, the treatment means of a moveable, in particular rotatable, treatment section comprise a number of surfaces which are at an angle to one another and, as seen in cross section, form one or more preferably inwardly directed points. The products which are to be treated are carried along by moving points and then drop off them again. Adjusting the movement of the treatment section is responsible for determining the duration, nature and intensity of the mechanical load exerted on the products, which parameters are associated with the degree of filling of the treatment section, the movement patterns (which may change during the treatment) of the products, the distance covered by the products and the properties (which may change during the treatment) of the products, such as their stickiness. The movement of the various treatment sections can be set differently, so that products which are fed in succession to the various treatment sections undergo different treatments therein. On the other hand, a different treatment for each treatment section can also be obtained with the same movement of treatment sections with different internal structures.

In a preferred embodiment, the vertex angle of the points is at least approx. 45° C., and the points are arranged at a distance from one another. If the points are formed asymmetrically, movements of the points in different directions (for example opposite directions of rotation of a rotating treatment section) result in different mechanical loads being applied to the products. The dimensions, shape and vertex angle of the points may differ in one treatment section or between treatment sections.

In a preferred embodiment, the surfaces are integral with a wall of the treatment section, with the result that a simple manufacture of the wall from one or a few pieces of plate material is possible. In an advantageous embodiment, such a wall is at least partially detachable for a facilitated access to the interior of the treatment section for maintenance and cleaning.

In a preferred embodiment the at least one surface of the treatment means is movable along a stationary wall of the treatment section. Here, the surface may be part of a paddle. An edge of the at least one surface, the edge facing the wall, may be at a distance from the wall, the distance being zero or more than zero. In practice, the distance is selected such that a gap is created through which products cannot pass, but through which a massaging substance may pass. In an embodiment the at least one surface is hingable, the hinge axis being essentially parallel to said axis of rotation. Thus, said edge can be kept in contact with the stationary wall continuously. For this purpose, at least one spring member for driving the at least one surface to a predetermined hinge position.

In a preferred embodiment, the treatment means comprise massaging-substance feed means arranged in the space of the treatment section, for direct contact between the substance which is to be supplied by means of the massaging-substance feed means and the products. The quantity of massaging substance which is to be supplied in a treatment section is selected on the basis of the number and (current and future) properties of the products which are to be treated.

In another preferred embodiment, a peripheral wall of the space of treatment section is provided with perforations, a chamber, which is open at least on the side of peripheral wall, being formed outside the space, adjacent to the peripheral wall, in order to supply or discharge a treatment medium to or from the space via the perforations. It is thus possible, in a particularly simple manner, to achieve a treatment of products, in which case the perforations can ensure that the treatment medium is distributed through the space of the treatment section while the treatment medium is being supplied.

In a further preferred embodiment, the treatment means comprise means for the transfer of heat via a peripheral wall of the space of the treatment section. In this way, for certain products a direct contact between a heat or refrigeration source or a medium which releases heat or cold, on the one hand, and the products, on the other hand, can be avoided.

In a preferred embodiment, the treatment means comprise needles which project into the space of the treatment section and by means of which the surface of products can be treated, and the region below the surface, in which case it is possible both to apply exclusively mechanical changes to the product and to inject a treatment medium, if the needles are designed for this purpose. In a flexible preferred embodiment, in which the action of the needles can be varied, the needles can be moved in a controllable manner in their longitudinal direction.

In a preferred embodiment, the treatment section comprises a rotatable drum which defines said space.

In another preferred embodiment, the treatment means comprise a series of blades which are arranged in the space and are active in cutting products in the space in the direction of rotation. The treatment means may also comprise a rotatable roller which is arranged in the space and the axis of rotation of which is parallel to the axis of rotation of the drum, which roller acts to massage deformable products. The roller is preferably provided with grooves on its outer surface.

The discharge means preferably comprise a gutter, the outlet end of which is located outside the treatment section. The gutter collects products located in a treatment section, after which they are discharged via the discharge end of the gutter.

Preferably, the discharge means are designed, in their active operating state, to discharge both the products and the liquid and/or solid massaging substance located in the corresponding treatment section, with the result that the massaging substance and the products remain together, so that the risk of bacterial and/or chemical cross-contamination is minimal.

In another preferred embodiment, the discharge means are designed, in their active operating state, to discharge the products and to return the liquid and/or solid massaging substance located in the corresponding treatment section to this treatment section, in particular as a result of the discharge means being provided with perforations. This prevents massaging substance which has not adhered to products from being removed from the treatment section.

In a preferred embodiment, at least a part of a surface of the space of each treatment section is provided with a profile, such as ribs or pointed projections, in order for the surface to entrain the products.

The treatment(s) carried out in the device according to the invention may be combined with an excess-pressure, vacuum, piercing, cooking, steaming, cooling and/or gas treatment by providing suitable features, which are known per se, in the device for this purpose. Furthermore, a powder-coating unit may be incorporated in a treatment section.

The claims and advantages will be more readily appreciated as the same becomes better understood by reference to the following detailed description and considered in connection with the accompanying drawings in which like reference symbols designate like parts, or parts with the same or similar function.

BRIEF DESCRIPTION OF THE DRAWINGS

FIGS. 5a and 5b show perspective views of the operation of a second discharge means in the device according to the invention;

FIGS. 6a and 6b show perspective views of the operation of a third discharge means in the device according to the invention;

FIGS. 7a and 7b shows perspective views of the operation of a fourth discharge means in the device according to the invention;

FIG. 10a in a diagrammatical cross-section shows a part of the massaging device according to FIG. 9a;

FIGS. 10b and 10c illustrate in more detail alternative embodiments of the part of the massaging device according to FIG. 10a;

FIGS. 10d, 10e and 10f in perspective view illustrate still other embodiments of the part of the massaging device according to FIG. 10a;

FIG. 12b shows a perspective view of a partially cut-away alternative treatment section for the treatment which has been illustrated in relation to FIG. 12a;

FIG. 18b shows a perspective view of a partially cut-away alternative treatment section for performing the treatment which has been illustrated in relation to FIG. 18a;

FIG. 19b shows a perspective view of a partially cut-away alternative treatment section for performing the treatment which has been illustrated in relation to FIG. 19a;

DESCRIPTION OF THE PREFERRED EMBODIMENTS

Figure 1:
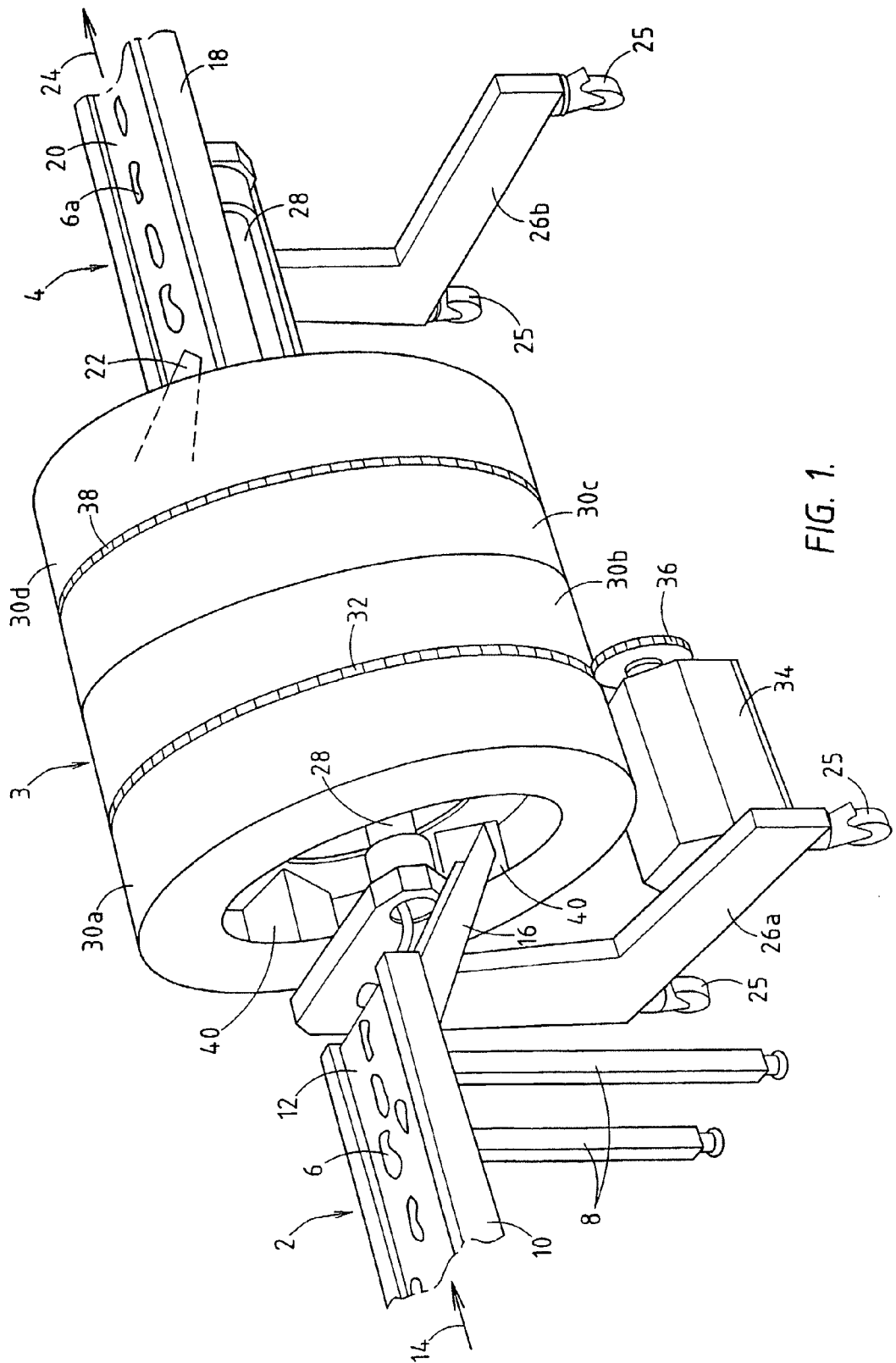
FIG. 1 shows a perspective view of a massaging device according to the invention, arranged in line for the processing of products.

FIG. 1 shows a supply line 2 for starting products 6, in particular meat products, a massaging device 3 and a discharge line 4 for products 6a which have been treated by the massaging device 3. The supply line 2 comprises a frame 10 which is arranged displaceably on legs 8 and in which there is a conveyor belt 12 or the like by means of which the products 6 can be moved in the direction indicated by arrow 14. At the end which faces the massaging device 3, the supply line 2 comprises a gutter 16, by means of which products 6 which drop off the conveyor belt 12 are fed into the massaging device 3.

The discharge line 4 comprises a frame 18, in which a belt conveyor 20 or the like is arranged, by means of which the products 6a released by the massaging device 3 via a gutter 22 can be moved in the direction indicated by arrow 24 for a further processing operation. The supply line 2 and the discharge line 4 do not form part of the device according to the invention.

The massaging device 3 comprises a frame which can be displaced on lockable castors 25 and has a pair of substantially C-shaped supports 26a, 26b, which are connected to one another by means of a hollow shaft 28. One or more rotatable treatment sections 30a, 30b, 30c, 30d are mounted on the shaft 28, each of these treatment sections having a U-shaped cross section and a structure which will be explained in more detail with reference to the following Figures. The treatment sections 30a and 30b are connected to one another, with a toothing 32 being provided between these treatment sections, in which toothing the teeth of a gear wheel 36 connected to a drive motor 34 mesh in order to drive the treatment sections 30a and 30b at one or more predetermined speeds, and in a predetermined direction, or alternately in opposite directions. The drive motor 34 is connected to the support 26a. In the embodiment shown, the treatment sections 30a and 30b are fixedly connected to the treatment sections 30c and 30d. However, it is also possible for the treatment sections 30c and 30d to be drive independently of the treatment sections 30a and 30b, for which purpose toothing 38 is provided between the treatment sections 30c and 30d. An associated drive motor (not shown in more detail) may be arranged on the support 26b. It will be clear that the treatment sections 30a-30d may also be set in rotary motion in other ways, and if appropriate each separately, independently of the other treatment sections, and if appropriate in different directions, for example by means of a belt drive or by means of a drive shaft which is positioned in the hollow shaft 28 in order to drive the various treatment sections, if desired at different speeds and in different directions.

Instead or in addition to being mounted on the shaft 28, the treatment sections may also be mounted, on their underside, on shafts or rollers, as shown in the publication NL-A-9201490. Furthermore, it is possible for the treatment sections to be mechanically connected to one another and to be coupled at the ends—for example via a disc or the like—to a shaft or bearing, whereby a central shaft in the treatment sections can be avoided.

At least one treatment section is provided with treatment means comprising massaging means, which in this case comprise massaging elements 40 which are triangular in cross section and are distributed along the periphery in the interior of each treatment section 30a-30d. The distribution of the massaging elements 40 along the periphery is not necessarily evenly. It is also possible for there to be only one massaging element 40 for each treatment section 30a-30d, or for massaging elements to be absent altogether if the treatment which is to be carried out does not require massaging elements. The massaging elements 40 may also be shaped differently, for example with a semicircular cross section, or may have different dimensions.

Figure 1A:
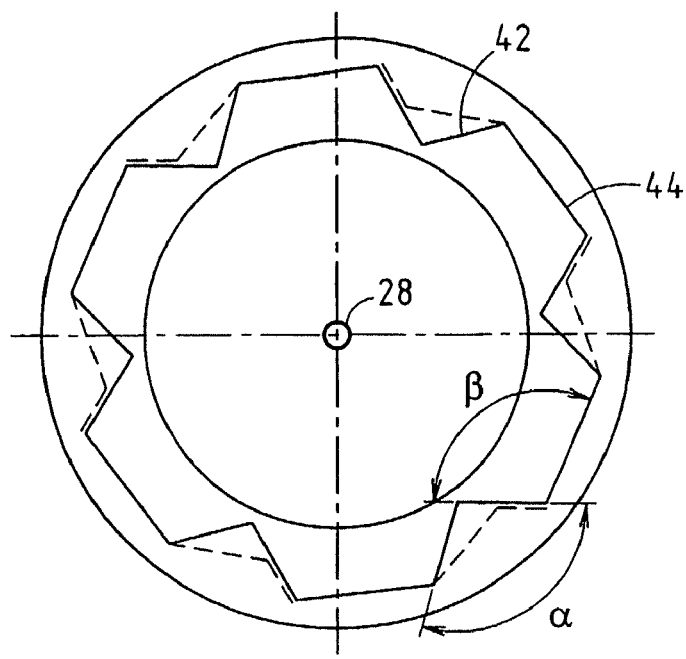
FIG. 1a shows a diagrammatic cross section through a treatment section.

FIG. 1a illustrates the interior of a cylindrical treatment section with six massaging elements 42 which are formed by surfaces which are at an angle α of 105° C. with respect to one another. The massaging elements 42 are arranged at a regular distance from one another, a surface 44 which extends between two successive massaging elements 42 being oriented at an angle β of 112.5° with respect to the adjacent surfaces of the massaging elements 42. When the treatment section is being used through rotation about the shaft 28, products are carried a certain distance upwards by the massaging elements 42, after which the products drop back onto one of the surfaces 44 or onto another massaging element 42.

The massaging elements may also be formed asymmetrically, for example as indicated by dashed lines in FIG. 1a. The result of this is that the mechanical treatment of products when the massaging elements rotate in one direction differs from the mechanical treatment when the massaging elements rotate in the opposite direction.

Figure 1B:
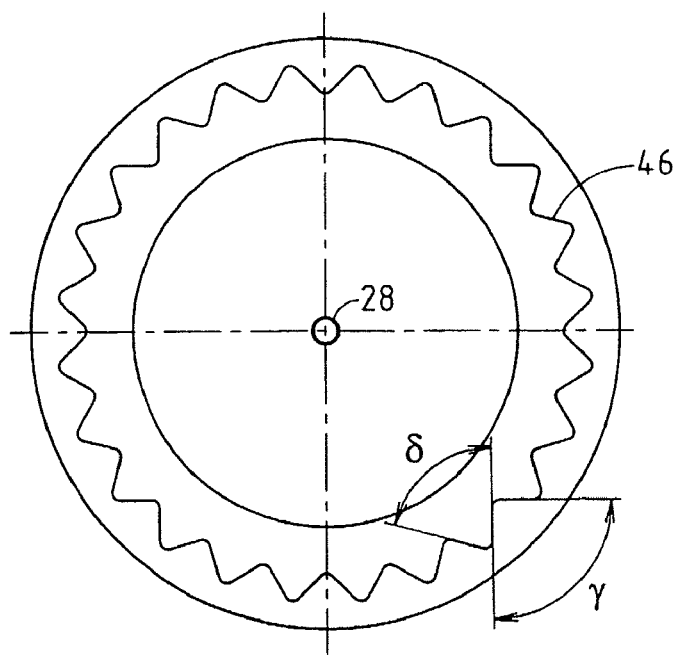
FIG. 1b shows a diagrammatic cross section through another treatment section.

FIG. 1b illustrates the interior of a cylindrical treatment section with twenty-four massaging elements 46 which are formed by surfaces which are at an angle γ of 90° with respect to one another. Two adjacent surfaces of successive massaging elements 46 are oriented at an angle δ of 75° with respect to one another. When the treatment section shown in FIG. 1b is in use products roll over successive massaging elements 46 through rotation about the shaft 28.

Figure 1C:
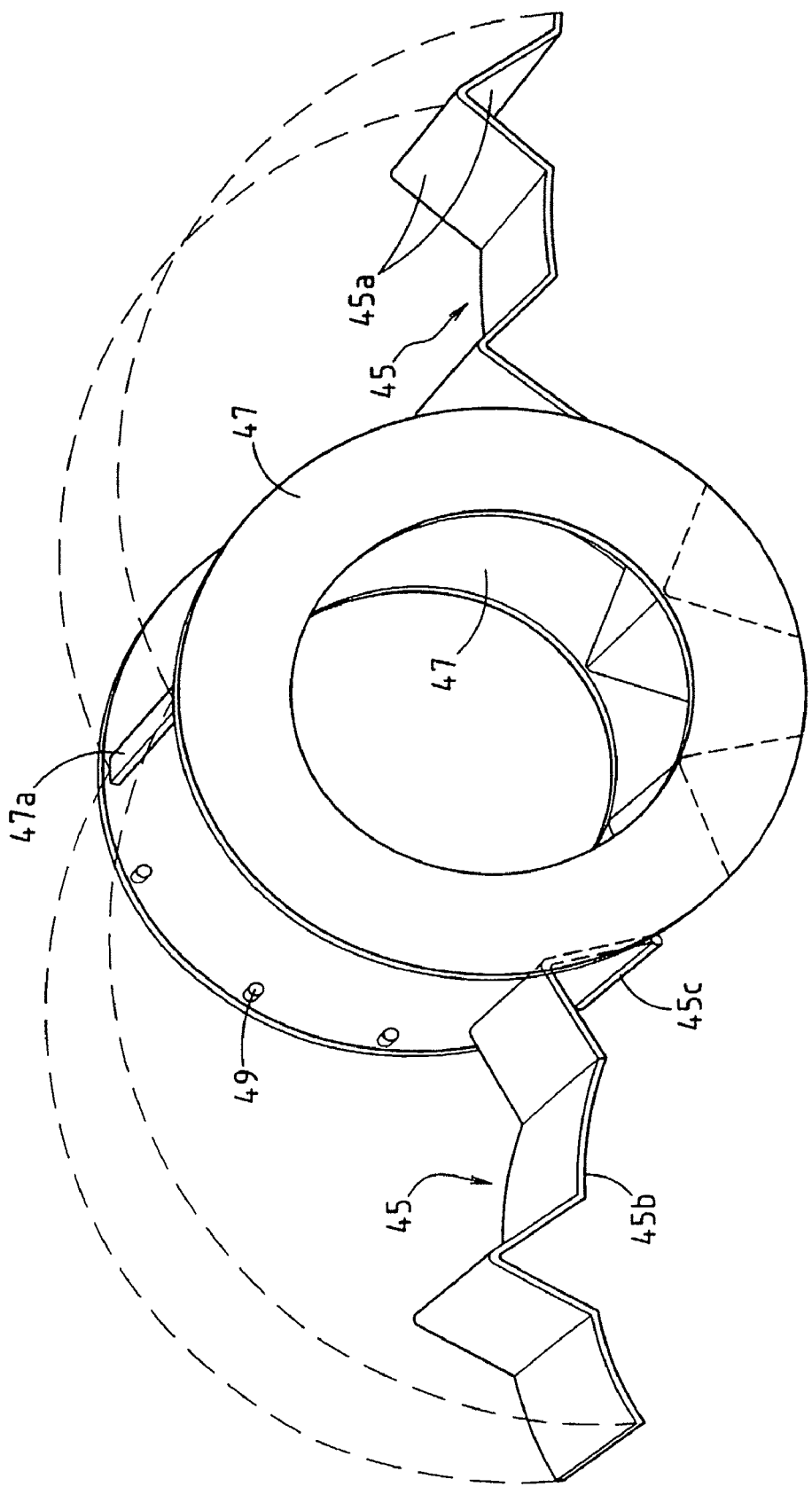
FIG. 1c shows a perspective view of a treatment section with movable massaging elements.

As FIG. 1c illustrates, detachable curved elongated plate-shaped parts 45 may be provided at the circumference of a treatment section. The plate-shaped parts are shaped such that they define both massaging elements 45a and wall parts 45b situated between the massaging elements 45a of the treatment section. Preferably, the plate-shaped parts 45 are made from a flexible material, but it is also possible to produce the plate-shaped parts 45 essentially rigid. The plate-shaped parts 45 are hingably coupled at an end 45c with the remaining part of the treatment section. For a rigid arrangement of ring-shaped side walls 47 relative to each other a number of bars 47a extending transversely to the plane of a side wall 47 to an opposite side wall 47 may be provided. The bars 47a may also serve as a point of attachment for ends of the plate-shaped parts 45, for which purpose an appropriate locking known as such may be provided. For fixing the position of each plate-shaped part 45 relative to the side walls 47 between the hingably coupled end 45c and one of the bars 47a, cams 49 may be provided to which the plate-shaped parts 45 abut near their bending lines. At their edges, the plate-shaped parts are provided with suitable sealing means, if necessary in relation to the massaging substance to be used in the treatment section.

Figure 1D:
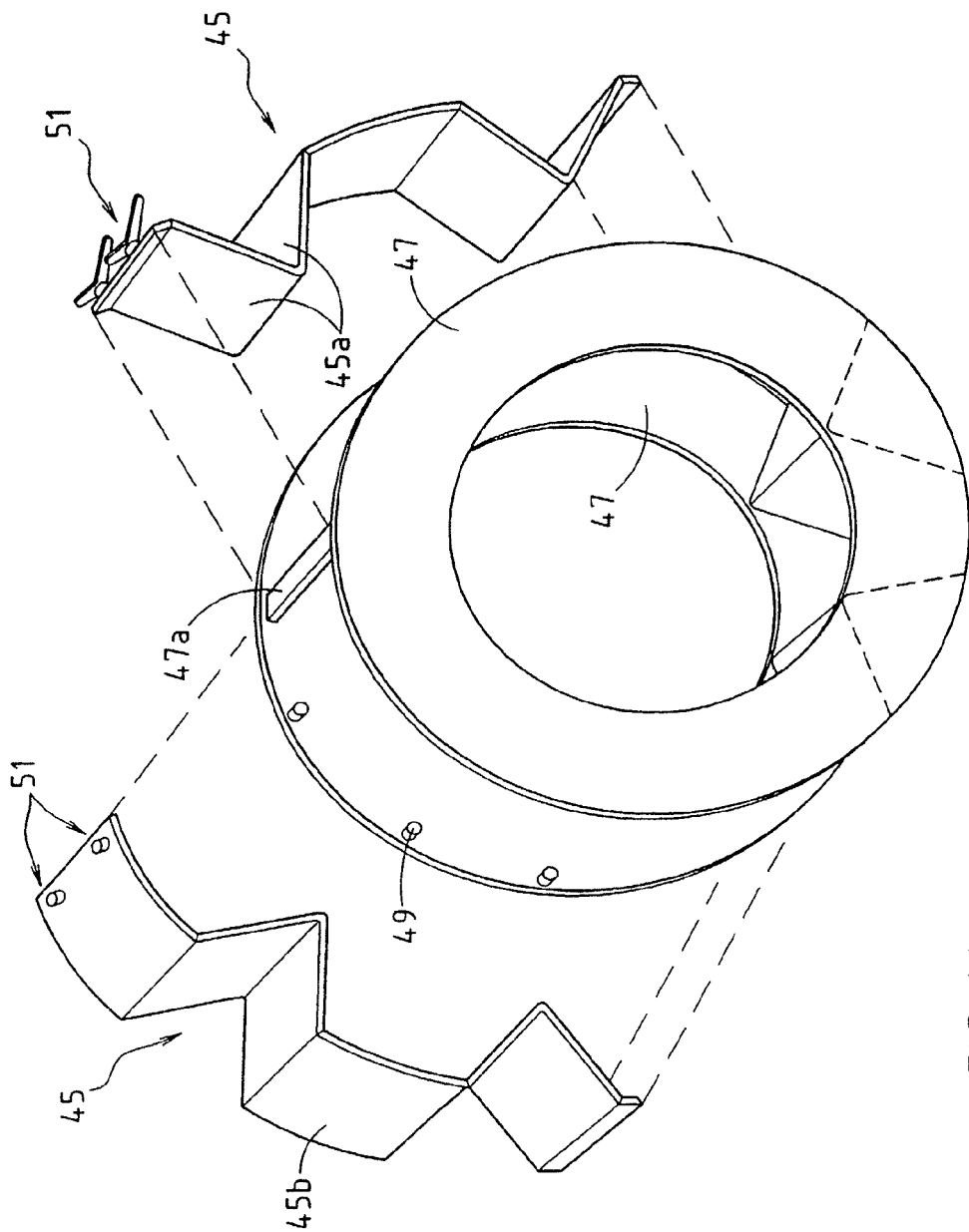
FIG. 1d shows a perspective view of a treatment section with removable massaging elements.

FIG. 1d illustrates a modification of the embodiment according to FIG. 1c. According to FIG. 1d, the plate-shaped elements 45 are completely removable. A fixing of the plate-shaped elements 45 to the side walls 47 may for example be made at the location of the bars 47a by means of one or more speed couplings 51, which by the way may also be used in the embodiment of FIG. 1c.

Figure 2:
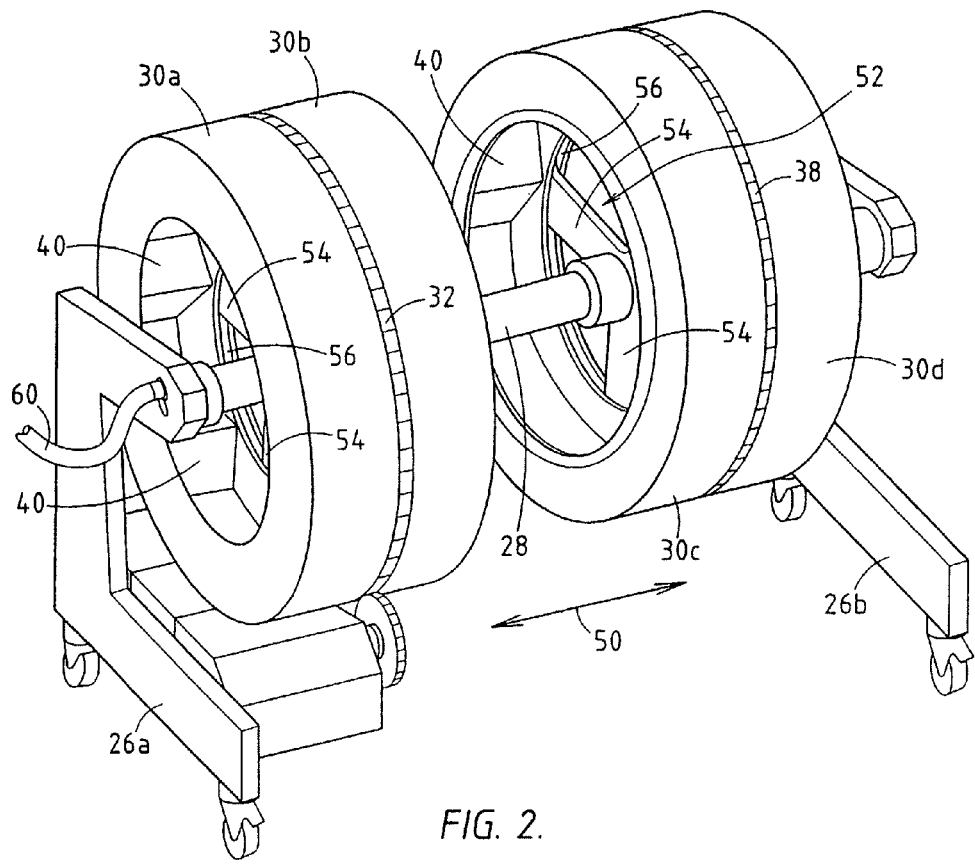
FIG. 2 shows a perspective view of the massaging device shown in FIG. 1 in a different operating state.

As shown in FIG. 2, the treatment sections can be displaced along the shaft 28 in the directions indicated by double arrow 50, for example for the purpose of cleaning or maintenance, so that the treatment sections are readily accessible. In the embodiment shown, the treatment sections 30c and 30d, and also the treatment sections 30a and 30b, are connected to a support 52 with three spokes 54. The spokes 54 are connected to a flat ring 56 which, on its outer circumference, bears the sets of toothing 32 and 38, respectively. The connection between at least one of the supports 26a, 26b and the shaft 28 is releasable in order for treatment sections to be removed or added as required.

Figure 3:
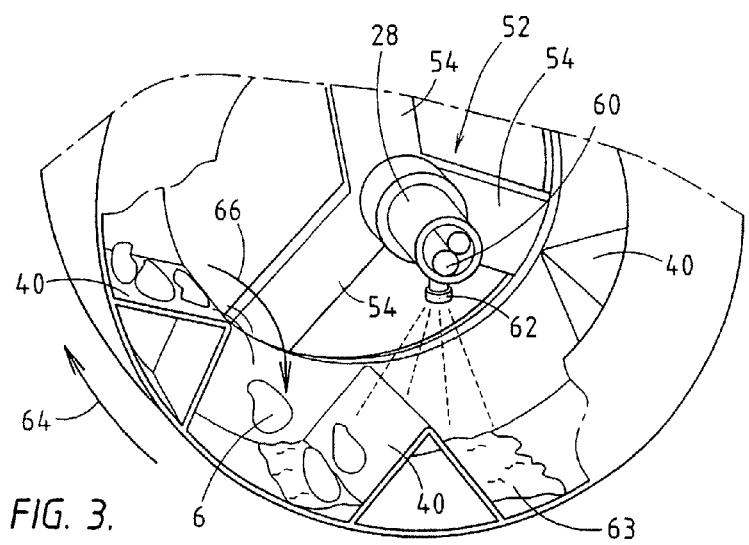
FIG. 3 shows a perspective view of a part of the device shown in FIG. 1.

As illustrated in FIGS. 2 and 3, the hollow shaft 28 includes one or more lines 60 which are in communication with one or more spray heads 62 which are arranged releasably on the shaft 28, in one or more treatment sections. One or more different massaging substances can be introduced into a treatment section via the one or more lines 60. FIG. 3 illustrates the spraying of a massaging liquid 63 into a treatment section, with a quantity of massaging liquid 63 present at the bottom of the treatment section. When the treatment section rotates about the shaft 28, in the direction indicated by arrow 64, the products 6 are carried upwards by the massaging elements 40, and then, under the force of gravity, slide back off the massaging elements 40 and tumble back down into the massaging liquid 63. Arrow 66 illustrates this phenomenon, during which the products, as a result of dropping into the treatment section, undergo a mechanical treatment and take up massaging liquid 63. If no massaging substance is fed into the treatment section, a mechanical treatment is all that takes place therein.

It will be clear that the spray head 62 or a similar arrangement can also be used to clean the treatment section by introducing a cleaning agent into the treatment section after it has been used and then rinsing it.

Figure 4B:
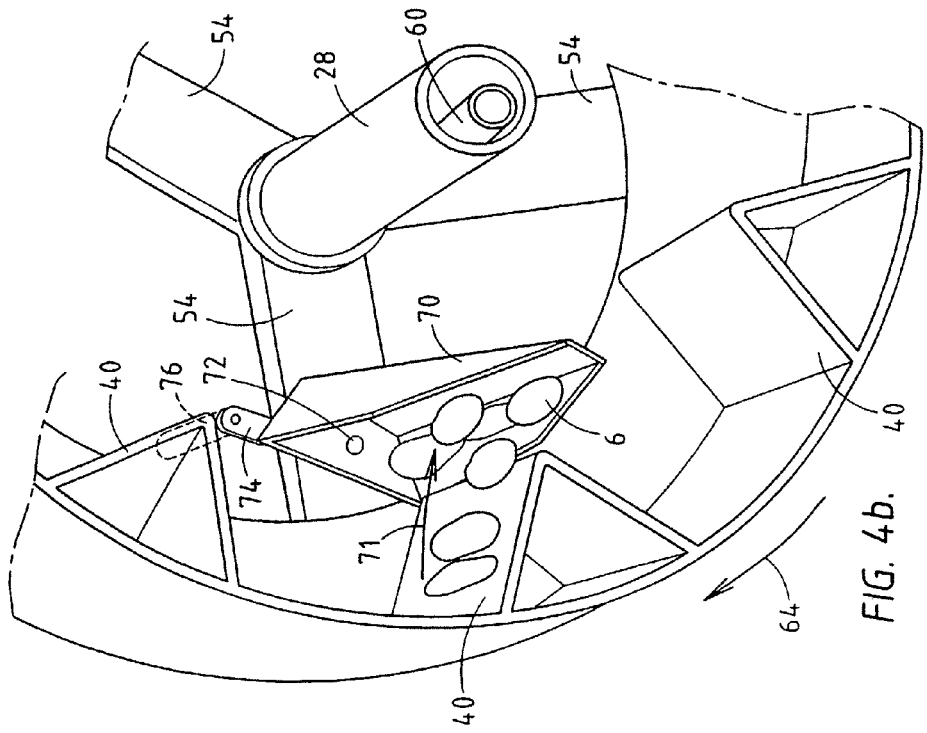
FIGS. 4a and 4b show perspective views of the action of the first discharge means in the device according to the invention.
Figure 4A:
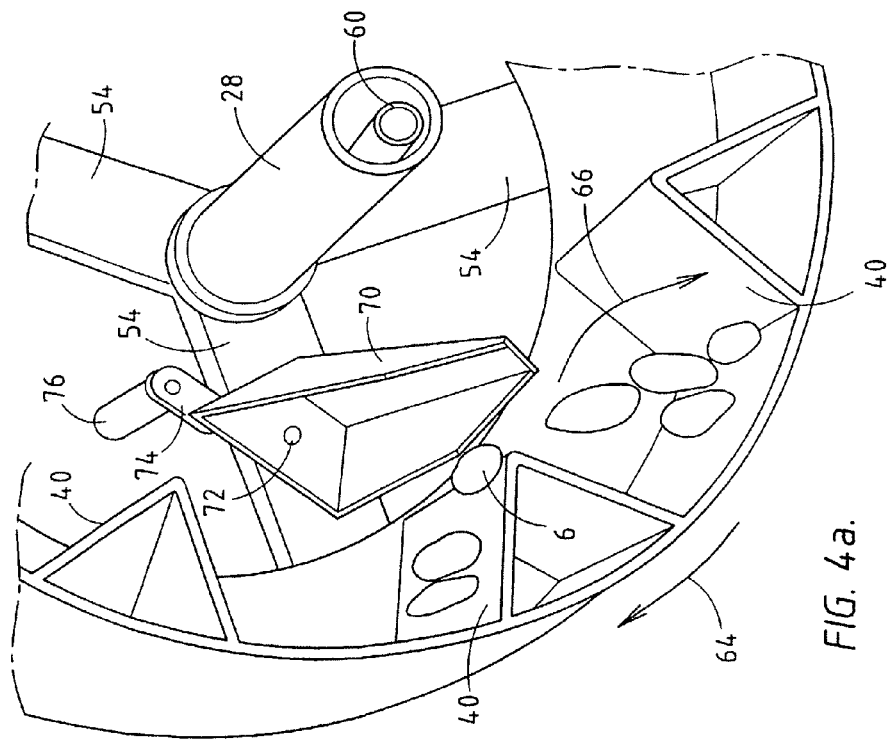

FIGS. 4a and 4b once again illustrate how the products 6 drop in a treatment section. An elongate, gutter-like discharge member 70, which in FIG. 4a is in an inactive position and in FIG. 4b is in an active position, is arranged on one of the spokes 54. From the spoke 54, the discharge member 70 extends substantially in the direction of the shaft 28 to beyond an end of the treatment section. In the inactive position, the products 6 move past the discharge member 70. In the active position, in which an edge of the discharge member 70 bears against a massaging element 40, the products 6, when the treatment section is moving in the direction indicated by the arrow 64, move into the discharge member 70, as indicated by arrow 71. Under the force of gravity, the products 6 slide along the discharge member 70 in the longitudinal direction and move out of the treatment section, either into a subsequent treatment section or onto the discharge line 4 (FIG. 1).

The discharge member 70 is displaceably connected to the spoke 54, it being possible for a connecting pin 72 to move along the spoke 54, while the discharge member 70 can also pivot about the connecting pin 72. The discharge member 70 can be moved out of the inactive position into the active position with the aid of an arm 74 which is connected to a rod 76. The rod 76 can be used exclusively to actuate the discharge member 70, but may also be coupled to one or more discharge members of other treatment sections in order to actuate a plurality of discharge members simultaneously. A displacement of the rod 76 for the purpose of actuating one or more discharge members takes place, for example, at an end of the massaging device 3 at the location of the support 26a or 26b, as a result of one end of the rod 76 being brought into contact with a guide or the like, as indicated below, for example in FIGS. 6a and 6b, by 102.

It will be clear that the discharge member 70 can be displaced between its inactive position and its active position in numerous different ways. A translational movement, a rotary movement or a combination of the two movements are possible. If the discharge member is mounted fixedly on the spoke 54 in the active position, the products will be discharged from the treatment section after at most one revolution of the treatment section.

It is not essential for the discharge member 70 to interact with a massaging element 40; the discharge member 70 may also interact with another wall part of the treatment section in order for products to be optionally discharged from the treatment section.

Figure 4C:
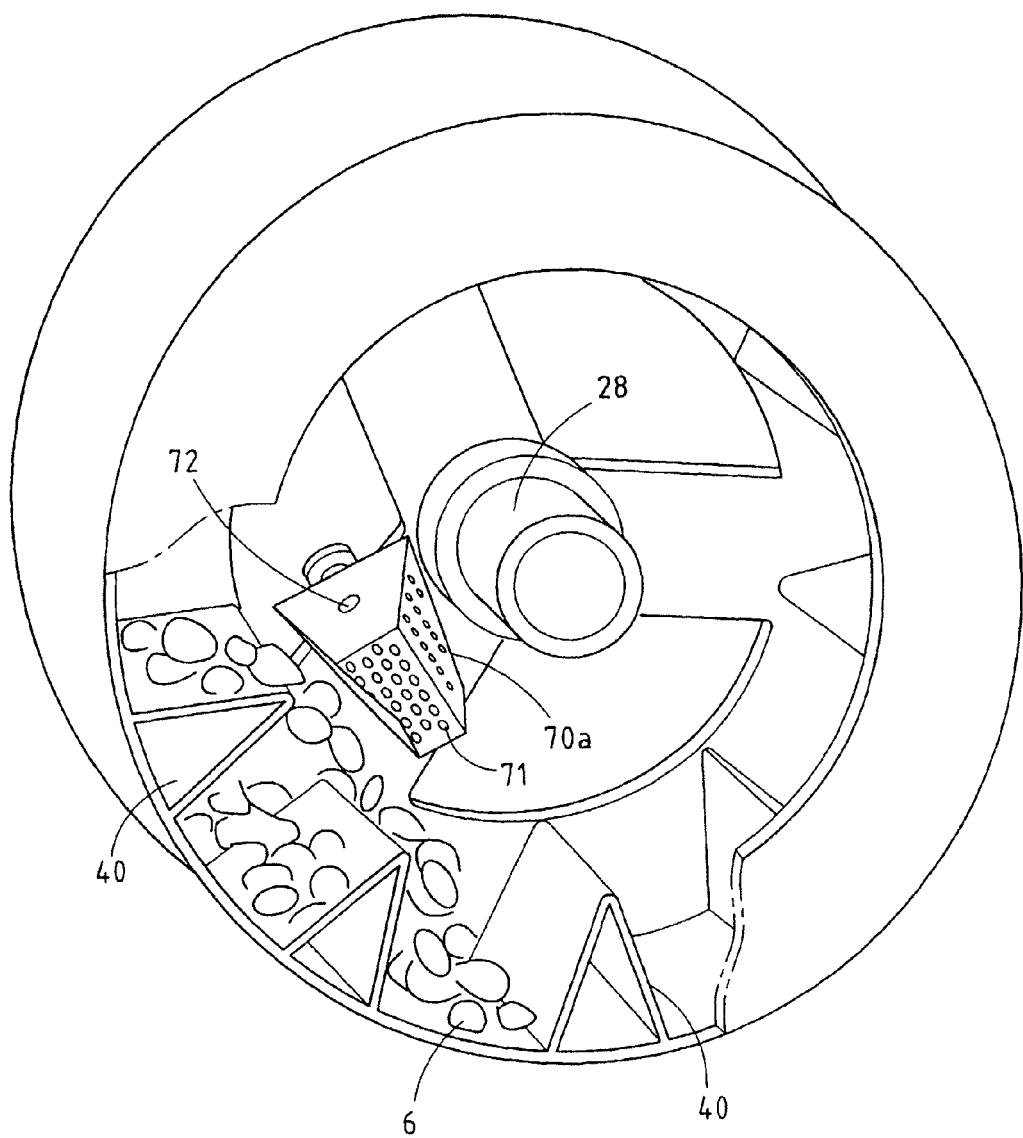
FIG. 4c shows a perspective, diagrammatic illustration of a treatment section with an alternative embodiment of the first discharge means.

FIG. 4c shows a treatment section with a discharge member 70a which is substantially in gutter or scoop form and is at least in part provided with perforations 71 which are situated in the bottom part, as seen in the Figure, and two opposite side parts of the discharge member 70a. When products 6 are being discharged through the discharge member 70a when the latter is in its active position, the perforations 71 make it possible for excess massaging substance which has been entrained by the products 6 to be discharged back into the space of the treatment section via the perforations 71.

The massaging elements 40 of the treatment section shown in FIG. 4c comprises V-shaped elements, the constituent plates of which are arranged at an angle of approx. 45° with respect to one another.

FIGS. 5a and 5b illustrate an actuation of the discharge member 70 with the aid of a piston-cylinder unit 80. The piston-cylinder unit 80 is connected pivotably, about a pin 82, to a cam 84 which is fixedly connected to the spokes 54. An end of the piston rod 86 is connected, in such a manner that it can pivot about a pin 88, to an arm 90 arranged on the discharge member 70. As a result of the piston-cylinder unit 80 being energized in a suitable way via an energizing line 92 guided inside the shaft 28, the discharge member 70 is moved into its inactive or active position, as indicated in FIGS. 5a and 5b, respectively. As a result of various discharge members of various treatment sections being coupled to one another, for example by means of a rod, a single piston-cylinder unit 80 for actuation of a plurality of discharge members suffices.

FIGS. 6a and 6b illustrate an actuation of the discharge member 70 with the aid of a cam track mechanism 94. For this purpose, the discharge member 70 is provided with an arm 96, on which a wheel 98 is arranged in such a manner that it can rotate freely. The wheel 98 is guided in a cam track 100 of an actuating plate 102. The actuating plate 102 can be rotated about the shaft 28, independently of the movement of the treatment section, from the position shown in FIG. 6a into the position shown in FIG. 6b, with the result that the discharge member 70 is moved from its inactive position into its active position. If various discharge members of various treatment sections are coupled to one another, for example by a rod, a single cam track mechanism 94 for actuation of a plurality of discharge members suffices.

FIGS. 7a and 7b illustrate an operating principle in which the discharge member 70 is in an inactive position when the treatment section rotates in the direction indicated by arrow 110, while the discharge member 70 is in an active position when the treatment section rotates in the direction indicated by arrow 64. In this case, the discharge member 70 can be actuated via the connecting pin 72, for example by means of a guide in the form of the guide plate 102 which has already been shown with reference to FIGS. 6a and 6b.

In this embodiment with alternating directions of rotation, it is also possible for the discharge member 70 to be mounted in a fixed position on the spoke 74, in the position shown in FIG. 7b. In that case, when the treatment section rotates in the direction indicated by the arrow 110, no products 6 will be discharged from the treatment section, unlike the situation when it rotates in the direction indicated by arrow 64.

Since the discharge member can be moved into the inactive or the active position as desired, it is possible to select a treatment time in a treatment section which is optimal. If the actuation of each discharge member is selected to be independent of that of the other discharge members, the treatment in each treatment section can be carried out independently of the treatments in the other treatment sections. This results in a very flexible massaging device which can operate continuously and in-line.

Figure 8:
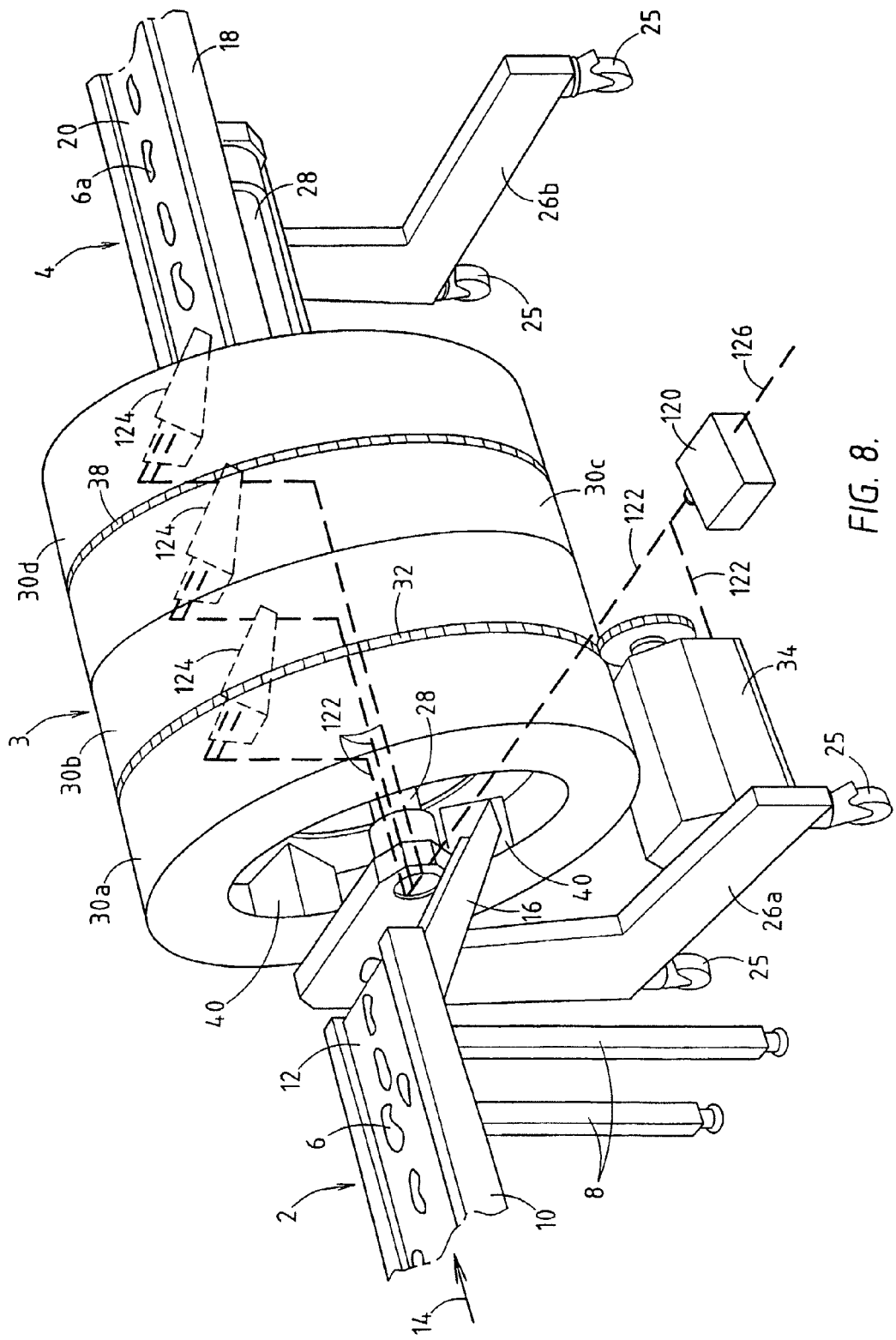
FIG. 8 shows the massaging device illustrated in FIG. 1, with a diagrammatic illustration of a control for discharge means.

The arrangement which is shown in FIG. 8 substantially corresponds to that shown in FIG. 1. FIG. 8 diagrammatically indicates that a computer or other control device 120 can move discharge members 124 into an active or inactive position, via one or more electric, hydraulic or pneumatic lines, symbolized by dashed lines 122, in order for products to be discharged from a treatment section and fed to a subsequent treatment section or for products to be discharged from the massaging device 3. Furthermore, the control device can be used to control the drive motor 34 and any other drives of other treatment sections. Signals which, for example, contain information about the timing of the actuation of the discharge members 124 or about a parameter which has been measured in or outside the massaging device and influences the control of the discharge members 124 or the drive motor 34, can be fed to the control device 120 via a line 126.

In some of the following Figures, a discharge member has been omitted for the sake of clarity yet may nevertheless in actual fact be present.

FIGS. 9a-9e show (a part of) a massaging device with a semi-cylindrical lower wall 101, which at two ends is connected to end walls 103 with a semi-circular shaped upper edge. Together the lower wall 101 and the end walls 103 form a tank 105 in which three treatment sections are formed by two semi-ring shaped partitions 107. In each treatment section, treatment means 109 are arranged. Each of the treatment means 109 comprise two support rings 111, which are provided along their circumference with fingers for carrying scoop-shaped paddles 113, for creating connections between support rings 111 of different treatment means 109, and for mounting a number of grooved wheels 115 which in turn mount the treatment means 109 in rings 117. Such rings 117 preferably are situated at the location of the end walls 103, and possibly also at the location of the partitions 107. Of course, it is also possible to mount the wheels 115 directly on the semi-circular shaped upper edges of the end walls 103 and/or the partitions 107, using the force of gravity. In that case, the rings 117 are absent.

The tank 105 may be provided with one or more discharges 105a for removing massaging substances from the treatment sections, e.g. for a cleaning of the massaging device.

The paddles 113 primarily are intended to be moved in the direction of arrow 119. The plane of the paddles 113 is at an angle to the (tangent to the) direction 119 of movement of the paddles 113. Thus, the paddles 113 can take products to be treated along over some distance, after which the products fall off the paddles 113 again by the changing orientation of the paddles 113.

Figure 9A:
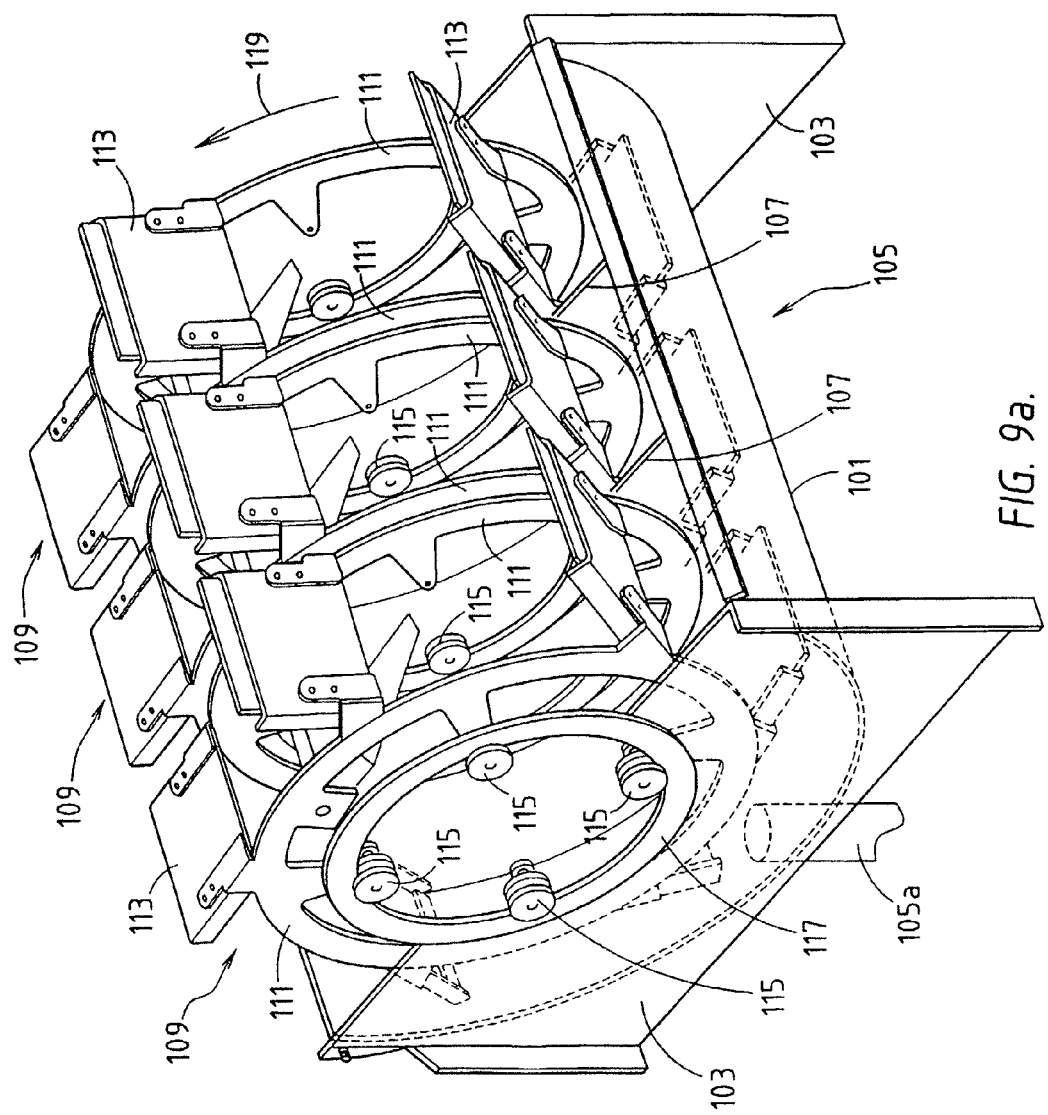
FIG. 9a in perspective view shows some parts of an alternative massaging device according to the invention.
Figure 9B:
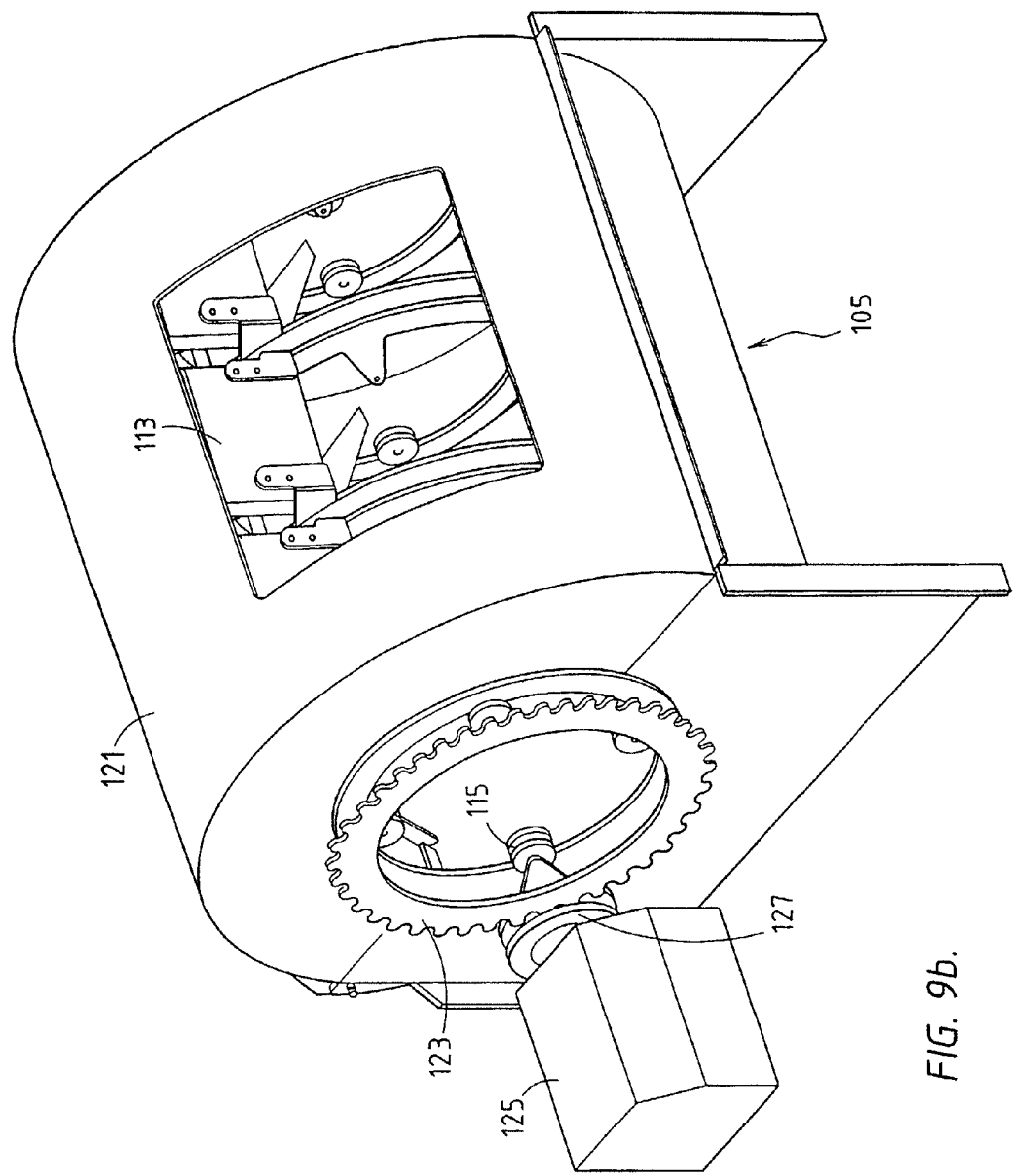
FIG. 9b in perspective view illustrates a drive of the massaging device according to FIG. 9a, in closed condition.

As shown in particular in FIG. 9b, the massaging device may be provided with a lid 121 which, along a lower edge thereof, is hingably connected to the tank 105, and is provided with a window. It is also indicated how the treatment means 109 can be driven in rotation at an end of the massaging device: one or more of the wheels 115 and/or fingers of the adjacent support ring 111 are connected to a toothed ring 123 with external toothing. An electric, pneumatic or hydraulic motor 125 drives a gear-wheel 127 engaging the toothed ring 123. A single drive suffices for the complete massaging device if the treatment means 109 of the various treatment sections are connected to each other. Of course, in other cases the treatment means of each treatment section may be driven separately.

Figure 9C:
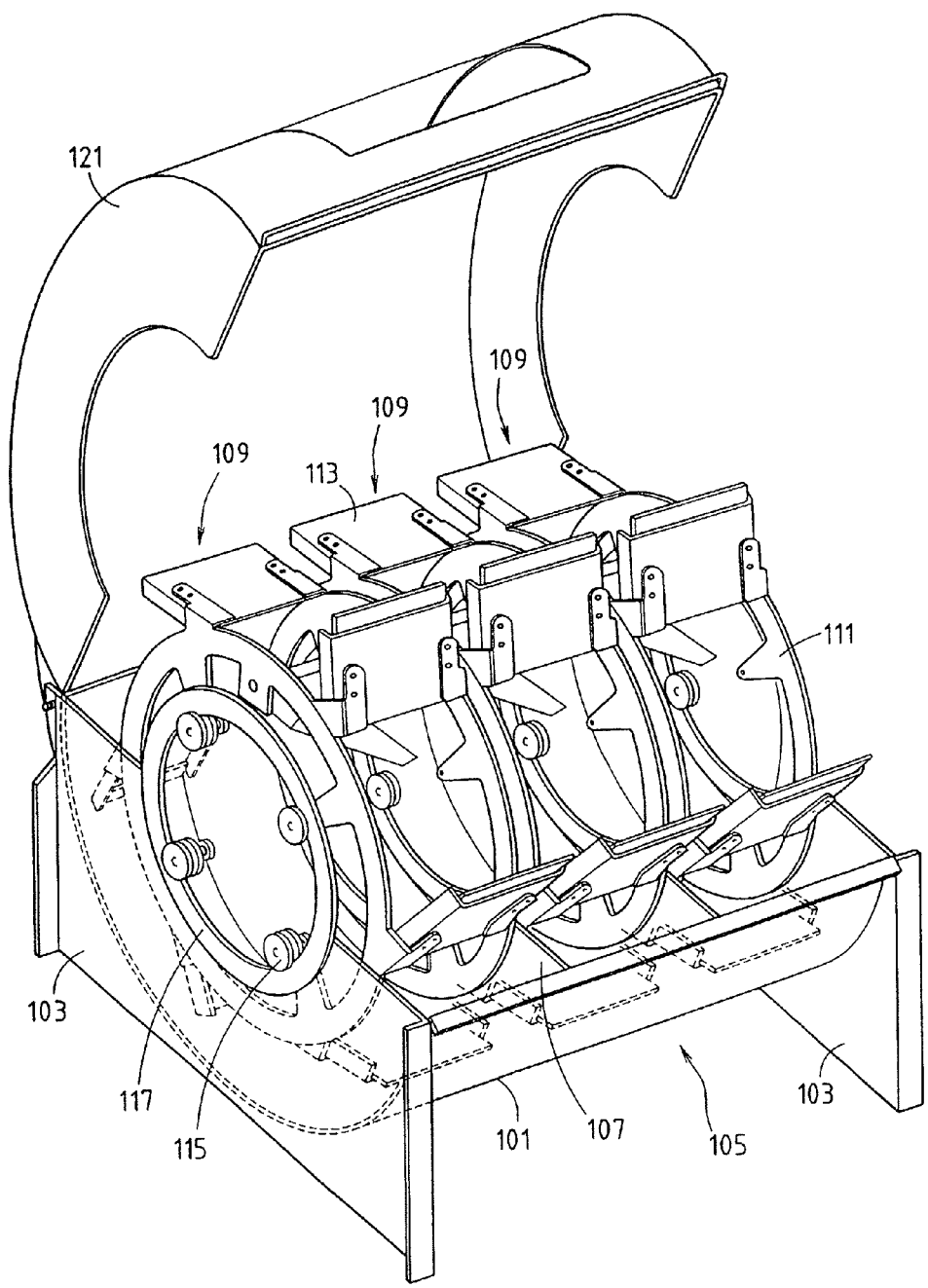
FIG. 9c in perspective view illustrates the massaging device according to FIG. 9b, in open condition.
Figure 9D:
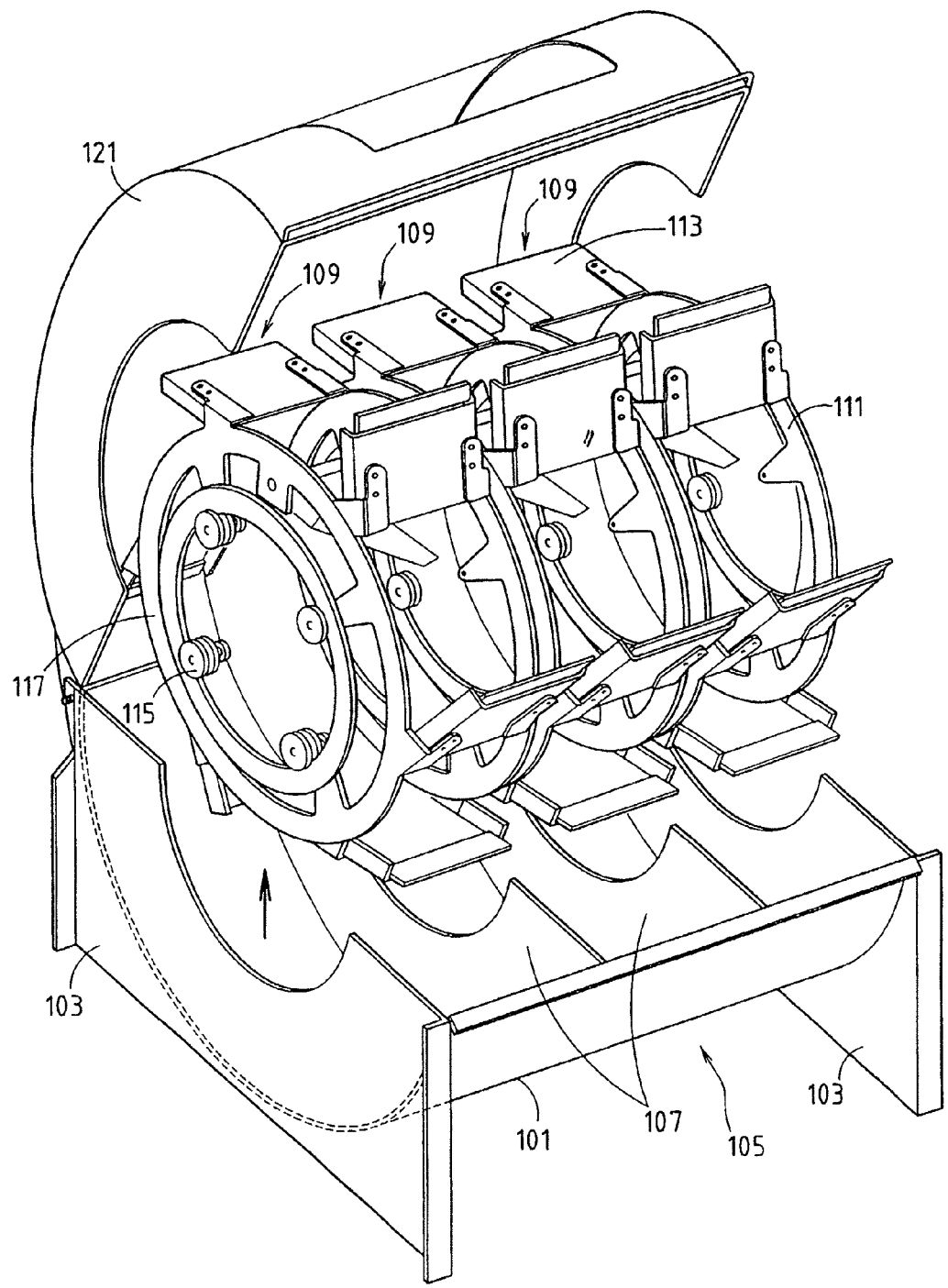
FIG. 9d in perspective view illustrates another embodiment of the massaging device according to FIG. 9c.
Figure 9E:
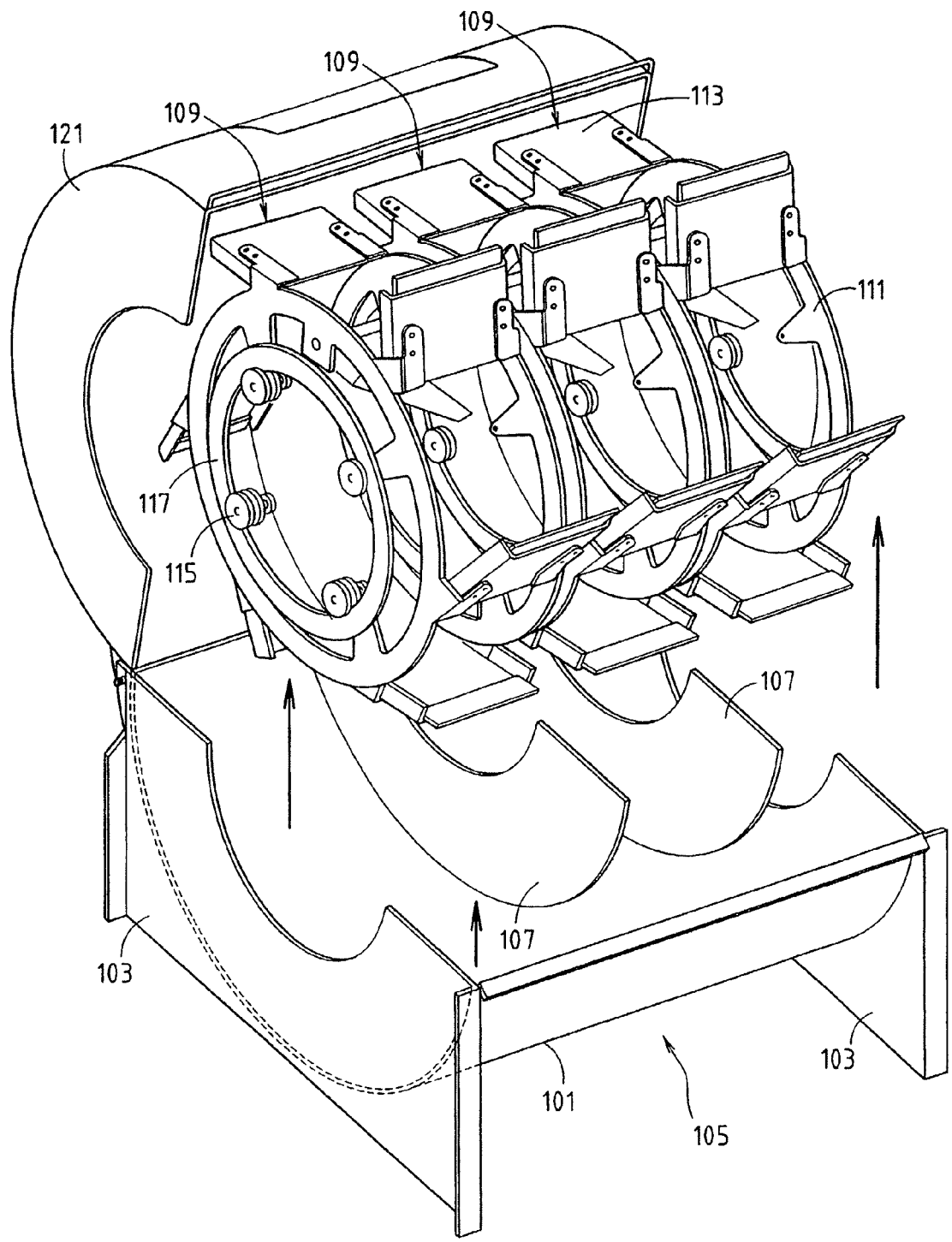
FIG. 9e in perspective view shows the massaging device according to FIG. 9d in another condition.

As illustrated in particular in FIGS. 9c, 9d and 9e, a simple maintenance and a simple cleaning of the massaging device are possible by virtue of the provision of the hingable lid 121 (FIG. 9c), the possibility to move the treatment means 109 of one or more treatment sections relative to the tank 105 and to possibly take them out of the massaging device (FIG. 9d) essentially in the direction indicated by the arrow(s), and to remove the partitions 107 from the tank 105 (FIG. 9e). The treatment means 109 can for example be moved by human power, an external lifting device, or a manipulator. Also a provision, such as a lever construction, can be made to the massaging device itself for moving one or more of the treatment means 109 with respect to the tank 105.

FIG. 10a illustrates a position of a paddle 113 relative to the lower wall 101. An edge of the paddle 113, preferably made from a flexible and wear-resistant material, at least partially is in contact with the lower wall 101, causing both the products 6 and the massaging substance 63 in front of the paddle 113 to be stowed up and taken along at a movement of the paddle 113 in the direction of the arrow 119, just to fall down again via the opposite edge of the paddle 113 after some distance, after the paddle 113 has passed a horizontal orientation.

When the paddles 113 are moved in an opposite direction to the one indicated by the arrow 119, massaging substances, such as liquids or granular or pulverulent solids, collecting in the tank 105 at the wall thereof can be removed from a treatment section, for example through a discharge 105b which can be closed in a manner which is not shown in further detail.

FIG. 10b shows in more detail again the situation at the edge of the paddle 113 which is in contact with the lower wall 101. FIG. 10c shows another position of said edge with respect to the lower wall 101, in which the edge is situated at a predetermined distance from the lower wall, such that the massaging substance 63 can pass the paddle 113, but the products 6 cannot pass the paddle 113. Thus it is possible to bring about a separation between the products 6 and the massaging substance 63.

Figure 10E:
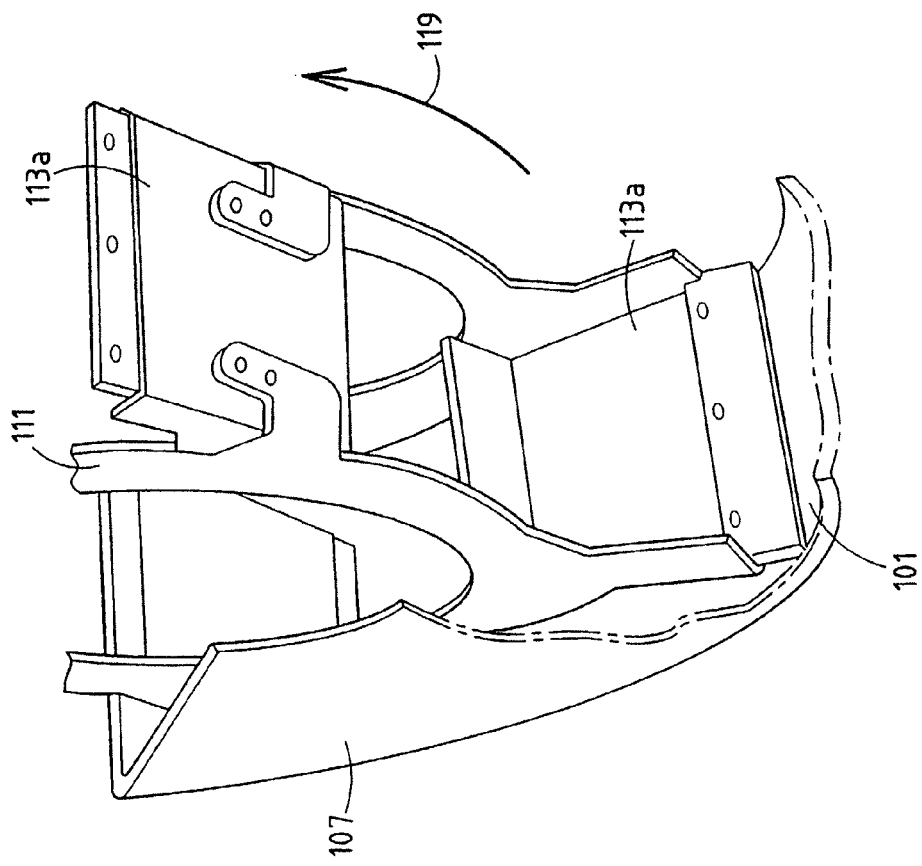
Figure 10D:
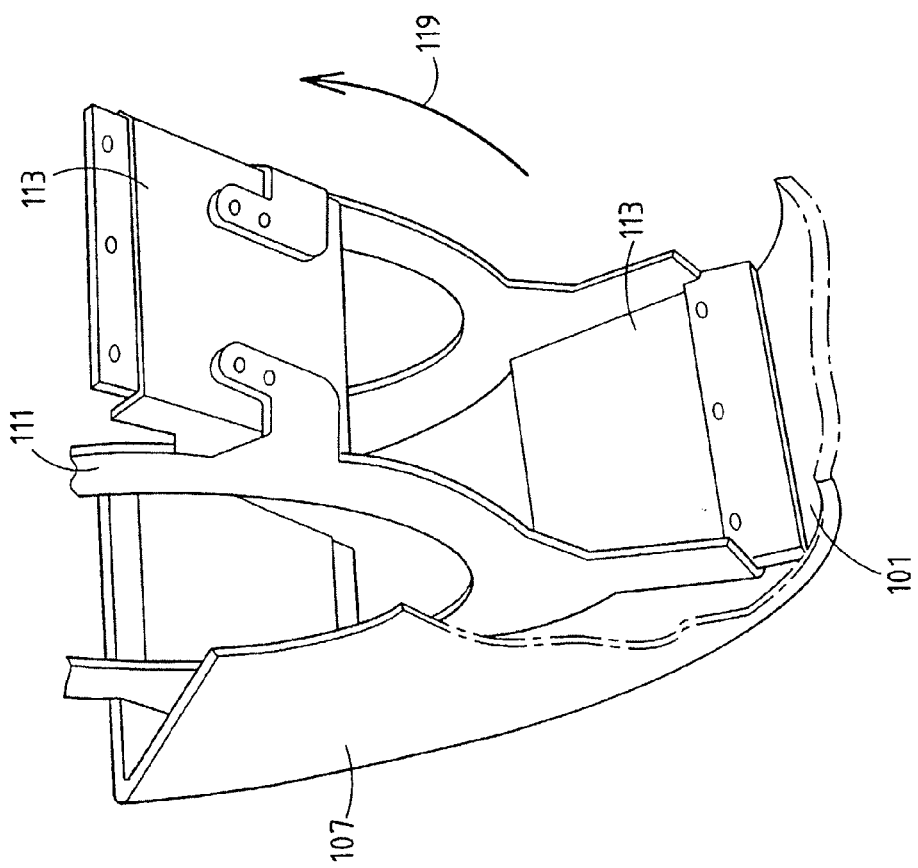

FIGS. 10d and 10e show two paddle forms which differ in details. The embodiment according to FIG. 10d is similar to the one shown in FIGS. 9a-10b. The leading edge of the paddle 113 essentially is in contact with the lower wall 101. Upright side walls of the paddle 113 meet partitions 107 (or end walls 103) of the massaging device with a small clearance.

The paddle 113a according to FIG. 10e tapers towards the trailing edge thereof, and the trailing edge forms part of an upright wall part. This configuration provides for a better transfer of products and possible massaging substance from the paddle 113a to a discharge member associated with the corresponding treatment section.

Figure 10F:
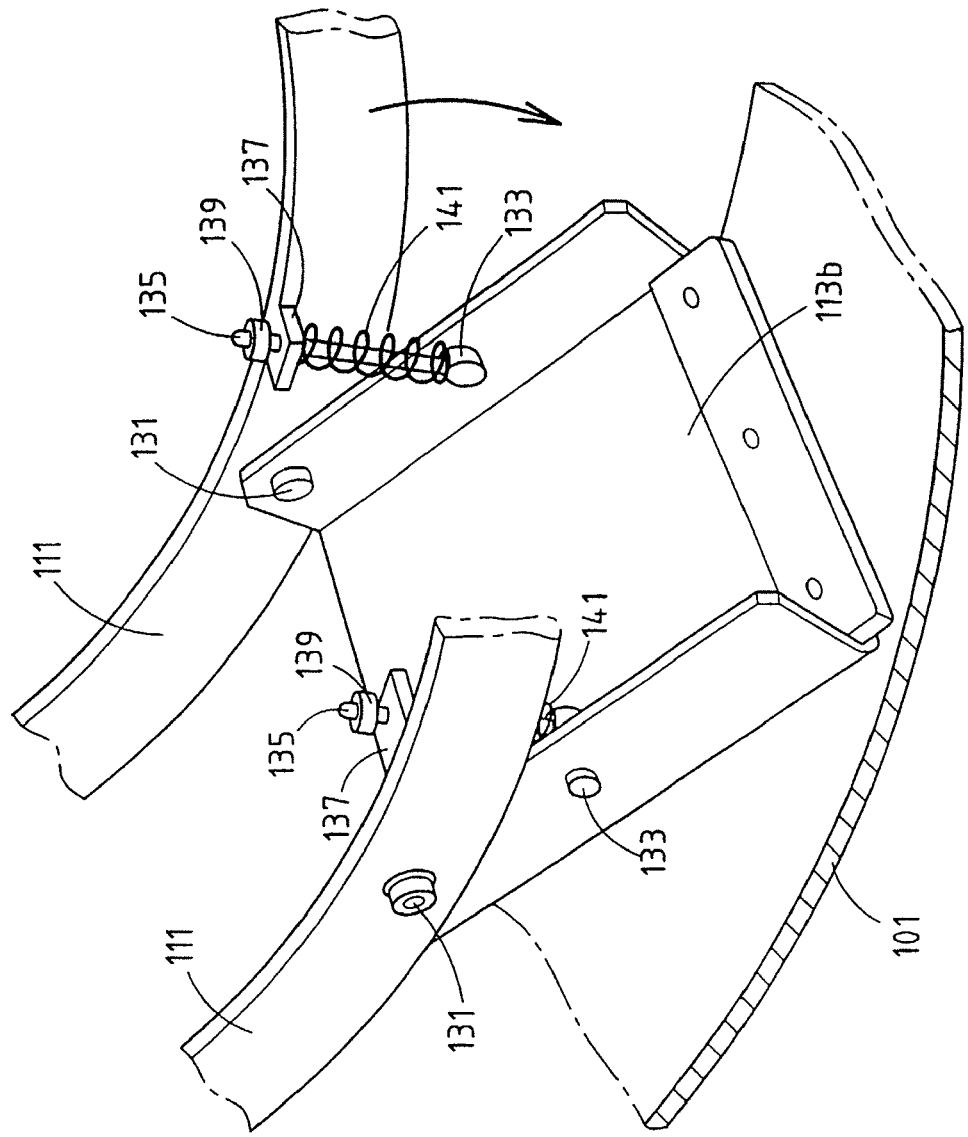

FIG. 10f illustrates a hinging arrangement of a paddle 113b relative to the lower wall 101. At the location of connections 131, the paddle 113b is hingably coupled to the rings 111. At the location of connections 133, the paddle 113b is hingably coupled to threaded bars 135, which extend through openings of supports 137, and are provided with locking nuts 139. Pressure springs 141 are provided on the threaded bars 135 between the connections 133 and the supports 137. Thus, the paddle 113b is tilted in the direction of the arrow, and the leading edge of the paddle 113b is biased against the lower wall 101. With these measures, one achieves in particular that the dimensional and form tolerances of the components of the massaging device, in particular those of the lower wall 101, can be relatively large without influencing the operation of the massaging device in a negative manner: the leading edge of the paddle 113b follows the lower wall 101.

Figure 11:
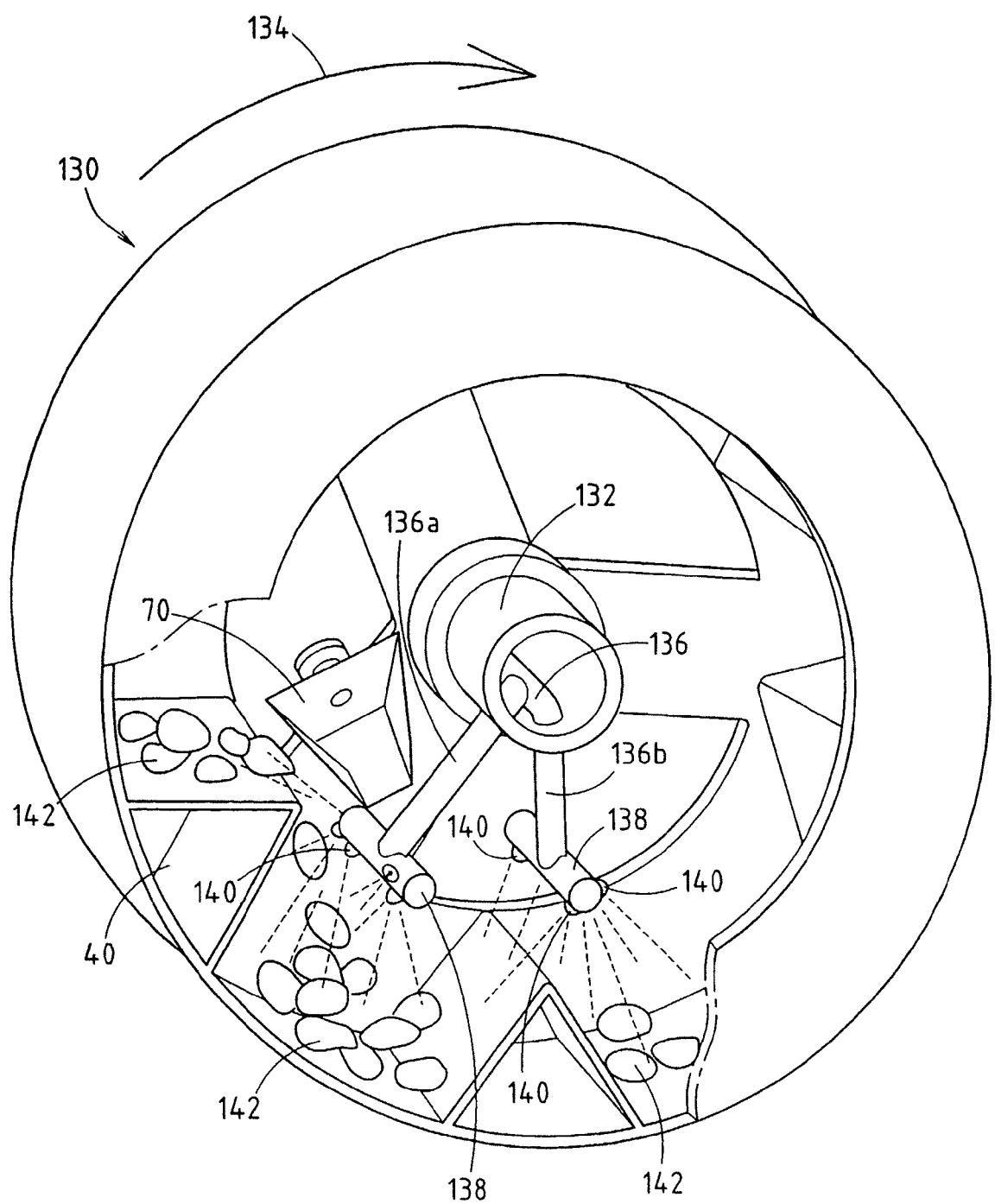
FIG. 11 shows a perspective view of a partially cut-away treatment section with treatment means.

FIG. 11 shows a treatment section 130 which can rotate about a hollow shaft 132, in the direction indicated by arrow 134. In the shaft 132 a line 136 is accommodated which at the location of the treatment section 130 branches into two lines 136a and 136b which are led through the wall of the shaft 132. A perforated spray head 138 is secured to the end of each line 136a, 136b, with valves 140 from which a medium supplied through the line 136 can be blow out or sprayed over products 142 located in the treatment section 130. The medium used may be air, carbon dioxide, nitrogen or another gas or gas mixture, or a liquid, such as water, or a pulverulent substance, with a predetermined temperature (for cooling, for example for the purpose of causing a layer of ice to form on the products 142, or heating). The valves 140 are directed substantially downwards, since the products 142, while the treatment section 130 is operating, as a result of the force of gravity will collect substantially in the bottom part of the treatment section 130 and can then be reached directly by the treatment medium.

Figure 12A:
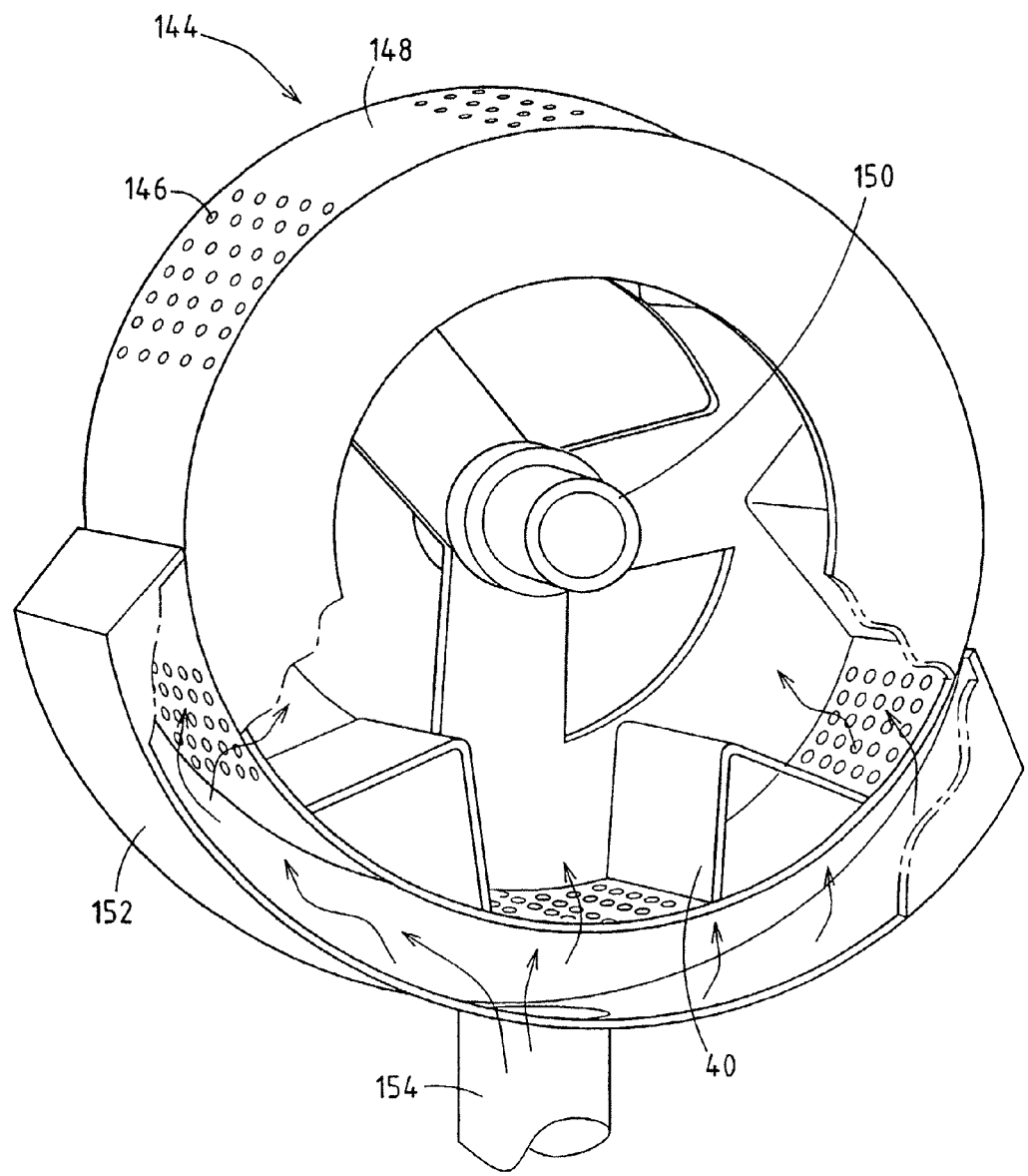
FIG. 12a shows a perspective view of a partially cut-away treatment section with other treatment means.

FIG. 12a shows a structure of a treatment section 144 which has a peripheral wall 148 which is partially provided with perforations 146. The treatment section 144 can rotate about a hollow shaft 150 with respect to a chamber 152 which is arranged in a fixed position with respect to the shaft 150 along a section of the peripheral wall 148. The chamber has a feed line 154, from which a gas, such air, or a pulverulent substance can be introduced at a predetermined temperature into the chamber 152 and moved again via the perforations 146 into the treatment section 144, as indicated by the arrows in FIG. 12a. The chamber 152 preferably extends along the underside of the treatment section 144, since this is where the products which are to be treated will be located during operation, so that they are reached directly by the gas or the powder, for example in order for the products to be cooled or frozen.

Figure 12B:
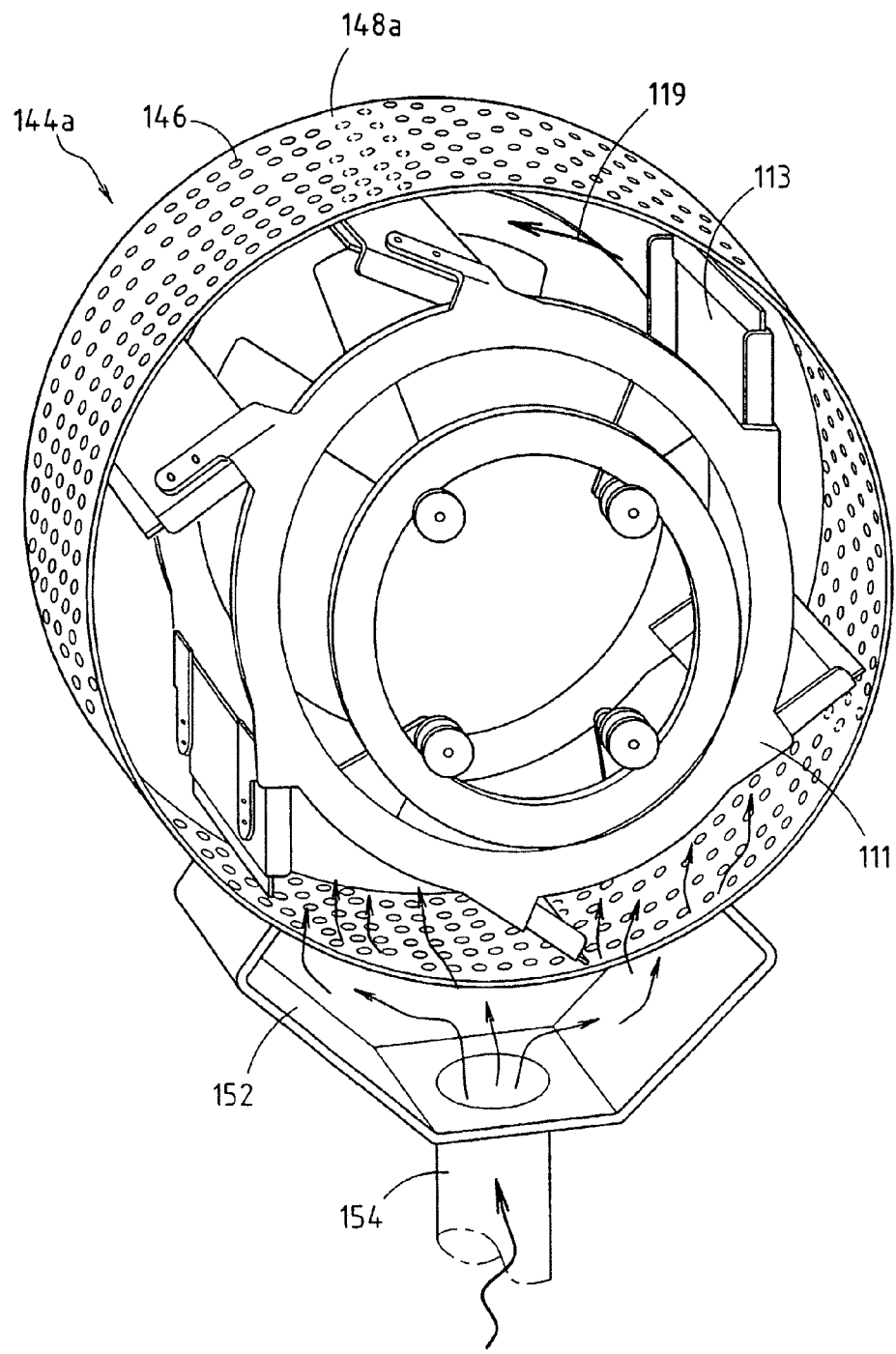

FIG. 12b shows a treatment section 144a with a similar function as the one which has been discussed above in relation to FIG. 12a. However, in the case of FIG. 12b the peripheral wall 148a and the chamber 152 are stationary, while the paddles 113 which fixed to the rings 111 rotate in the direction of the arrow 119. Although in the Figure the complete peripheral wall 148a is provided with perforations 146, the perforations 146 can also be limited for example to the area of the peripheral wall 148a which bounds the chamber 152.

Figure 13:
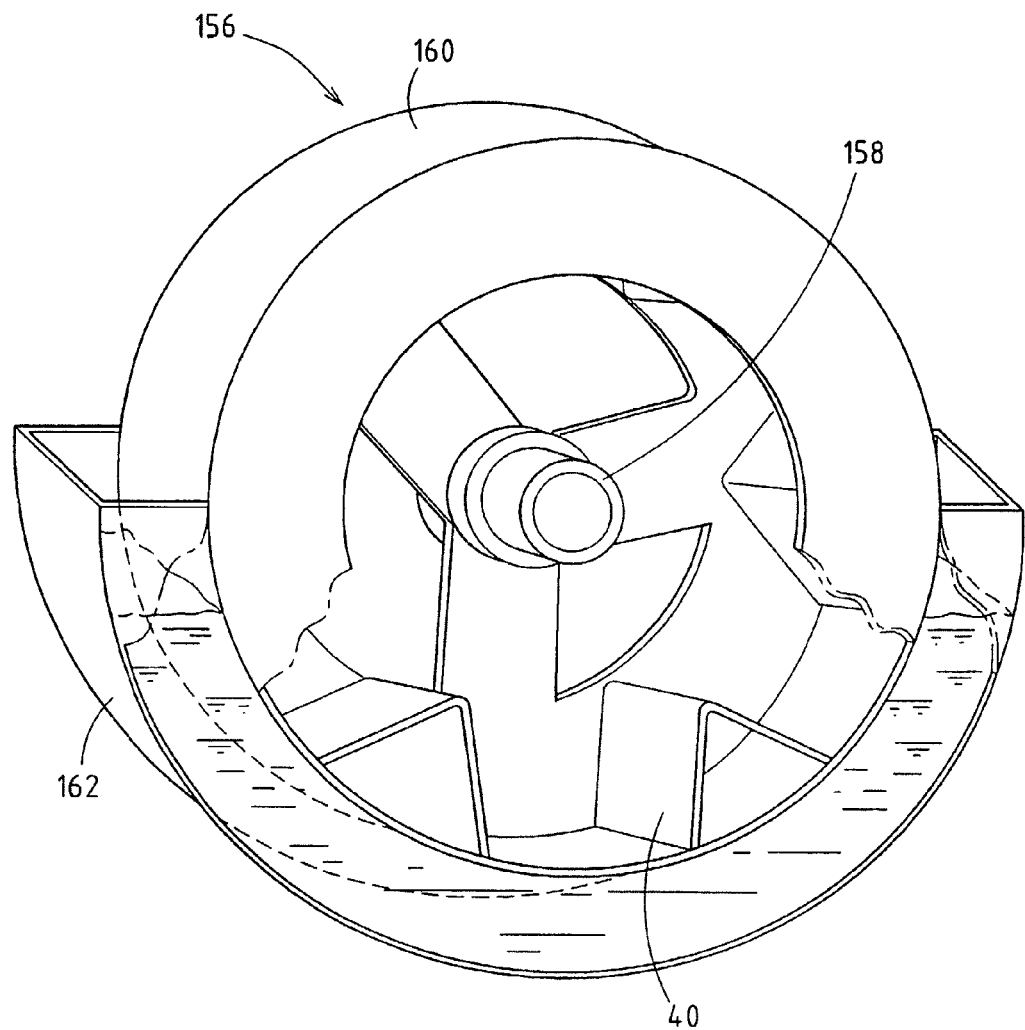
FIG. 13 shows a perspective view of a partially cut-away treatment section for yet another treatment.

FIG. 13 shows a structure of a treatment section 156 which can rotate about a hollow shaft 158. A chamber 162 which contains a liquid, such as water, at a defined temperature, is arranged in a fixed position with respect to the shaft 158 along a section of the closed peripheral wall 160 of the treatment section 156. Heat can be extracted from or supplied to that section of the peripheral wall 160 which is in contact with the liquid by the liquid in order for the products located in the bottom part of the treatment section 156 to be cooled/frozen or heated accordingly. If desired, the chamber 162 may be provided with inlets and outlets (not shown in more detail) in order to change the liquid. In addition, by way of example, cooling devices or heating devices (not shown in FIG. 13) may be positioned in the liquid.

Figure 14:
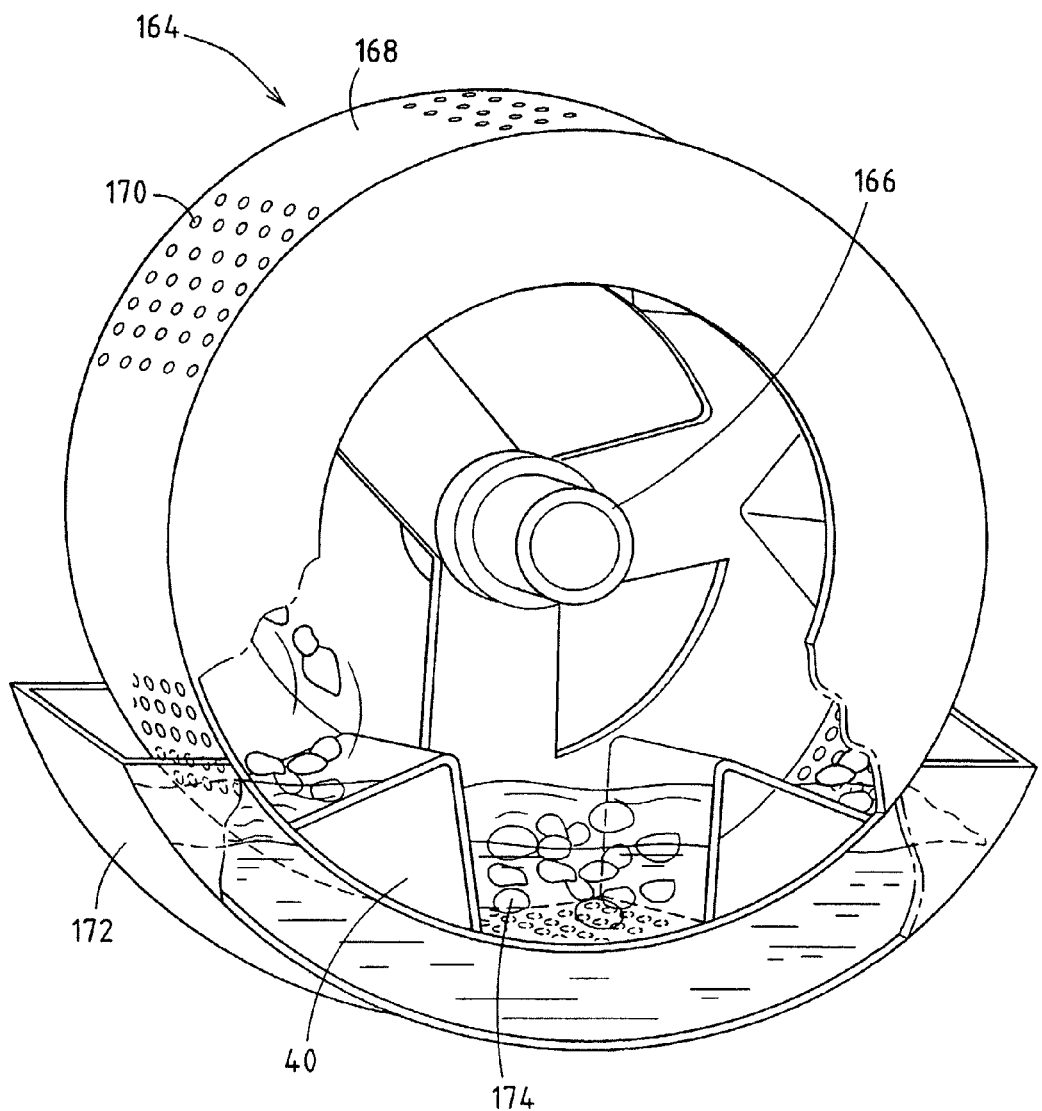
FIG. 14 shows a perspective view of a partially cut-away treatment section with means for yet another treatment.

FIG. 14 shows a treatment section 164 which can rotate about a hollow shaft 166. A peripheral wall 168 is partially provided with perforations 170, similar to those shown in FIG. 10. Along a section of the peripheral wall 168, a chamber 172 is arranged in a fixed position with respect to the hollow shaft 166. The chamber 172 contains a liquid, such as water, which is at a defined temperature. The liquid flows via the perforations 170 into the treatment section 164 and thus comes into direct contact with products 174 located in the treatment section 164, in order to clean and/or cool and/or heat these products. If desired, the chamber 172 may be provided with inlets and outlets (not shown in more detail) in order for the liquid to be changed. In addition, by way of example, cooling devices or heating devices (not shown in FIG. 14) may be positioned in the liquid.

Figure 15A:
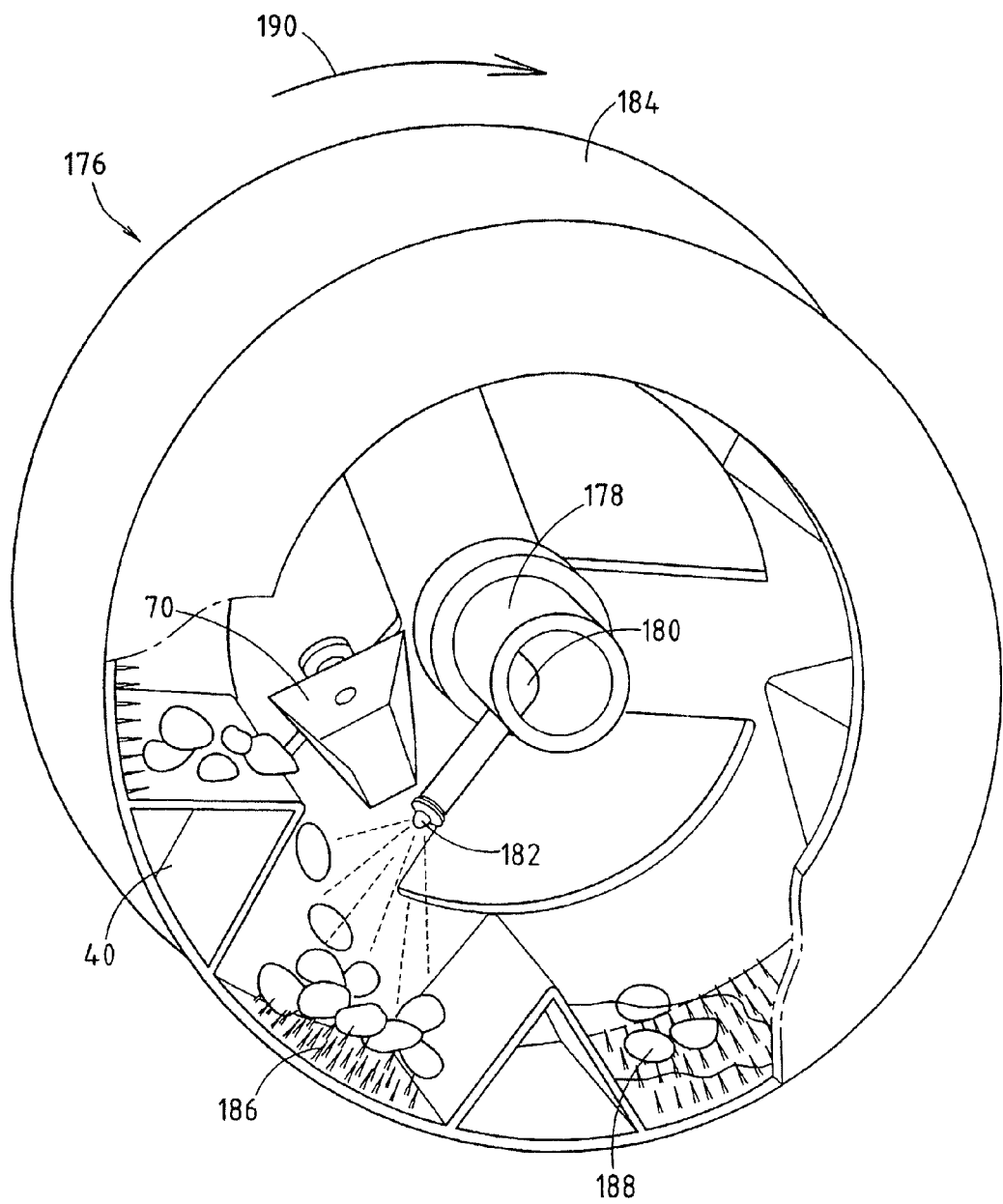
FIG. 15a shows a perspective view of a partially cut-away treatment section with injection means.

FIG. 15a shows a treatment section 176 which can rotate about a hollow shaft 178. In the shaft 178 there is a line 180 which leads through the wall of the shaft 178 and at one end is provided with a spray head 182. A peripheral wall 184 of the treatment section 176 is provided on the inner side with needles 186. Products 188 which are located in the treatment section 176, in the event of a rotation of the treatment section, tumble over needles 186, in the direction indicated by arrow 190, with the result that the structure of the products 188 at and below the outer surface thereof changes. This promotes uptake of a massaging substances (gas, liquid (for example brine) or powder), which is sprayed towards the products 188 through the line 180 and via the spray head 182.

Figure 15B:
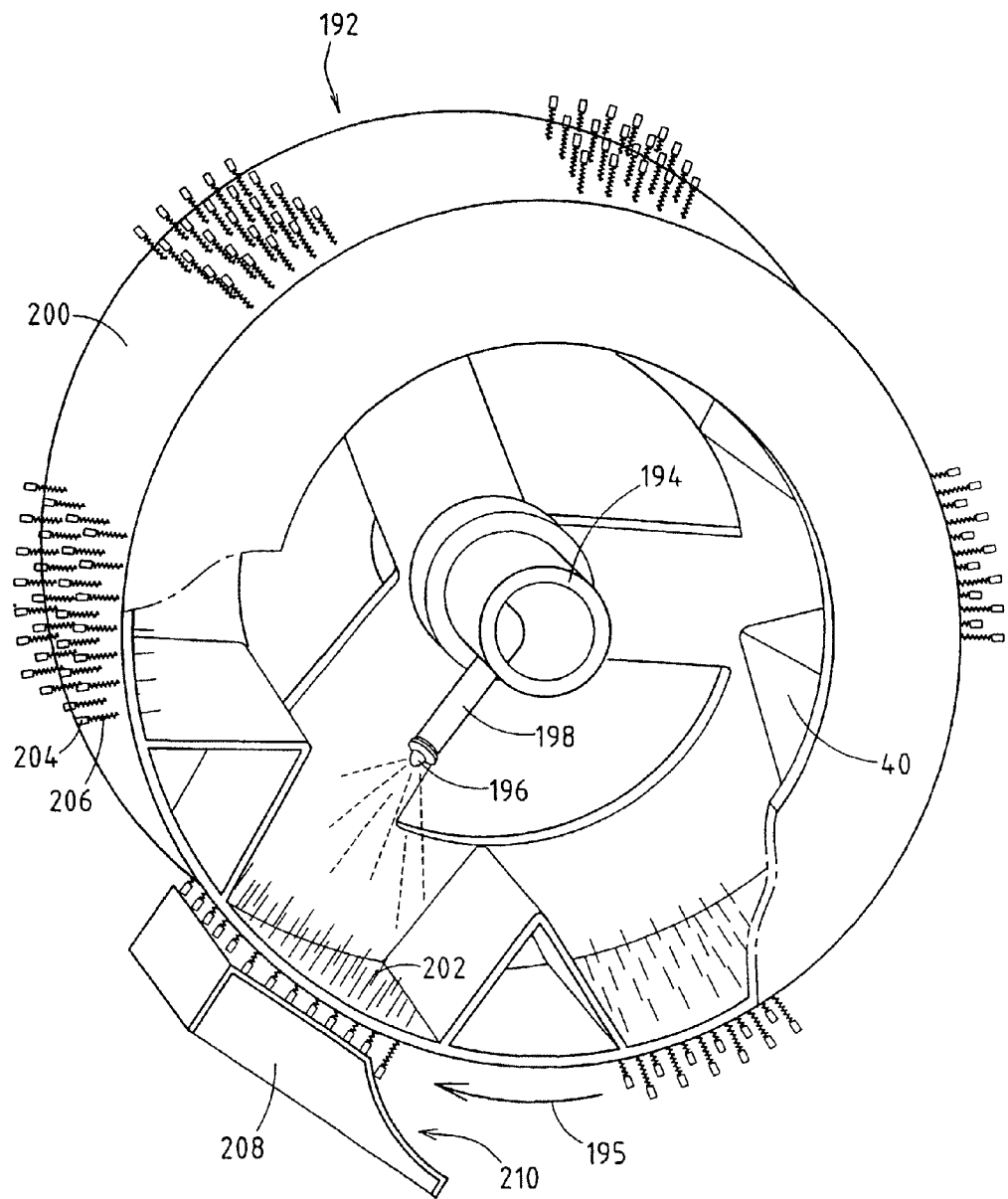
FIG. 15b shows a perspective view of a partially cut-away alternative treatment section with injection means.

FIG. 15b shows a treatment section 192 which can rotate about a hollow shaft 194, in the direction indicated by arrow 195. A massaging substance (gas, liquid or powder) can be sprayed towards the bottom part of the treatment section 192 via a line 198 which is provided with a spray head 196 and is in communication with the interior of the shaft 194. Needles 202, of which a first end projects through the peripheral wall 200 and an opposite, second end bears a thickened portion 204, are arranged on sections of a peripheral wall 200 of the treatment section 192. The needles 202 are supported in a manner which is not shown in more detail but is such that they can move substantially transversely with respect to the surface of the peripheral wall 200, spring means 206 being provided for the purpose of forcing the needles 202 largely out of the treatment section 192. A guide element 208 is arranged fixedly with respect to the shaft 194, with a guide surface 210 which, as seen in the direction indicated by the arrow 195, is at a gradually decreasing distance from the peripheral wall 200.

When the treatment section 192 rotates in the direction indicated by the arrow 195, the thickened portions 204 of the needles 202 come into contact with the guide surface 210 and the needles 202 are gradually driven into the treatment section 192. After they have passed the guide element 208, the spring means 206 force the needles back outwards. The needles 202 which have been driven into the treatment section by the guide element 208 change the structure at and/or below the surface of products situated at that location, in order to improve the action or uptake of the massaging substance coming out of the line 198.

Figure 15C:
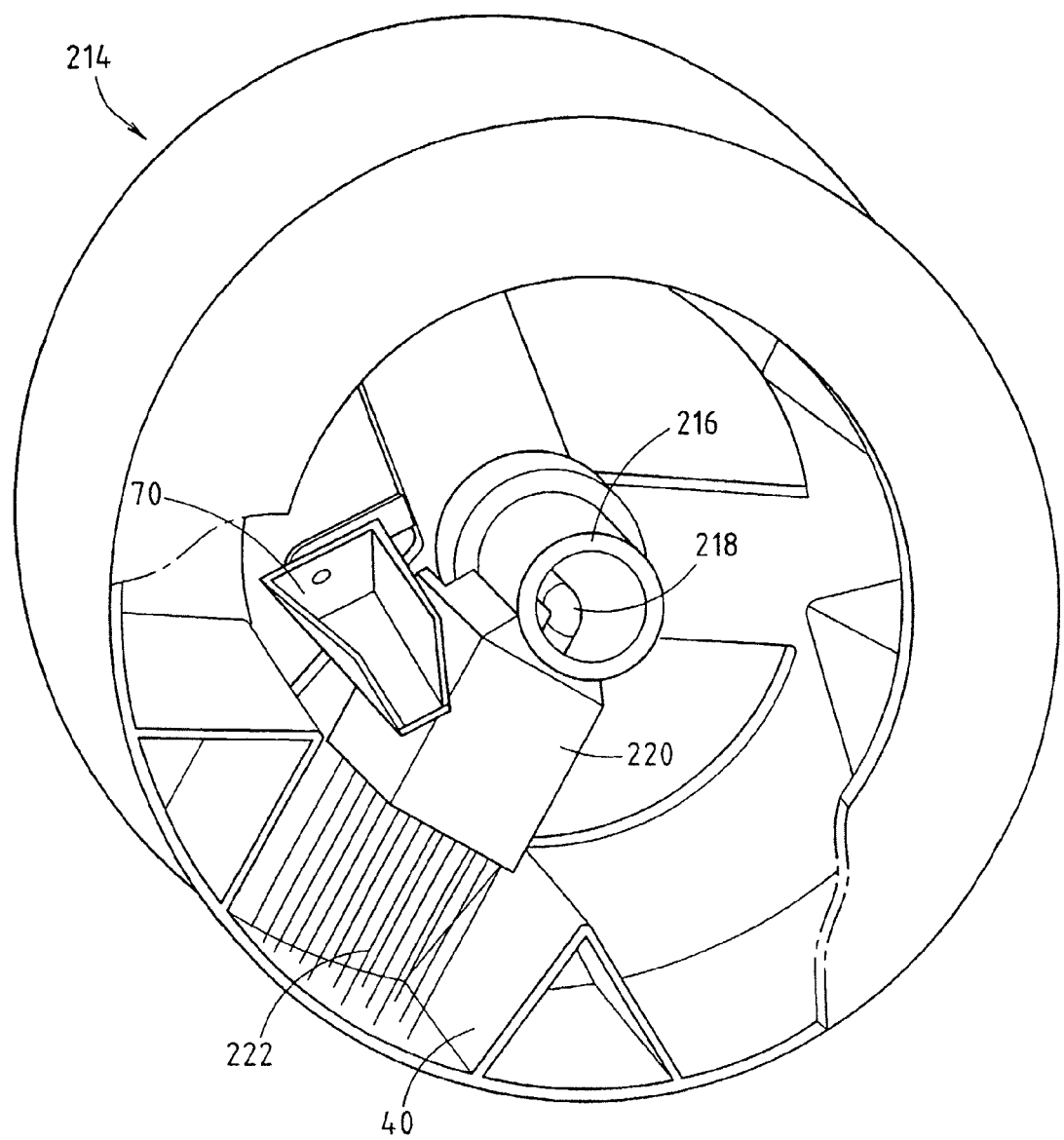
FIG. 15c shows a perspective view of another partially cut-away treatment section with injection means.

FIG. 15c shows a treatment section 214 which can rotate about a fixed hollow shaft 216. In the shaft 216 there is a line 218 which is guided through the wall of the shaft 216 into an injection device 220, which is fixedly connected to the shaft 216. The injection device 220 comprises a number of needles 222 which can be moved into and out of the injection device 220 in a manner which is not shown in more detail. The needles 222 are moved into the injection device 220 as they move past the massaging elements 40, and are moved out of the injection device 220 between the passage of two successive massaging elements 40. The needles 222 may be hollow in order to inject a substance supplied via the line 218 into products.

Figure 15D:
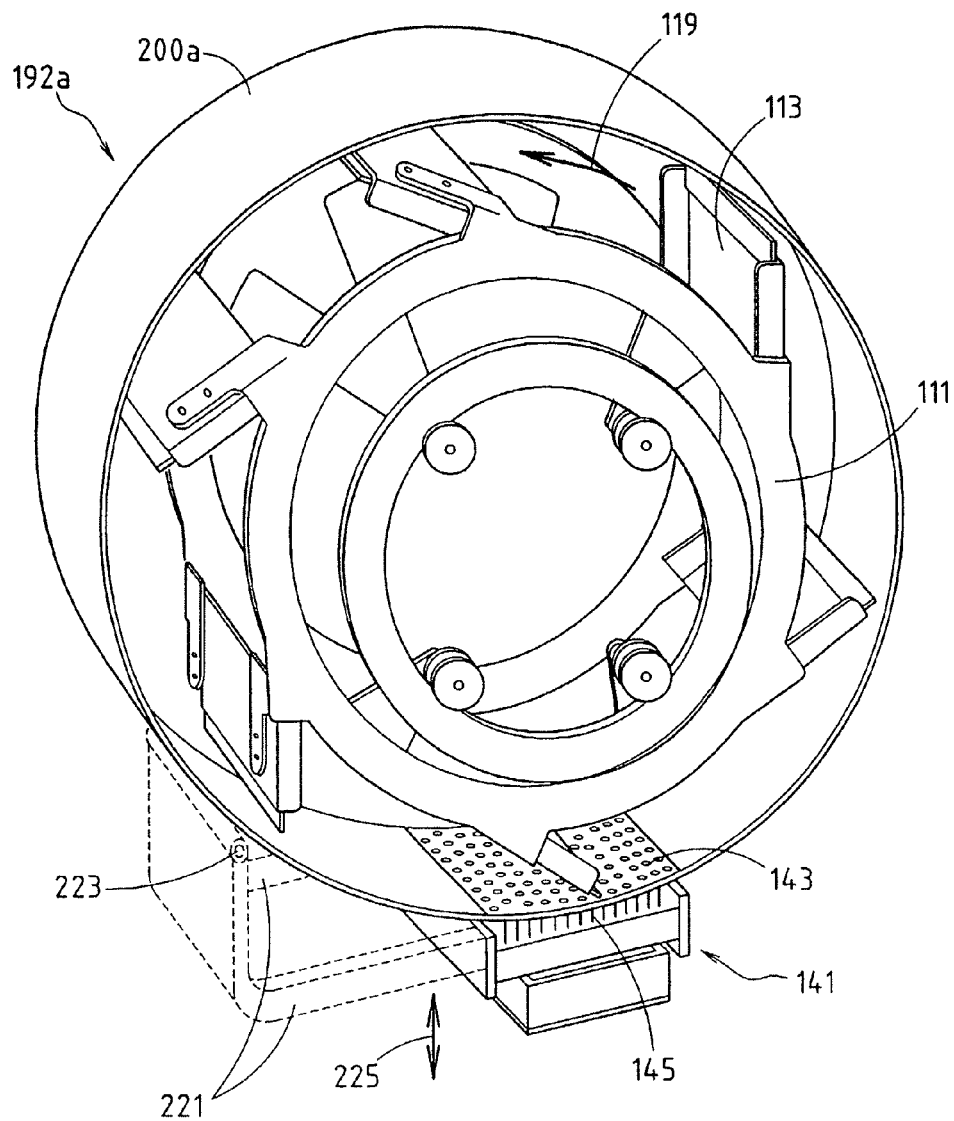
FIG. 15d shows a perspective view of still another partially cut-away treatment section.
Figure 15E:
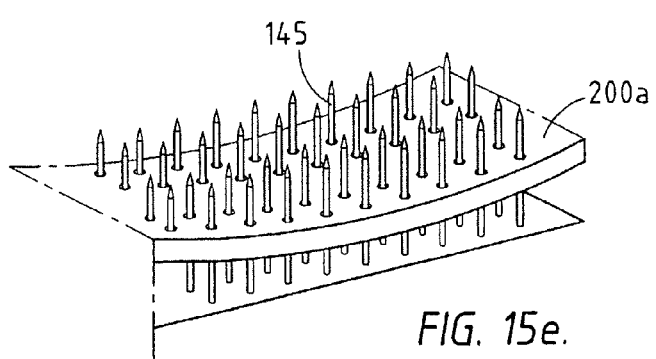
FIG. 15e shows a perspective view of a detail of the treatment section according to FIG. 15d.

FIGS. 15d and 15e show a treatment section 192a with a similar function as the one which has been discussed above in relation to FIG. 15b. However, in the case of FIG. 15d the peripheral wall 200a is arranged stationary, just like a needle unit 141 with which one or more needles 145 can be taken into and out of the treatment section 192a through perforations 143 in the peripheral wall 200a. The paddles 113 which are fixed to the rings 111 rotate in the direction of the arrow 119.

The needles 145 are taken outside the treatment section at the time when the paddles 113 pass the perforations 143, and can be taken into the treatment section through the perforations 143 in between the passages of the paddles 113. Products which are in the area of the perforations 143 thus are subjected to a penetration of the needles 145 which is not only a result of the operation of the force of gravity (products fall onto needle points), but also is a result of the movement of the needles 145 into the treatment section (needle points are forced into the products). The displacement of the needles 145 relative to the peripheral wall 200a takes place by means of one or more actuators not shown in further detail. It is possible, for example, to drive each needle 145 or set of needles 145 separately. A possibility indicated in FIG. 15d with dashed lines is to provide the needle unit 141 with fixedly arranged needles 145, and to connect the needle unit 141 through one or more arms 221 with a hinge axis 223 for moving the needle unit 141 by actuation of an actuator not shown in further detail in the directions of the double arrow 225.

Figure 16:
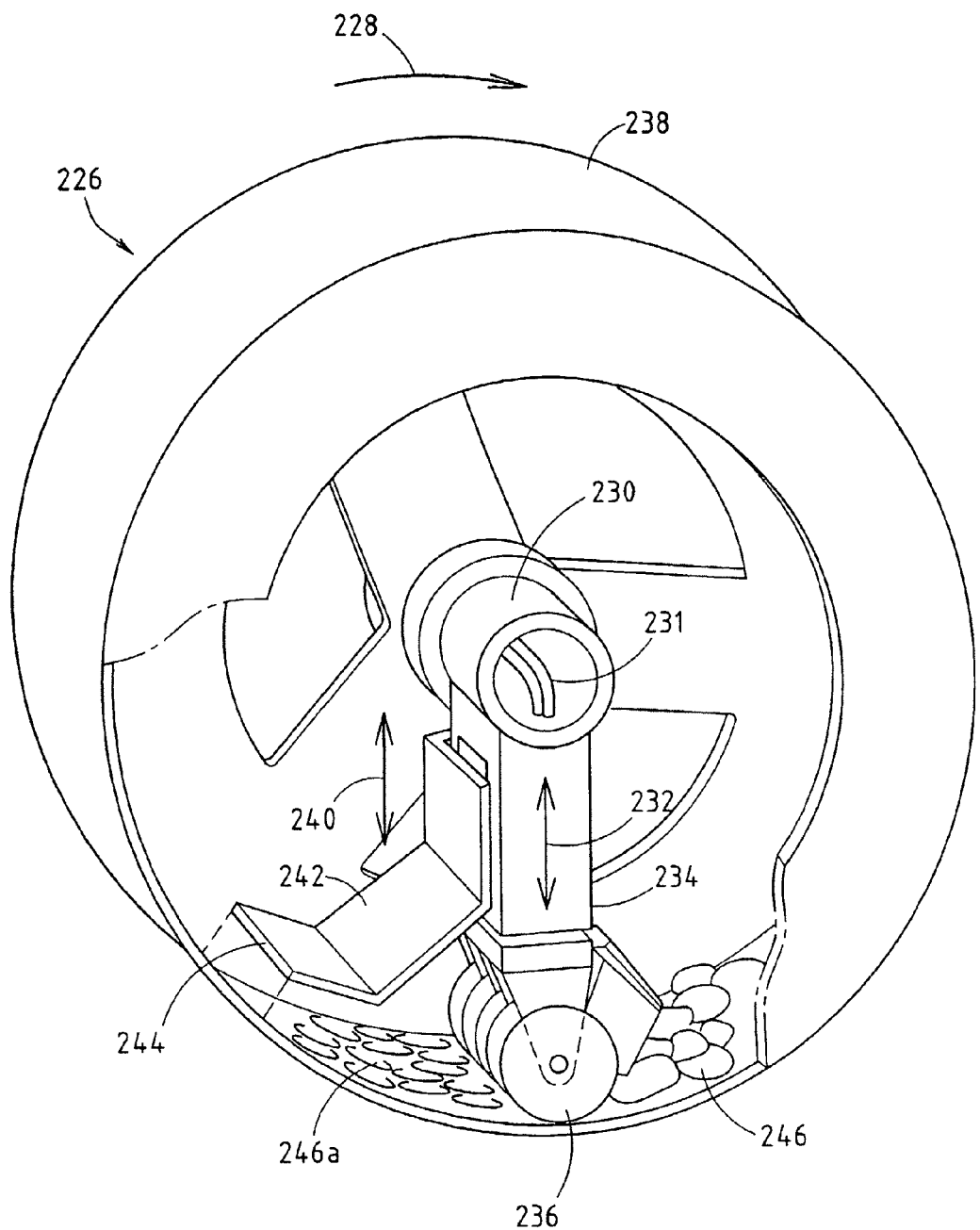
FIG. 16 shows a perspective view of a partially cut-away treatment section with strip-cutting means.

FIG. 16 shows a treatment section 226 which can rotate in the direction indicated by arrow 228 about a fixed, hollow shaft 230. An arm 234 which can be extended and retracted telescopically, in the directions indicated by double arrow 232, with the aid of means which are now shown in more detail, is fixed to the shaft 230. One end of the arm 234 is provided with a number of rotatable blades 236 which, with the aid of the arm 234, can be moved onto or almost onto the inner side of a peripheral wall 238 of the treatment section 226 and can be moved to a distance from the inner side of the peripheral wall 238. A plate 242, which can be moved in the directions indicated by double arrow 240 with the aid of means which are not shown in more detail, is also arranged on the arm 234. Thus, a free end 244 of the plate 242 can be moved onto or almost onto the inner side of the peripheral wall 238 and to a distance therefrom. The energy for and control of the movements of the arm 234 and the plate 242 are supplied via the interior of the shaft 230 via lines 231.

When the treatment section 226 is being used, it is in the first instance rotated in the direction indicated by arrow 228, during which movement the blades 236 are moved onto the inner side of the peripheral wall 238 and the end 244 of the plate 242 is moved to a distance from the peripheral wall 238. In this way, products 246 are cut into strips 246a. Then, the treatment section 226 is rotated in the reverse direction, during which process the blades 236 are moved to a distance from the inner side of the peripheral wall 238 and the end 244 of the plate 242 is moved onto the peripheral wall 238. In this way, the strips 246a are scraped off the inner side of the peripheral wall 238 and can be discharged from the treatment section 226, for example with the aid of a discharge member (not shown in more detail) or with the aid of the plate 242.

Figure 17:
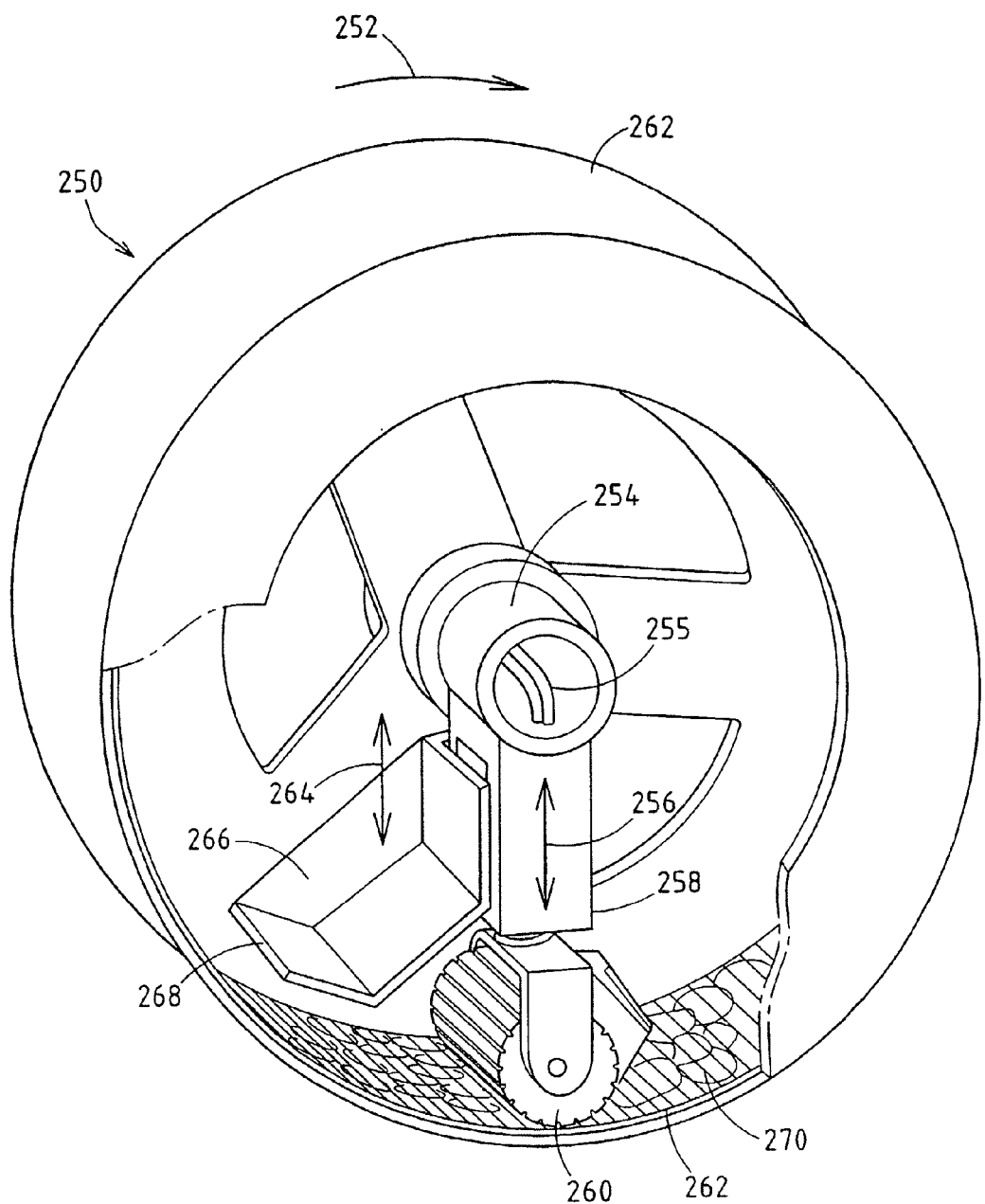
FIG. 17 shows a perspective view of a partially cut-away treatment section with tenderizing means.

FIG. 17 shows a treatment section 250 which can rotate, in the direction indicated by arrow 252, about a fixed shaft 254. An arm 258 which can be extended and retracted telescopically in the directions indicated by double arrow 256 with the aid of means which are not shown in more detail is fixed to the shaft 254. One end of the arm 258 is provided with a roller 260 which is provided with grooves, is mounted so that it can rotate freely and, with the aid of the arm 258, can be moved onto or to a short distance from the inner side of a peripheral wall 262 of the treatment section 250 and can be moved to a distance from the inner side of the peripheral wall 262. A discharge member 266, which can be moved in the directions indicated by double arrow 264 with the aid of means which are not shown in more detail, is also arranged on the arm 258. A free end 268 of the discharge member 266 can thus be moved onto or close to the inner side of the peripheral wall 262 and to a distance therefrom. The energy for and control of the movements of the arm 258 and the discharge member 266 are supplied via the interior of the shaft 254 via lines 255.

When the treatment section 250 is being used, it is in the first instance rotated in the direction indicated by arrow 252, during which process the roller 260 is moved towards the inner side of the peripheral wall 262 and the end 268 of the discharge member 266 is moved to a distance from the peripheral wall 262. In this way, products 270 are subjected to alternating mechanical loads and as a result—in the case of meat—are tenderized. Then, the treatment section 250 is rotated in the opposite direction, during which process the roller 260 is moved to a distance from the inner side of the peripheral wall 262, and the end 268 of the discharge member 266 is moved towards the peripheral wall 262. In this way, the tenderized products 270 are scraped off the inner side of the peripheral wall 262 and can be discharged from the treatment section 250 with the aid of the discharge member 266.

Figure 18A:
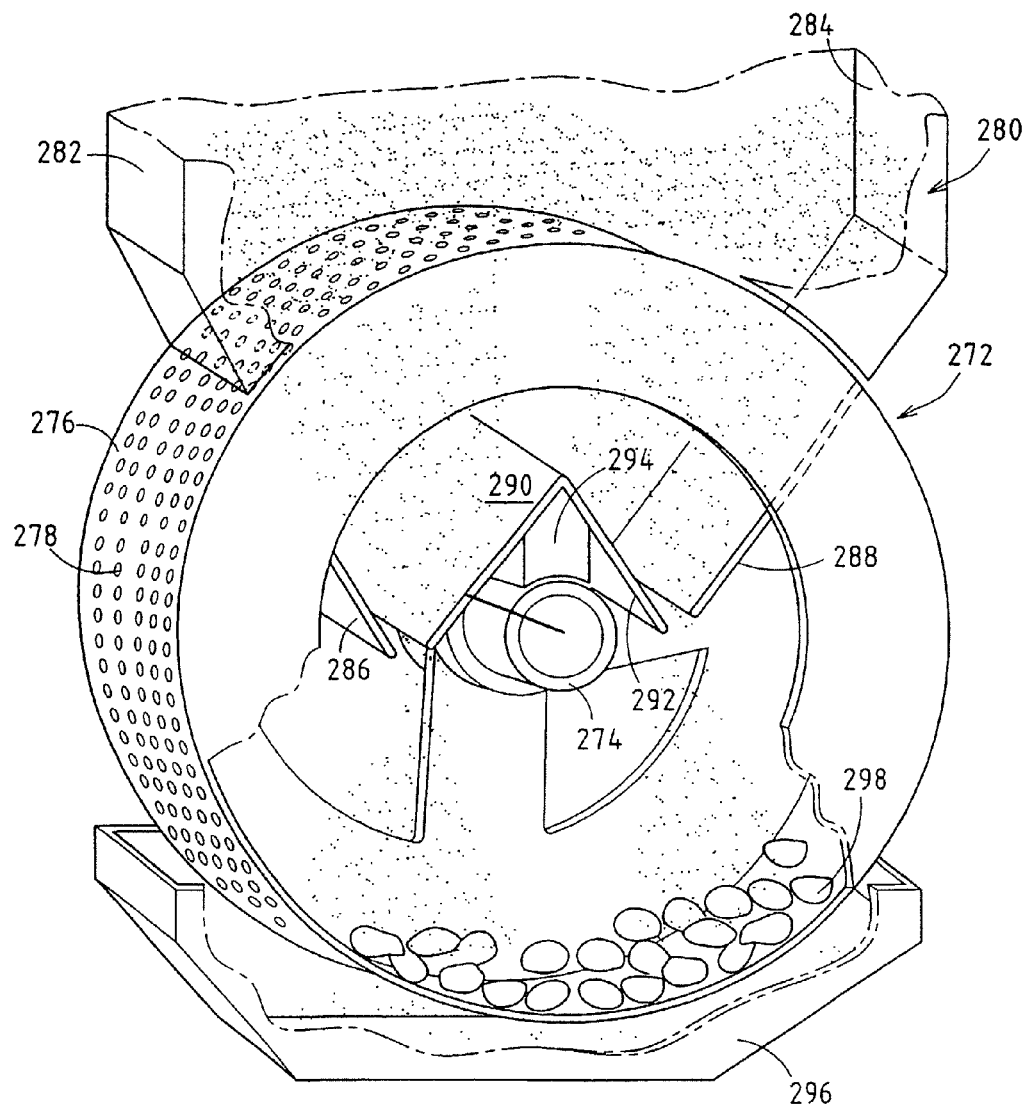
FIG. 18a shows a perspective view of a partially cut-away treatment section with means for introducing a pulverulent or granular substance into the treatment section.

FIG. 18a shows a treatment section 272 which can rotate about a fixed shaft 274. A peripheral wall 276 of the treatment section 272 is provided with perforations 278. Above the treatment section 272 there is formed a chamber 280 which is open on the side of the peripheral wall 276. In the treatment section 272, side walls 282 and 284 of the chamber 280 are adjoined by walls 286, 288, 290 and 292. The latter walls 286 and 288 are fixed, in a manner which is not shown in more detail, with respect to the shaft 274, while the walls 290 and 292 are fixedly connected to the shaft 274 by means of a support 294. Beneath the treatment section 272 there is formed a collection chamber 296 which is open at the top.

In operation, a pulverulent substance, such as flour, is placed in the chamber 280. The substance reaches the interior of the treatment section 272 via the perforations 278 and is guided by the walls 286-292 towards gaps between the walls 286 and 290 and between the walls 288 and 292, where the substance drops down in two streams onto products 298 which are located substantially in the bottom part of the treatment section 272. Some of the substance adheres to the products 298, and a further part of the substance leaves the treatment section 272 via the perforations 278, ending up in the collection chamber 296 from which it is discharged.

Figure 18B:
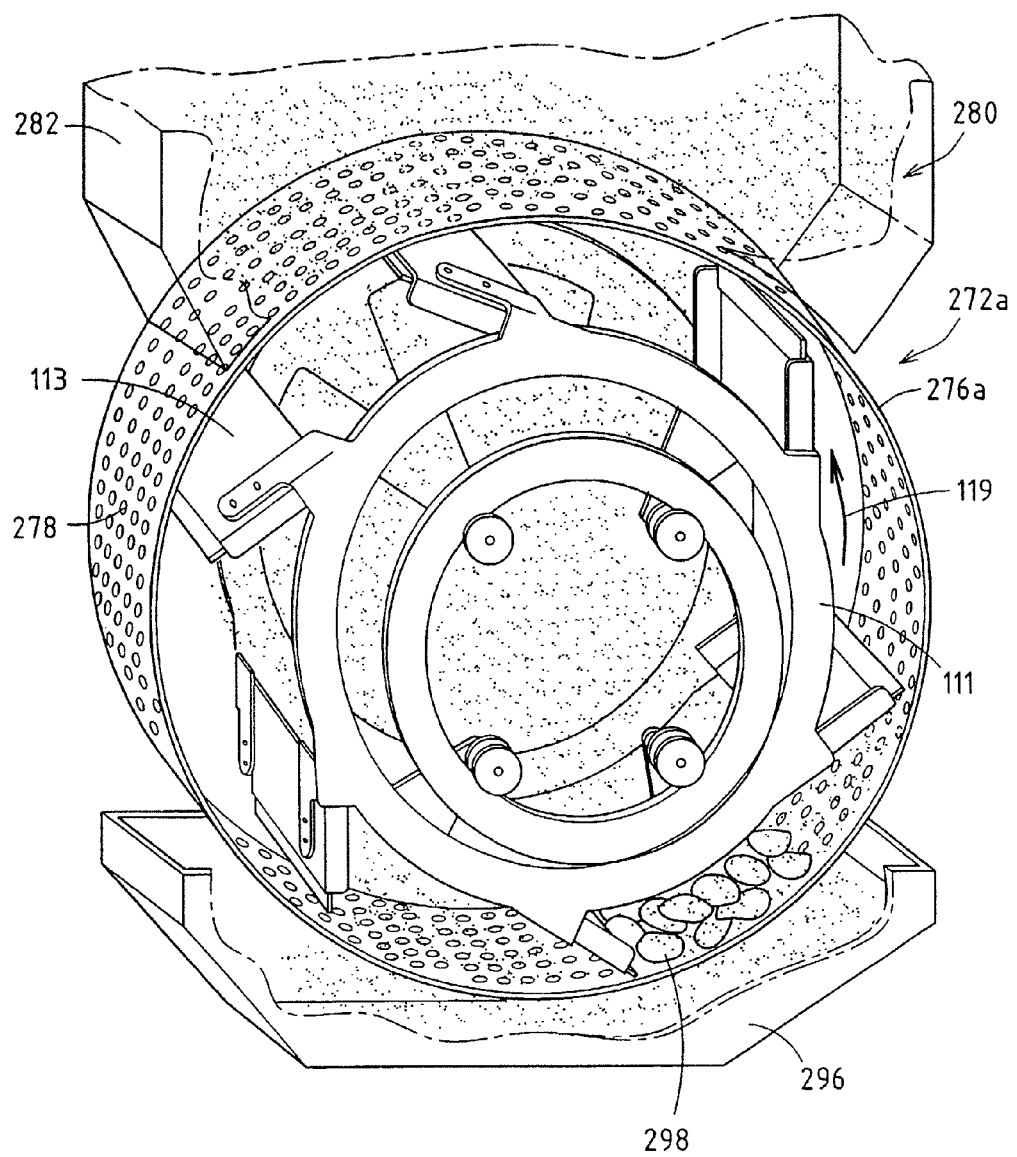

FIG. 18b shows a treatment section 272a with a similar function as the one discussed above in relation to FIG. 18a. However, in the case of FIG. 18b the peripheral wall 276a and the chamber 296 are stationary, while the paddles 113 which are fixed to the rings 111 rotate in the direction of the arrow 119. Although in the Figure the complete peripheral wall 276a is provided with perforations 278, the perforations 278 can also be limited to the area of the peripheral wall 276a which is situated near the chamber 296.

Figure 19A:
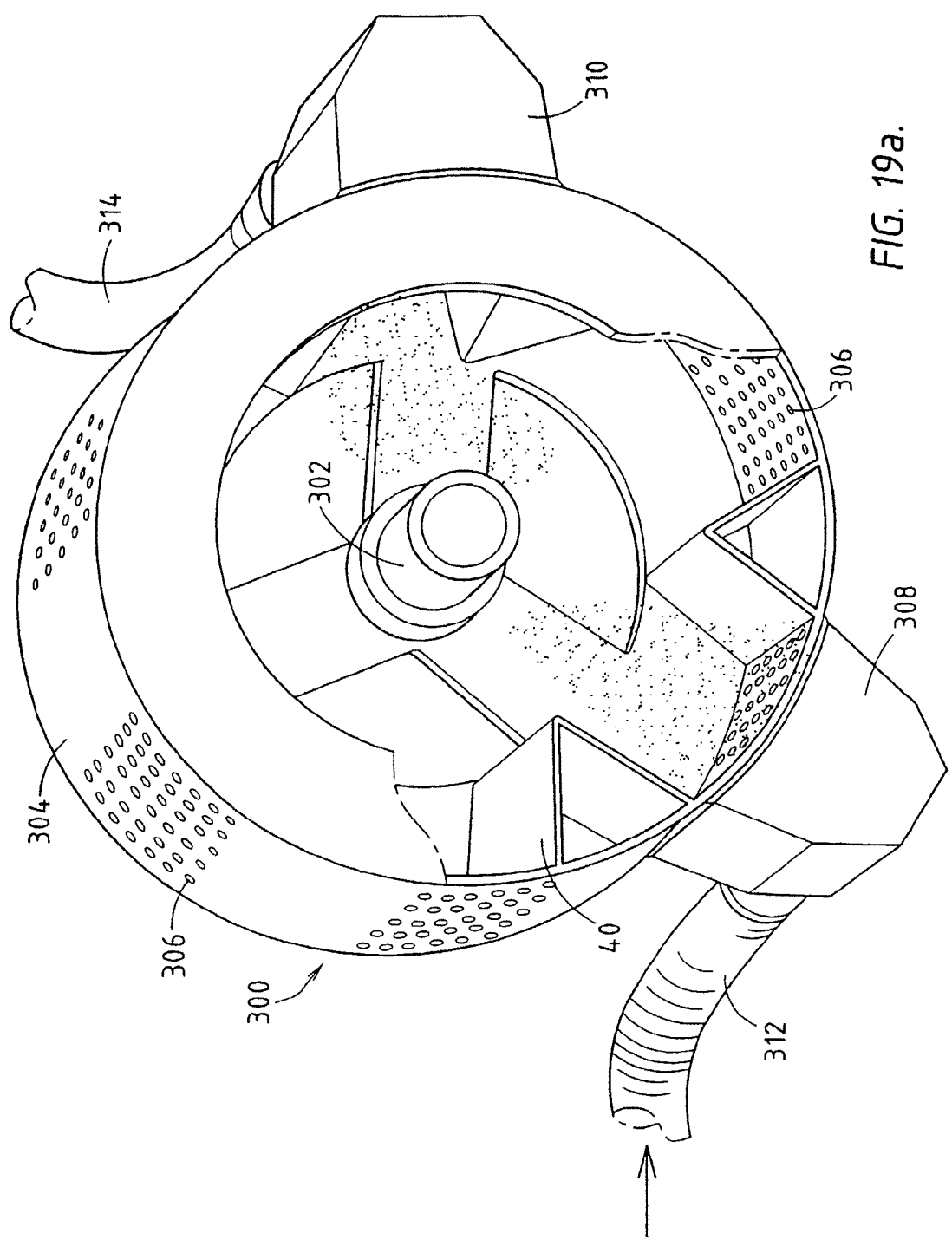
FIG. 19a shows a perspective view of another partially cut-away treatment section with means for introducing a pulverulent or granular substance into the treatment section.

FIG. 19a shows a treatment section 300 which can rotate about a shaft 302. A peripheral wall 304 of the treatment section 300 is locally provided with perforations 306. Outside the treatment section 300, a first chamber 308 and a second chamber 310 are formed, which chambers 308, 310 are open on their side which faces the peripheral wall 304. The chambers 308, 310 are in communication with lines 312 and 314, respectively.

In operation, in the case of a rotating treatment section 300, a pulverulent substance, such as flour, is blown into the chamber 308 via the line 312. As the perforations 306 move past the chamber 308, the substance will move into the treatment section 300, where it adheres to products located in the treatment section 300. The line 314 and the chamber 310 can act in the same way as the line 312 and the chamber 308. The direction of flow of the substance in the line 314 may also be the reverse of that in line 312, i.e. towards the treatment section 300 in the line 312 and away from the treatment section 300 in the line 314. It is also possible for the direction of flow of the substance in the line 314 to be towards the treatment section 300, and in the line 312 to be away from the treatment section 300.

Figure 19B:
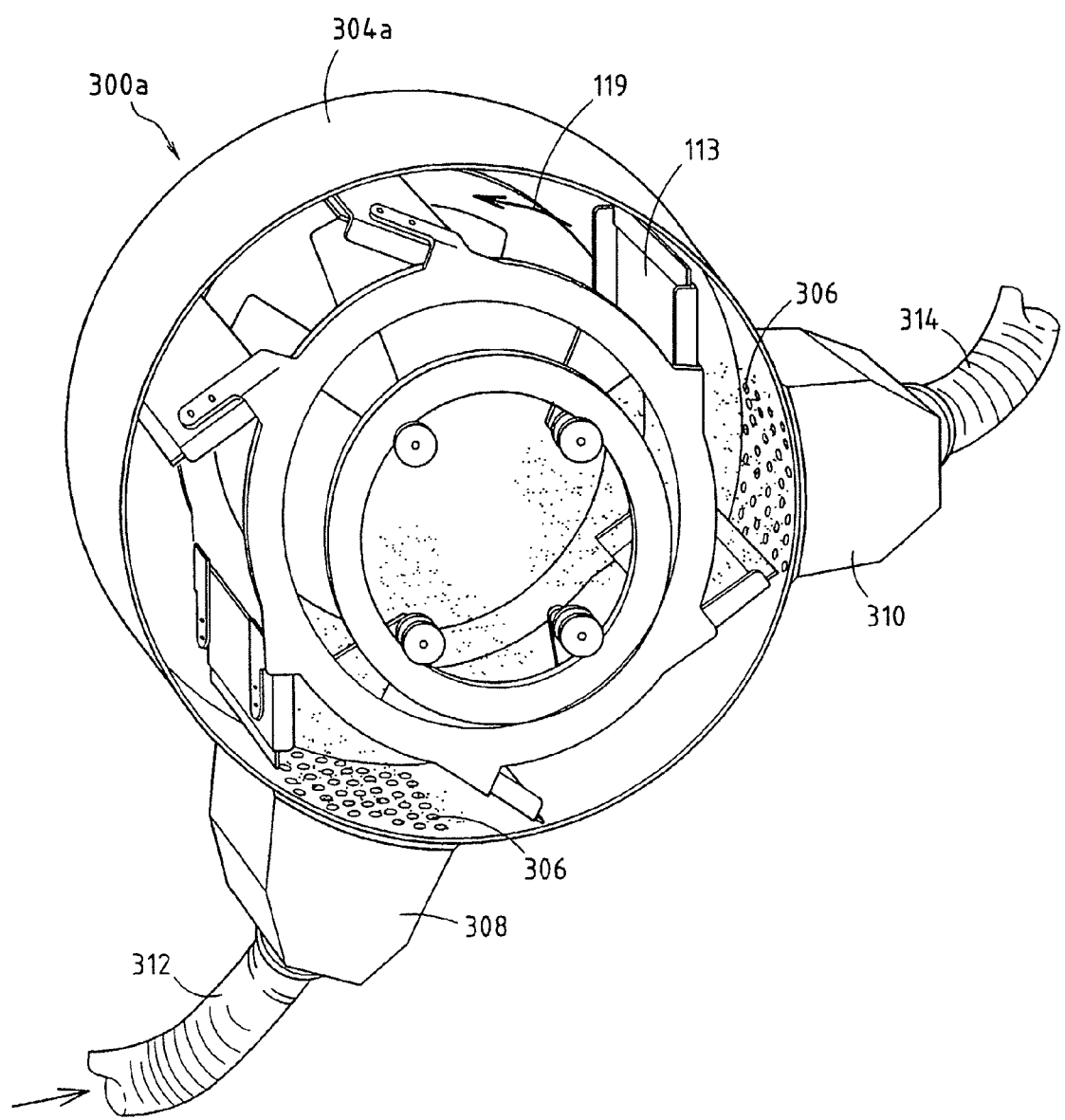

FIG. 19b shows a treatment section 300a having a similar function as the one discussed above in relation to FIG. 19a. However, in the case of FIG. 19b the peripheral wall 304a and the chambers 308 and 310 are stationary, while the paddles 113 which are fixed to the rings 111 rotate in the direction of the arrow 119. The perforations 306 are limited to the areas of the peripheral wall 304a bounding the chambers 308 and 310.

Figure 20:
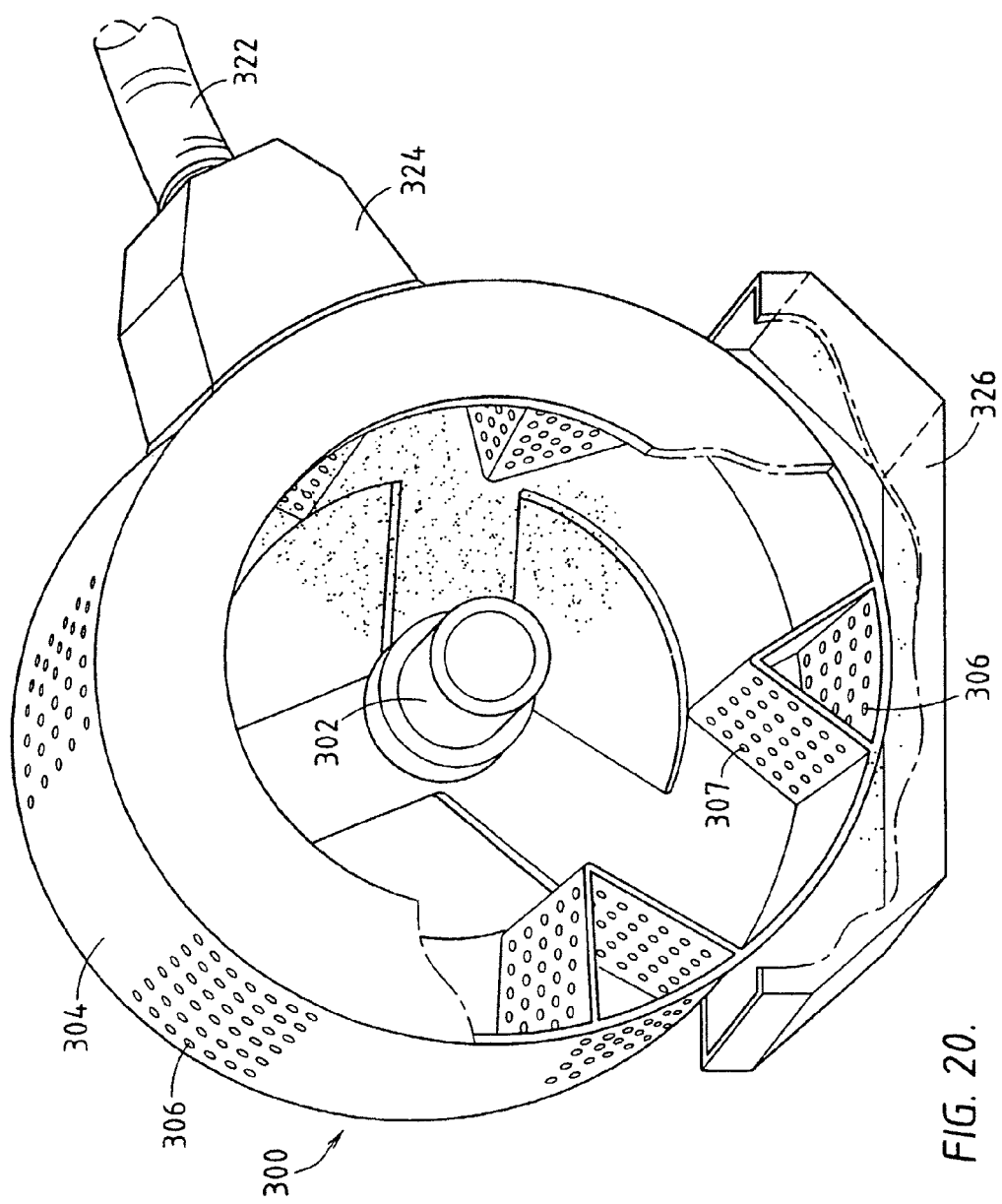
FIG. 20 shows a perspective view of another partially cut-away treatment section with means for introducing a pulverulent or granular substance into the treatment section.

FIG. 20 shows a similar arrangement to that shown in FIG. 19a, with a pulverulent substance, such as flour, being blown into a chamber 324 via a line 322, which chamber 324 is open on its side which faces the peripheral wall 304 of the treatment section 300 in order for the substance to be supplied to the treatment section 300 via the perforations 306, so that it can adhere to products located in the treatment section 300. Surplus substance located in the bottom part of the treatment section 300 passes via the perforations 306 into a receptacle 326, from which it can be discharged.

Figure 21:
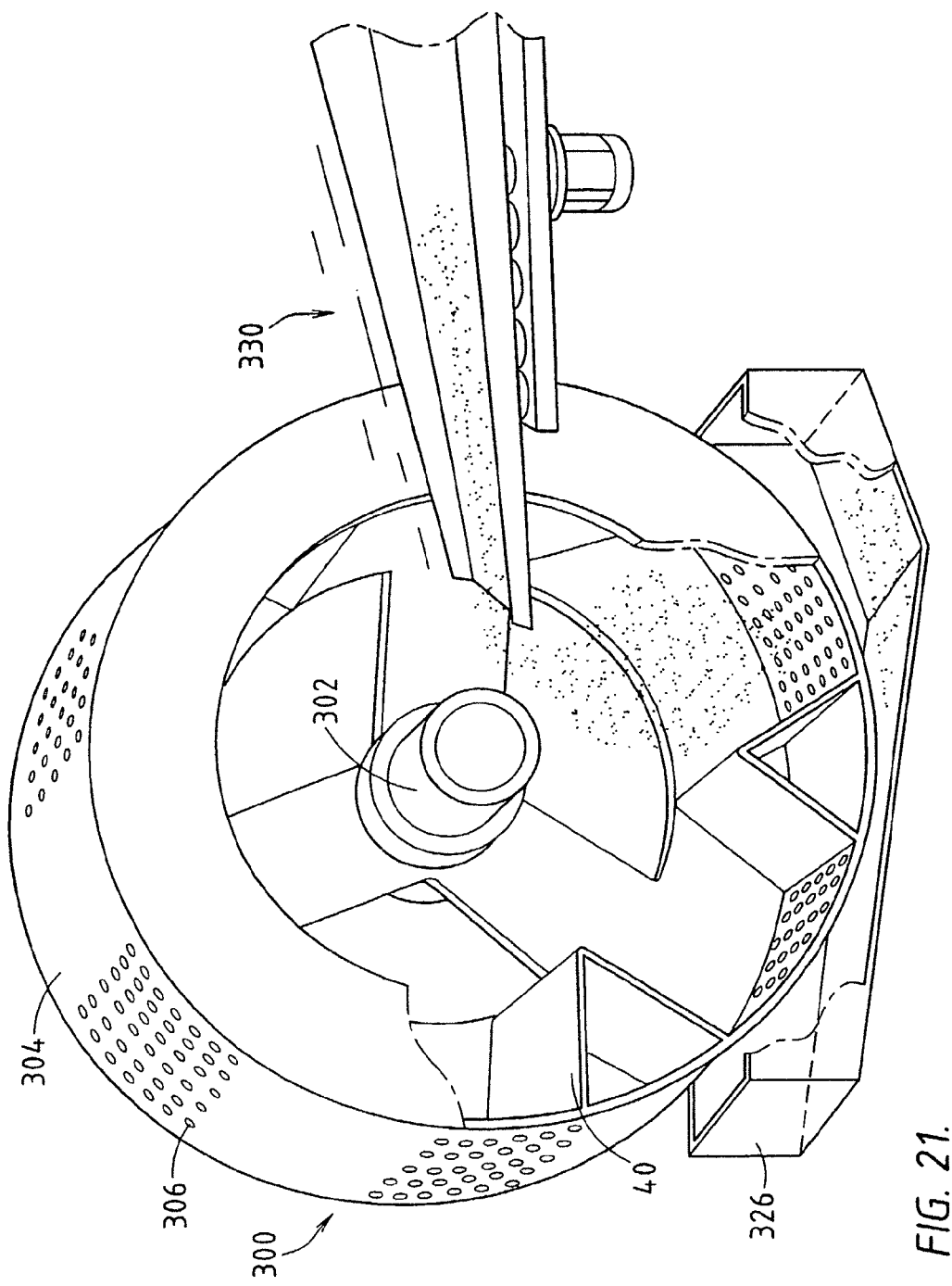
FIG. 21 shows a perspective view of yet another partially cut-away treatment section with means for introducing a pulverulent or granular substance into the treatment section.

In the arrangement shown in FIG. 21, a pulverulent or granular substance is fed to the treatment section 300 from a vibrating chute 330 via an opening in the treatment section 300. As an alternative to a vibrating chute, it is also possible to use vibrating belt, the belt conveying the pulverulent or granular substance to the treatment section 300.

FIGS. 22-25 illustrate various ways of supplying products to a massaging device 3, also known as metering.

Figure 22:
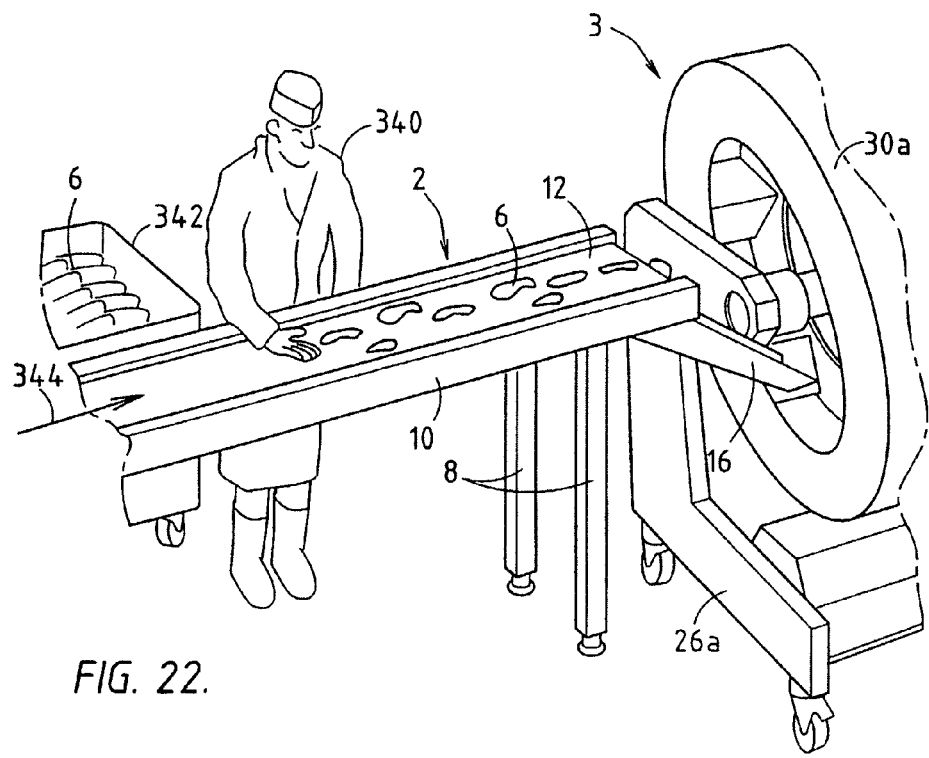
FIG. 22 shows a perspective illustration of the manual supply of products to the massaging device.

FIG. 22 illustrates how a worker 340 places products 6 from a container 342 onto a conveyor belt 12 moving in the direction indicated by arrow 344, after which the products 6, via the gutter 16, reach a treatment section 30a of the massaging device 3.

Figure 23:
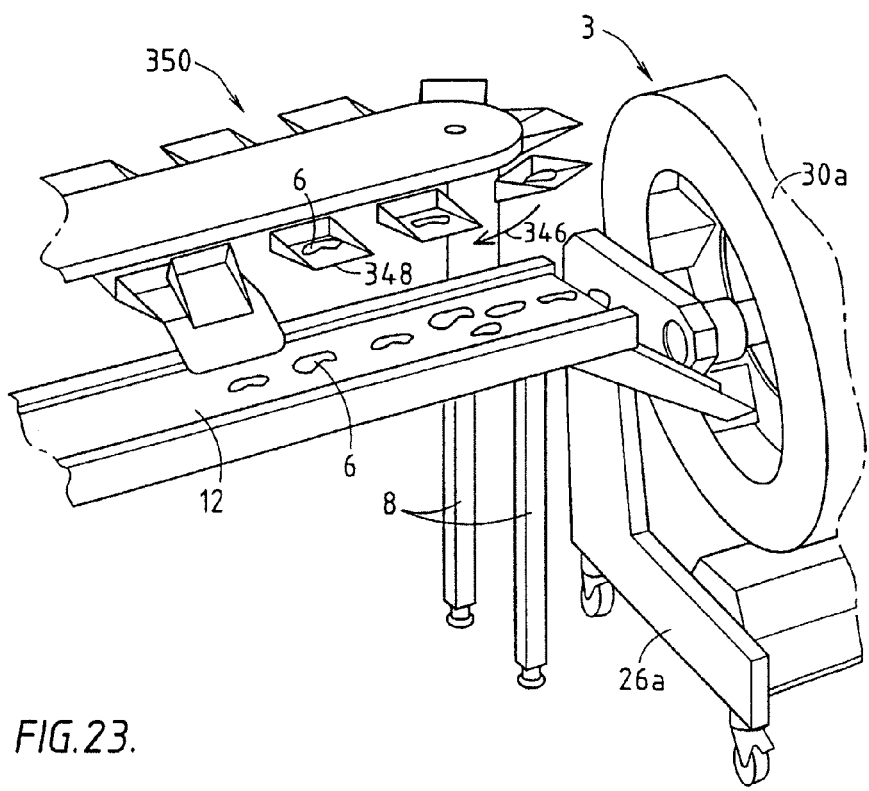
FIG. 23 shows a perspective view of a first embodiment of a metering device for supplying products to the massaging device.

FIG. 23 illustrates a supply of products 6 into receptacles 348, which are advanced in the direction indicated by arrow 346, of a receptacle conveyor 350. The receptacle conveyor 350 comprises a weighing device (not shown in more detail) and is also provided with means for tilting a receptacle 348 at the location of a chute 352 if the weight of the product 6 located in the corresponding receptacle is equal to a predetermined weight. When the receptacle 348 is tilted, the product 6 slides via the chute 352 onto the conveyor belt 12, by means of which the product is fed to the massaging device 3.

Figure 24:
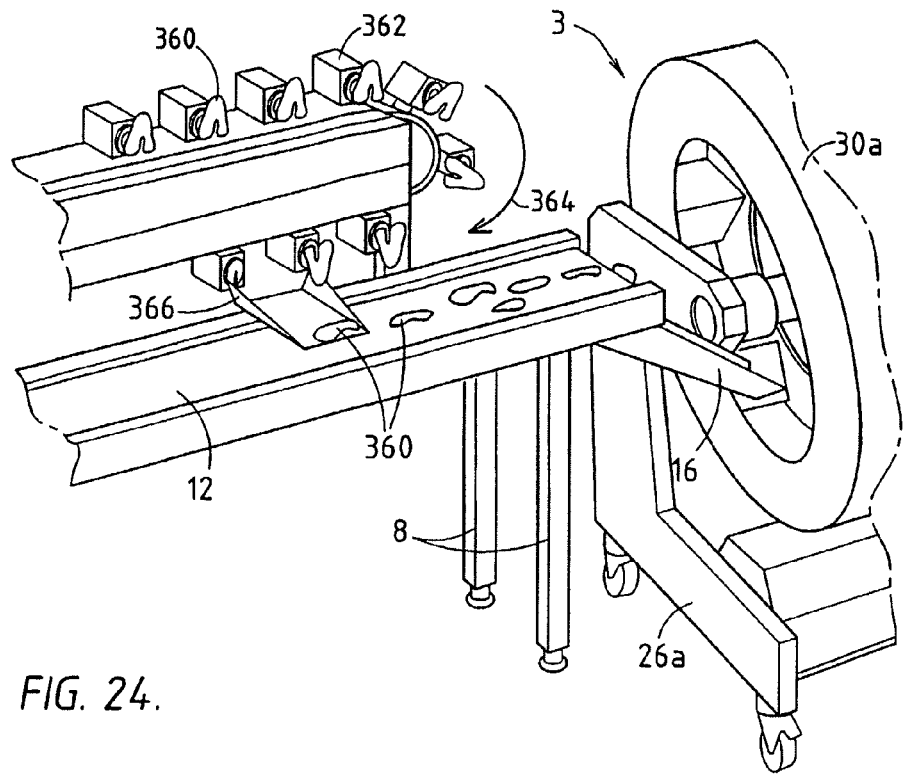
FIG. 24 shows a perspective view of a second embodiment of a metering device for supplying products to the massaging device.

FIG. 24 shows a section of a filleting line, in which fillets 360 are moved in the direction indicated by arrow 364 with the aid of suitable conveyor means 362. When it passes a chute 366, a fillet 360 is released from the associated conveyor means 362, after which the fillet 360 slides via the chute 366 onto the conveyor belt 12 and is fed onwards to the massaging device 3.

Figure 25:
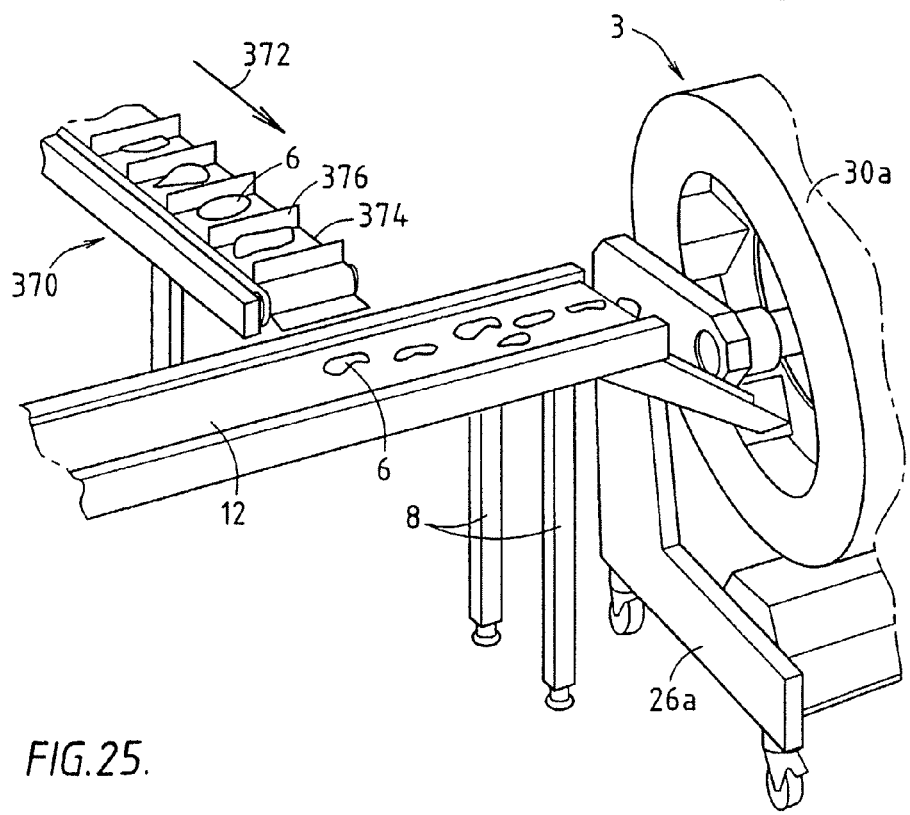
FIG. 25 shows a perspective view of a third embodiment of a metering device for supplying products to the massaging device.

FIG. 25 shows a belt conveyor 370 with a shelved belt 374 with raised walls 376 which is moving in the direction indicated by arrow 372. A product 6 is located between two successive walls 376. The shelved belt 374 is arranged in such a manner that the products 6, at the end of their conveying by the shelved belt 374, move onto the conveyor belt 12 and are fed onwards to the massaging device.

Figure 26:
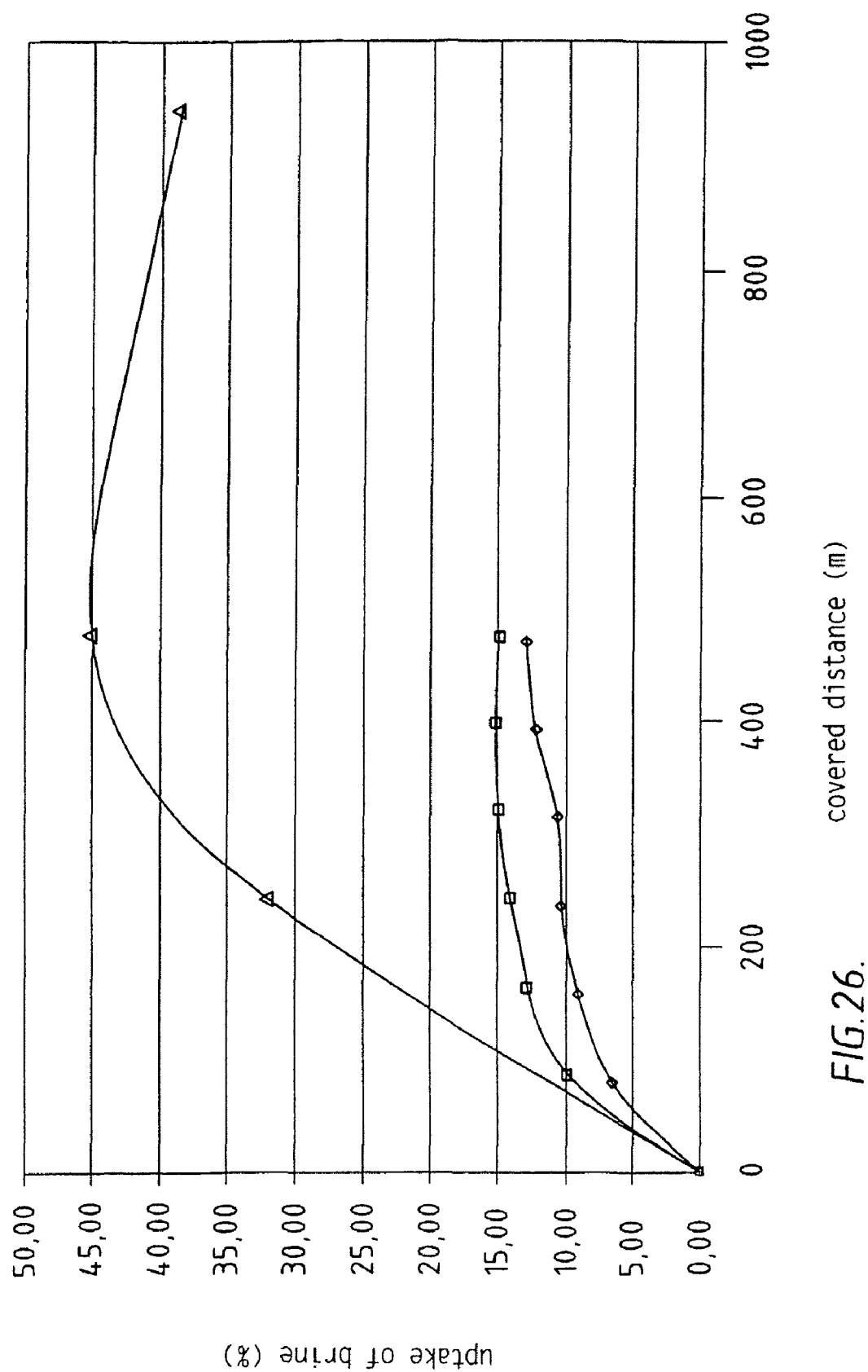
FIG. 26 shows a graph illustrating the operation of the device according to the invention.

FIG. 26 shows a graph in which three curves are plotted to illustrate the action of the massaging device; the curves represent (on the vertical axis) the uptake of brine in pieces of meat in percentages by weight or volume plotted against a distance in meters (plotted on the horizontal axis) covered by the pieces of meat in the massaging device. The distance covered is the distance which a product covers by rolling, sliding and/or dropping in the treatment section. The first curve, which is indicated by triangular symbols, represents the uptake of brine if ten times the required quantity of brine is metered into the treatment section, while the second curve, which is indicated by diamond symbols, represents the uptake of brine in the event of matched, correct metering of brine in the treatment section. The third curve, which is indicated by squares, represents the uptake of brine if in the first instance an excess of brine is used but this quantity is reduced in a subsequent stage. It can be seen that in this way the uptake of brine which according to the second curve is only achieved after a distance of 450 meters has been covered is achieved after just 180 meters has been covered according to the third curve. Therefore, the same result can be achieved with a greatly reduced treatment time by in the first instance using an excess of brine and in the second instance using a lower quantity of brine. The quantity of brine therefore represents a controlling factor in achieving the desired uptake of brine. Therefore, in a first treatment section an excess of brine can be used, for a rapid initial uptake of brine in that section, and in a subsequent treatment section a suitably matched quantity of brine can be used, in order to achieve a desired final value for the uptake of brine in this subsequent section. It is also possible for an excess of brine to be reduced by removing brine from the treatment section.

While the invention has been described and illustrated in its preferred embodiments, it should be understood that departures may be made therefrom within the scope of the invention, which is not limited to the details disclosed herein.

What is claimed is:

1. A massaging device for massaging meat products comprising:
   a. a frame;
   b. a first massaging section and a second massaging section, each massaging section comprising:
      i. a drum that rotates about a first axis and comprises opposed first and second walls and a peripheral wall extending between the first and second walls, wherein the first wall comprises an inlet opening for entry of meat products into the drum and the second wall comprises an outlet opening for discharge of meat products from the drum, wherein the inlet opening and outlet opening are substantially aligned along the first axis;
      ii. at least one massaging element located within the drum for mechanically massaging the meat products; and
      iii. a discharge member adapted to discharge meat products through the outlet opening of the second wall of the drum, the discharge member being displaceable along or about a second axis different from the first axis between an active discharge position and an inactive position, wherein:
         (a) in the active discharge position, the discharge member is at least partially located within the drum and guides meat products that have been treated in the drum through the outlet opening of the second wall to discharge the meat products from the drum; and
         (b) in the inactive position, the meat products remain in the drum,
   wherein the drum of the first massaging section is positioned adjacent the drum of the second massaging section and wherein the discharge member of the first massaging section, when in the active discharge position, is adapted to discharge meat products from the drum of the first massaging section and into the drum of the second massaging section;
   c. at least one drive motor for driving rotation of the drum of the first and second massaging sections;
   d. at least one discharge member actuating device for displacing the discharge member of the first and second massaging sections between the active discharge position and the inactive position, wherein displacement of the discharge member of the first and second massaging sections is independent from driving rotation of the drum of the first and second massaging sections; and
   e. a control device connected to (i) the at least one discharge member actuating device for controlling operation of the at least one discharge member actuating device and (ii) the at least one drive motor for controlling operation of the at least one drive motor, wherein the control device controls operation of the at least one discharge member actuating device and of the at least one drive motor independently with respect to each other.

2. The massaging device of claim 1, wherein the control device is adapted to control operation of the at least one drive motor so as to drive rotation of the drum of at least one of the first and second massaging sections when the discharge member of the at least one of the first and second massaging sections is in the inactive position and, after completion of a massaging treatment, control operation of the at least one discharge member actuating device to displace the discharge member of the at least one of the first and second massaging sections from the inactive position to the active discharge position.

3. The massaging device of claim 1, wherein the at least one drive motor comprises a first drive motor for driving rotation of the drum of the first massaging section and a second drive motor for driving rotation of the drum of the second massaging section, wherein the control device is adapted to independently control operation of the first drive motor and the second drive motor.

4. The massaging device of claim 1, wherein the control device is adapted to cause actuation of the discharge member of the second massaging section from its inactive position to its active discharge position to discharge the meat products from the drum of the second massaging section while the discharge member of the first massaging section remains in its inactive position, and wherein the control device is adapted to subsequently cause actuation of the discharge member of the first massaging section from its inactive position to its active discharge position to transfer meat products from the drum of the first massaging section to the drum of the second massaging section.

5. The massaging device of claim 1, wherein the control device is adapted to cause actuation of the discharge members of the first and second massaging sections simultaneously.

6. The massaging device of claim 1, wherein the at least one discharge member actuating device comprises a first discharge member actuating device for displacing the discharge member of the first massaging section and a second discharge member actuating device for displacing the discharge member of the second massaging section, wherein the control device controls operation of the first discharge member actuating device and of the second discharge member actuating device independently with respect to each other.

7. The massaging device of claim 1, wherein the first axis is substantially horizontal.

8. The massaging device of claim 1, wherein the discharge member of at least one of the first and second massaging sections comprises a gutter adapted to receive meat products in the drum of the at least one of the first and second massaging sections and guide the meat products through the outlet opening to discharge the meat products from the drum.

9. The massaging device of claim 1, further comprising a massaging-substance feed device adapted to feed a quantity of a liquid, granular or pulverent massaging substance into the drum of at least one of the first and second massaging sections.

10. The massaging device of claim 1, wherein the at least one massaging element and the discharge member rotate with the drum about the first axis.

11. A massaging device for massaging meat products comprising:
   a. a first massaging section and a second massaging section, each massaging section comprising:
      i. a space defined at least partially by opposed first and second walls and by a peripheral wall extending between the first and second walls, wherein the first wall comprises an inlet opening for entry of meat products into the space of the massaging section and the second wall comprises an outlet opening for discharge of meat products from the space of the massaging section and wherein the first and second walls and the peripheral wall are stationery;
      ii. at least one massaging element moveable within the space of the massaging section for mechanically massaging the meat products, wherein the at least one massaging element rotates within the space about a first axis; and
      iii. a discharge member adapted to discharge meat products through the outlet opening of the second wall of the massaging section, the discharge member being displaceable along or about a second axis different from the first axis between an active discharge position and an inactive position, wherein:
         (a) in the active discharge position, the discharge member is at least partially located within the space of the massaging section and guides meat products that have been treated in the massaging section through the outlet opening of the second wall to discharge the meat products from the space of the massaging section; and
         (b) in the inactive position, the meat products remain in the space of the massaging section,
      wherein the first massaging section is positioned adjacent the second massaging section and wherein the inlet opening of the second massaging section is aligned with the outlet opening of the first massaging section so that the discharge member of the first massaging section, when in the active discharge position, is adapted to discharge meat products from the first massaging section and into the second massaging section;
   b. at least one massaging element drive motor for driving the at least one massaging element of the first and second massaging sections;
   c. at least one discharge member actuating device for displacing the discharge member of the first and second massaging sections between the active discharge position and the inactive position, wherein displacement of the discharge member of the first and second massaging sections is independent from driving of the at least one massaging element of the first and second massaging sections; and
   d. a control device connected to (i) the at least one discharge member actuating device for controlling operation of the at least one discharge member actuating device and (ii) the at least one massaging element drive motor for controlling operation of the at least one massaging element drive motor, wherein the control device controls operation of the at least one discharge member actuating device and the at least one massaging element drive motor independently with respect to each other.

12. The massaging device of claim 11, wherein the control device is adapted to control operation of the at least one massaging element drive motor so as to drive the at least one massaging element of at least one of the first and second massaging sections when the discharge member of the at least one of the first and second massaging sections is in the inactive position and, after completion of a massaging treatment, control operation of the at least one discharge member actuating device to displace the discharge member of the at least one of the first and second massaging sections from the inactive position to the active discharge position.

13. The massaging device of claim 11, wherein the at least one massaging element drive motor comprises a first massaging element drive motor for driving the at least one massaging element of the first massaging section and a second massaging element drive motor for driving the at least one massaging element of the second massaging section, wherein the control device is adapted to independently control the operation of the first massaging element drive motor and the second massaging element drive motor.

14. The massaging device of claim 11, wherein the control device is adapted to cause actuation of the discharge member of the second massaging section from its inactive position to its active discharge position to discharge the meat products from the second massaging section while the discharge member of the first massaging device remains in its inactive position, and wherein the control device is adapted to subsequently cause actuation of the discharge member of the first massaging section from its inactive position to its active discharge position to transfer meat products from the first massaging section to the second massaging section.

15. The massaging device of claim 11, wherein the control device is adapted to cause actuation of the discharge members of the first and second massaging sections simultaneously.

16. The massaging device of claim 11, wherein the at least one discharge member actuating device comprises a first discharge member actuating device for displacing the discharge member of the first massaging section and a second discharge member actuating device for displacing the discharge member of the second massaging section, wherein the control device controls operation of the first discharge member actuating device and of the second discharge member actuating device independently with respect to each other.

17. The massaging device of claim 11, wherein the first axis is substantially horizontal.

18. The massaging device of claim 11, wherein the at least one massaging element of one of the first and second massaging sections is mounted between support rings that rotate about the first axis.

19. The massaging device of claim 11, wherein the at least one massaging element of at least one of the first and second massaging sections comprises at least one paddle adjacent the peripheral wall of the at least one of the first and second massaging sections.

20. The massaging device of claim 11, wherein the inlet opening of the second massaging section and the outlet opening of the massaging section are aligned on the first axis.

21. The massaging device of claim 11, wherein the discharge member of at least one of the first and second massaging sections comprises a gutter adapted to receive meat products in the at least one of the first and second massaging sections and guide the meat products through the outlet opening to discharge the meat products from the at least one of the first and second massaging sections.

22. The massaging device of claim 11, further comprising a massaging-substance feed device adapted to feed a quantity of a liquid, granular or pulverent massaging substance into the space of at least one of the first and second massaging sections.

23. The massaging device of claim 11, wherein the discharge member rotates with the at least one massaging element about the first axis.

24. A massaging device for massaging meat products comprising:
   a. a frame;
   b. a first drum and a second drum supported by the frame and rotatable about a first axis, wherein each drum comprises:
      i. opposed first and second walls, wherein the first wall comprises an inlet opening for entry of meat products into the drum and the second wall comprises an outlet opening for discharge of meat products from the drum, wherein the inlet opening and outlet opening are substantially aligned along the first axis;
      ii. a peripheral wall extending between the first and second walls and comprising an inner surface,
      iii. at least one massaging element mounted to the inner surface of the peripheral wall of the drum so as to rotate therewith, wherein the at least one massaging element comprises a surface arranged to support meat products thereon,
   said meat products falling off of the surface of the at least one massaging element as the at least one massaging element changes orientation during rotation of the drum, the meat products thereby being subjected to a mechanical massaging; and
      iv. a discharge scoop positioned within the drum and mounted to the drum so as to rotate therewith about the first axis, wherein the discharge scoop is displaceable relative to the drum along or about a second axis different from the first axis between an active discharge position and an inactive position, wherein:
         (a) in the active discharge position, the discharge scoop is positioned adjacent the surface of the at least one massaging element to accept meat products falling off of the surface of the at least one massaging element during rotation of the drum and, upon continued rotation of the drum, to guide the meat products through the outlet opening of the second wall of the drum to discharge the meat products from the drum; and
         (b) in the inactive position, the discharge scoop is positioned away from the surface of the at least one massaging element such that meat products falling off of the surface of the at least one massaging element during rotation of the drum pass between the discharge scoop and the at least one massaging element and remain in the drum,
   wherein the first drum is positioned adjacent the second drum and wherein the discharge scoop of the first drum, when in the active discharge position, is adapted to discharge meat products from the first drum into the second drum;
   c. at least one drive motor for driving rotation of the first and second drums;
   d. at least one discharge scoop actuating device for displacing the discharge scoop of the first and second drums between the active discharge position and the inactive position, wherein displacement of the discharge scoop of the first and second drums is independent from driving rotation of the first and second drums; and
   e. a control device connected to (i) the at least one discharge scoop actuating device for controlling operation of the at least one discharge scoop actuating device and (ii) the at least one drive motor for controlling operation of the at least one drive motor, wherein the control device controls operation of the at least one discharge scoop actuating device and the at least one drive motor independently with respect to each other.

25. The massaging device of claim 24, wherein the first axis is substantially horizontal.

26. The massaging device of claim 24, wherein the control device is adapted to control operation of the at least one drive motor so as to drive rotation of at least one of the drums when the discharge scoop of the at least one drum is in the inactive position and, after completion of a massaging treatment, control operation of the at least one discharge scoop actuating device to displace the discharge scoop of the at least one drum from the inactive position to the active discharge position.

27. The massaging device of claim 24, wherein the at least one drive motor comprises a first drive motor for driving rotation of the first drum and a second drive motor for driving rotation of the second drum, wherein the control device is adapted to independently control operation of the first drive motor and the second drive motor.

28. The massaging device of claim 24, wherein the control device is adapted to cause displacement of the discharge scoop of the second drum from its inactive position to its active discharge position to discharge the meat products from the second drum while the discharge scoop of the first drum remains in its inactive position, and wherein the control device is adapted to subsequently cause displacement of the discharge scoop of the first drum from its inactive position to its active discharge position to transfer meat products from the first drum to the second drum.

29. The massaging device of claim 24, wherein the control device is adapted to cause displacement of the discharge scoops of the first and second drums simultaneously.

30. A massaging device for massaging meat products comprising:
   a. a stationary tank comprising:
      i. opposed first and second vertical end walls separated a distance from each other;
      ii. a substantially semi-circular horizontal lower wall extending between and connecting the first and second end walls; and
      iii. at least one vertical partition arranged along the distance between the first and second end walls to define a first and a second massaging section in the tank,
   wherein the first end wall comprises an inlet opening for entry of meat products into the tank for receipt on the lower wall of the tank in the first massaging section and wherein the second end wall comprises an outlet opening for discharge of massaged meat products from the tank,
   b. a massaging structure rotatable about a substantially horizontal axis in each of the first and second massaging sections, wherein each massaging structure comprises:
      i. first and second support rings, wherein each support ring extends in a vertical plane adjacent either the first end wall, the second end wall, or the at least one vertical partition and wherein each support ring comprises an opening allowing for the passage of meat products therethrough;

ii. massaging elements mounted between the first and second support rings, wherein each massaging element comprises an edge arranged to move along the stationary lower wall during rotation of the massaging structure to lift meat products lying on the stationary lower wall, said meat products falling off said massaging elements as the massaging elements change orientation during rotation of the massaging structure, the products thereby being subjected to a mechanical massaging; and iii. a discharge scoop mounted on said rotatable massaging structure so as to rotate therewith about the substantially horizontal axis, wherein the discharge scoop is displaceable relative to the rotatable massaging structure along or about an axis different from the substantially horizontal axis between an active discharge position and an inactive position, wherein:

(a) in the active discharge position, the discharge scoop lifts meat products lying on the lower wall during rotation of the massaging structure and guides the meat products through the opening of the second support ring to discharge the meat products from the massaging section; and (b) in the inactive position, the discharge scoop bypasses meat products lying on the lower wall during rotation of the massaging structure so that the meat products remain in the massaging section;

c. at least one massaging structure drive motor for rotatably driving the massaging structures;

d. at least one discharge scoop actuating device for displacing the discharge scoops of each of the first and second massaging sections between the active discharge position and the inactive position, wherein displacement of the discharge scoops is independent from rotational driving of the massaging structures; and e. a control device connected to (i) the at least one discharge scoop actuating device for controlling operation of the at least one discharge scoop actuating device and (ii) the at least one massaging structure drive motor for controlling operation of the at least one massaging structure drive motor, wherein the control device controls operation of the at least one discharge scoop actuating device and the at least one massaging structure drive motor independently with respect to each other.

31. The massaging device of claim 30, wherein the control device is adapted to control operation of the at least one massaging structure drive motor so as to drive the at least one massaging structure of at least one of the first and second massaging sections when the discharge scoop of the at least one of the first and second massaging sections is in the inactive position and, after completion of a massaging treatment, control operation of the at least one discharge scoop actuating device to displace the discharge scoop of the at least one of the first and second massaging sections from the inactive position to the active discharge position.

32. The massaging device of claim 30, wherein the at least one massaging structure drive motor comprises a first massaging structure drive motor for driving the at least one massaging structure of the first massaging section and a second massaging structure drive motor for driving the at least one massaging structure of the second massaging section, wherein the control device is adapted to independently control the operation of the first massaging structure drive motor and the second massaging structure drive motor.

33. The massaging device of claim 30, wherein the control device is adapted to cause displacement of the discharge scoop of the second massaging section from its inactive position to its active discharge position to discharge the meat products from the second massaging section while the discharge scoop of the first massaging device remains in its inactive position, and wherein the control device is adapted to subsequently cause displacement of the discharge scoop of the first massaging section from its inactive position to its active discharge position to transfer meat products from the first massaging section to the second massaging section.

34. The massaging device of claim 30, wherein the control device is adapted to cause actuation of the discharge scoops of the first and second massaging sections simultaneously.

35. The massaging device of claim 30, wherein the at least one discharge scoop actuating device comprises a first discharge scoop actuating device for displacing the discharge scoop of the first massaging section and a second discharge scoop actuating device for displacing the discharge scoop of the second massaging section, wherein the control device independently controls operation of the first discharge scoop actuating device and of the second discharge scoop actuating device independently with respect to each other.

* * * * *